US009598016B2

(12) United States Patent
Blank et al.

(10) Patent No.: US 9,598,016 B2
(45) Date of Patent: Mar. 21, 2017

(54) INTERIOR REARVIEW MIRROR ASSEMBLY

(75) Inventors: Rodney L. Blank, Zeeland, MI (US);
John T. Uken, Jenison, MI (US); Mark L. Larson, Grand Haven, MI (US);
Darryl P. De Wind, West Olive, MI (US); Mark E. Kramer, Zeeland, MI (US); Timothy G. Perkins, Ada, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 238 days.

(21) Appl. No.: 13/879,481

(22) PCT Filed: Oct. 14, 2011

(86) PCT No.: PCT/US2011/056295
§ 371 (c)(1),
(2), (4) Date: Apr. 15, 2013

(87) PCT Pub. No.: WO2012/051500
PCT Pub. Date: Apr. 19, 2012

(65) Prior Publication Data
US 2014/0022390 A1    Jan. 23, 2014

Related U.S. Application Data

(60) Provisional application No. 61/490,375, filed on May 26, 2011, provisional application No. 61/452,789, (Continued)

(51) Int. Cl.
*B60R 1/02* (2006.01)
*B60R 1/12* (2006.01)
*G02B 5/08* (2006.01)

(52) U.S. Cl.
CPC ............... *B60R 1/02* (2013.01); *B60R 1/12* (2013.01); *G02B 5/0816* (2013.01); *B60R 2001/1215* (2013.01); *B60R 2001/1253* (2013.01)

(58) Field of Classification Search
CPC ............ B60R 1/12; B60R 1/02; G02B 5/0816
See application file for complete search history.

(56) References Cited

U.S. PATENT DOCUMENTS 3,798,370 A    3/1974  Hurst
4,198,539 A    4/1980  Pepper
(Continued)

FOREIGN PATENT DOCUMENTS

EP        1097848       5/2001
WO        WO0049680     8/2000
(Continued)

OTHER PUBLICATIONS

International Search Report and Written Opinion dated Feb. 8, 2012 for corresponding PCT Application No. PCT/US2011/056295.

*Primary Examiner* — Brian Yenke
*Assistant Examiner* — Sean Haiem
(74) *Attorney, Agent, or Firm* — Gardner, Linn, Burkhart & Flory, LLP

(57) ABSTRACT

An interior rearview mirror assembly for a vehicle includes a mirror reflective element and a video display device operable to display video information that is viewable by a driver of the vehicle through said mirror reflective element and at a display region of said mirror reflective element. The video display device may be operable to display a directional heading at a compass display portion of the display region, and means may be provided to adjust the directional heading display to limit image sticking of the displayed directional heading. The mirror assembly may have a touch zone having at least one touch pad established at a perimeter (Continued)

border band of the reflective element, and may have another touch sensor to detect a touch of a user away from the touch zone to determine when a detected touch at the touch zone is an unintentional touch.

20 Claims, 39 Drawing Sheets

Related U.S. Application Data filed on Mar. 15, 2011, provisional application No. 61/449,364, filed on Mar. 4, 2011, provisional application No. 61/448,916, filed on Mar. 3, 2011, provisional application No. 61/409,346, filed on Nov. 2, 2010, provisional application No. 61/393,407, filed on Oct. 15, 2010.

(56) References Cited

U.S. PATENT DOCUMENTS

| | | |
|---|---|---|
| 4,530,571 A | 7/1985 | Connor |
| 4,546,551 A | 10/1985 | Franks |
| 4,581,827 A | 4/1986 | Higashi |
| 4,661,655 A | 4/1987 | Gibson et al. |
| 4,731,508 A | 3/1988 | Gibson et al. |
| 4,793,690 A | 12/1988 | Gahan et al. |
| 4,822,957 A | 4/1989 | Talmage et al. |
| 4,862,594 A | 9/1989 | Schierbeek et al. |
| 4,882,565 A | 11/1989 | Gallmeyer |
| 4,937,945 A | 7/1990 | Schofield et al. |
| 4,953,305 A | 9/1990 | Van Lente et al. |
| 5,045,644 A | 9/1991 | Dunthorn |
| 5,131,154 A | 7/1992 | Schierbeek et al. |
| 5,193,029 A | 3/1993 | Schofield et al. |
| 5,255,442 A | 10/1993 | Schierbeek et al. |
| 5,339,529 A | 8/1994 | Lindberg |
| 5,416,478 A | 5/1995 | Morinaga |
| 5,455,716 A | 10/1995 | Suman et al. |
| 5,530,240 A | 6/1996 | Larson et al. |
| 5,576,687 A | 11/1996 | Blank et al. |
| 5,594,222 A | 1/1997 | Caldwell |
| 5,632,092 A | 5/1997 | Blank et al. |
| 5,644,851 A | 7/1997 | Blank et al. |
| 5,668,663 A | 9/1997 | Varaprasad et al. |
| 5,677,851 A | 10/1997 | Kingdon et al. |
| 5,699,044 A | 12/1997 | Van Lente et al. |
| 5,708,410 A | 1/1998 | Blank et al. |
| 5,724,187 A | 3/1998 | Varaprasad et al. |
| 5,724,316 A | 3/1998 | Brunts |
| 5,737,226 A | 4/1998 | Olson et al. |
| 5,761,094 A | 6/1998 | Olson et al. |
| 5,790,973 A | 8/1998 | Blaker et al. |
| 5,802,727 A | 9/1998 | Blank et al. |
| 5,806,879 A | 9/1998 | Hamada et al. |
| 5,808,197 A | 9/1998 | Dao |
| 5,877,707 A | 3/1999 | Kowalick |
| 5,878,370 A | 3/1999 | Olson |
| 5,899,956 A | 5/1999 | Chan |
| 5,924,212 A | 7/1999 | Domanski |
| 5,942,895 A | 8/1999 | Popovic et al. |
| 6,001,486 A | 12/1999 | Varaprasad et al. |
| 6,023,229 A | 2/2000 | Bugno et al. |
| 6,087,012 A | 7/2000 | Varaprasad et al. |
| 6,087,953 A | 7/2000 | DeLine et al. |
| 6,111,683 A | 8/2000 | Cammenga et al. |
| 6,140,933 A | 10/2000 | Bugno et al. |
| 6,161,865 A | 12/2000 | Rose et al. |
| 6,172,613 B1 | 1/2001 | DeLine et al. |
| 6,173,501 B1 | 1/2001 | Blank et al. |
| 6,173,508 B1 | 1/2001 | Strohmeyer, Jr. |
| 6,184,679 B1 | 2/2001 | Popovic et al. |
| 6,222,460 B1 | 4/2001 | DeLine et al. |
| 6,278,271 B1 | 8/2001 | Schott |
| 6,297,781 B1 | 10/2001 | Turnbull et al. |
| 6,310,611 B1 | 10/2001 | Caldwell |
| 6,320,282 B1 | 11/2001 | Caldwell |
| 6,346,698 B1 | 2/2002 | Turnbull |
| 6,366,213 B2 | 4/2002 | DeLine et al. |
| 6,369,804 B1 | 4/2002 | Sandbach |
| 6,386,742 B1 | 5/2002 | DeLine et al. |
| 6,418,376 B1 | 7/2002 | Olson |
| 6,427,349 B1 | 8/2002 | Blank et al. |
| 6,437,258 B1 | 8/2002 | Sandbach |
| 6,452,479 B1 | 9/2002 | Sandbach |
| 6,477,464 B2 | 11/2002 | McCarthy et al. |
| 6,483,438 B2 | 11/2002 | DeLine et al. |
| 6,492,980 B2 | 12/2002 | Sandbach |
| 6,501,465 B2 | 12/2002 | Sandbach |
| 6,504,531 B1 | 1/2003 | Sandbach |
| 6,513,252 B1 | 2/2003 | Schierbeek et al. |
| 6,539,306 B2 | 3/2003 | Turnbull |
| 6,627,918 B2 | 9/2003 | Getz |
| 6,642,851 B2 | 11/2003 | Deline et al. |
| 6,648,478 B2 | 11/2003 | Blank |
| 6,690,268 B2 | 2/2004 | Schofield et al. |
| 6,693,517 B2 | 2/2004 | McCarthy et al. |
| 6,787,240 B2 | 9/2004 | Getz |
| 6,824,281 B2 | 11/2004 | Schofield et al. |
| 6,922,902 B2 | 8/2005 | Schierbeek et al. |
| 6,928,366 B2 | 8/2005 | Ockerse et al. |
| 6,946,978 B2 | 9/2005 | Schofield |
| 6,968,273 B2 | 11/2005 | Ockerse et al. |
| 6,980,092 B2 | 12/2005 | Turnbull et al. |
| 7,004,593 B2 | 2/2006 | Weller et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,541 B2 | 8/2007 | Kuramoto et al. |
| 7,289,037 B2 | 10/2007 | Uken et al. |
| 7,308,341 B2 | 12/2007 | Schofield et al. |
| 7,329,013 B2 | 2/2008 | Blank et al. |
| 7,360,932 B2 | 4/2008 | Uken et al. |
| 7,370,983 B2 | 5/2008 | DeWind et al. |
| 7,446,924 B2 | 11/2008 | Schofield et al. |
| 7,452,090 B2 | 11/2008 | Weller et al. |
| 7,480,149 B2 | 1/2009 | DeWard et al. |
| 7,490,944 B2 | 2/2009 | Blank et al. |
| 7,526,367 B2 * | 4/2009 | Schofield et al. ............... 701/1 |
| 7,540,620 B2 | 6/2009 | Weller et al. |
| 7,570,413 B2 | 8/2009 | Tonar et al. |
| 7,670,016 B2 | 3/2010 | Weller et al. |
| 7,815,326 B2 | 10/2010 | Blank et al. |
| 7,855,755 B2 | 12/2010 | Weller et al. |
| D633,019 S | 2/2011 | De Wind |
| D633,423 S | 3/2011 | De Wind |
| D638,761 S | 5/2011 | De Wind |
| D647,017 S | 10/2011 | De Wind |
| 8,049,640 B2 | 11/2011 | Uken et al. |
| 8,154,418 B2 | 4/2012 | Peterson et al. |
| 8,508,831 B2 | 8/2013 | De Wind et al. |
| 8,529,108 B2 | 9/2013 | Uken et al. |
| 8,730,553 B2 | 5/2014 | De Wind et al. |
| 2001/0026215 A1 | 10/2001 | Nakaho et al. |
| 2001/0055165 A1 | 12/2001 | McCarthy et al. |
| 2002/0003571 A1 | 1/2002 | Schofield et al. |
| 2002/0031622 A1 | 3/2002 | Ippel et al. |
| 2002/0044065 A1 * | 4/2002 | Quist et al. ............... 340/815.4 |
| 2002/0057494 A1 | 5/2002 | Lang |
| 2002/0070872 A1 | 6/2002 | Deline et al. |
| 2002/0098461 A1 | 7/2002 | Cardarelli |
| 2002/0113203 A1 | 8/2002 | Heslin et al. |
| 2002/0159270 A1 | 10/2002 | Lynam et al. |
| 2003/0007261 A1 | 1/2003 | Hutzel et al. |
| 2003/0169522 A1 | 9/2003 | Schofield et al. |
| 2004/0137240 A1 | 7/2004 | Halsey et al. |
| 2005/0078389 A1 | 4/2005 | Kulas et al. |
| 2005/0169003 A1 | 8/2005 | Lindahl et al. |
| 2005/0172504 A1 | 8/2005 | Ohm et al. |
| 2005/0187675 A1 | 8/2005 | Schofield et al. |
| 2006/0038668 A1 | 2/2006 | DeWard et al. |
| 2006/0061008 A1 | 3/2006 | Karner et al. |
| 2006/0125919 A1 | 6/2006 | Camilleri et al. |

(56) References Cited

U.S. PATENT DOCUMENTS

| | | |
|---|---|---|
| 2006/0164230 A1 | 7/2006 | DeWind et al. |
| 2006/0255960 A1 | 11/2006 | Uken et al. |
| 2007/0152976 A1* | 7/2007 | Townsend et al. ............ 345/173 |
| 2008/0042938 A1* | 2/2008 | Cok ................................ 345/76 |
| 2008/0068520 A1* | 3/2008 | Minikey et al. ................. 349/11 |
| 2008/0180780 A1 | 7/2008 | Lawlor et al. |
| 2009/0015736 A1 | 1/2009 | Weller et al. |
| 2009/0237820 A1* | 9/2009 | McCabe et al. ............... 359/839 |
| 2009/0243824 A1* | 10/2009 | Peterson et al. .............. 340/435 |
| 2010/0091394 A1 | 4/2010 | DeWind et al. |

FOREIGN PATENT DOCUMENTS

| | | |
|---|---|---|
| WO | WO0052661 | 9/2000 |
| WO | WO2004076971 | 9/2004 |

* cited by examiner

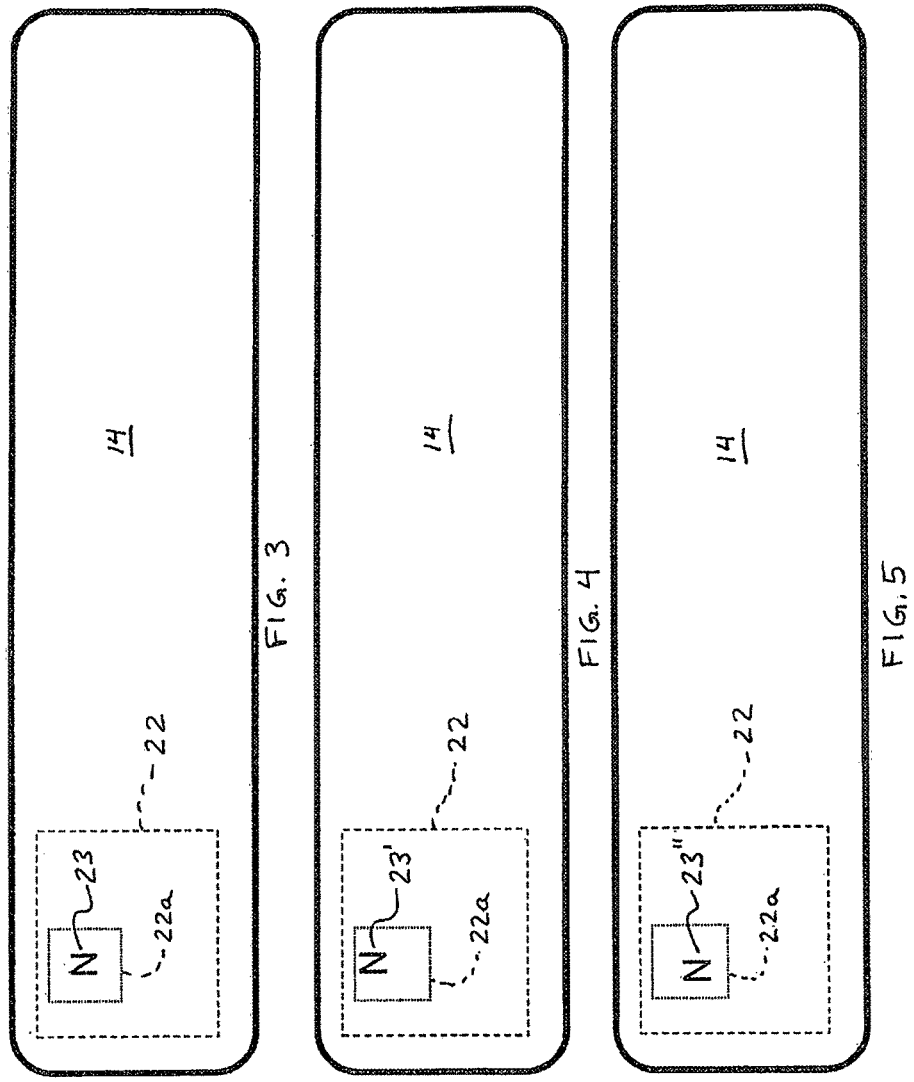

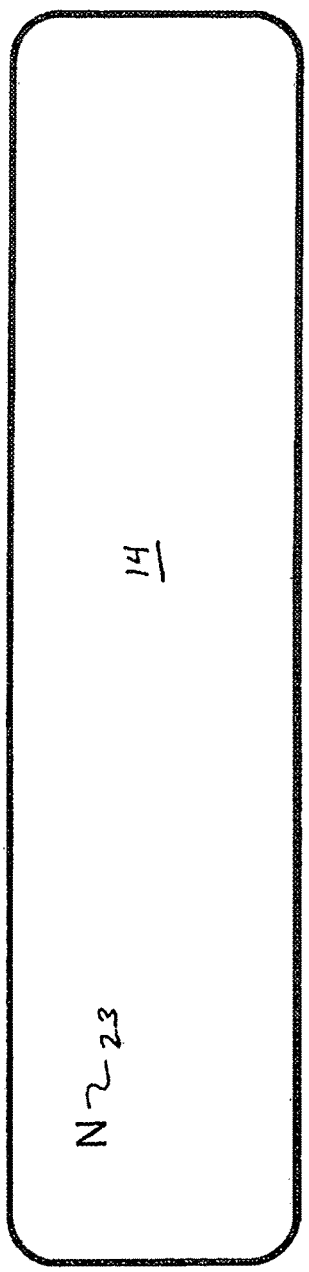
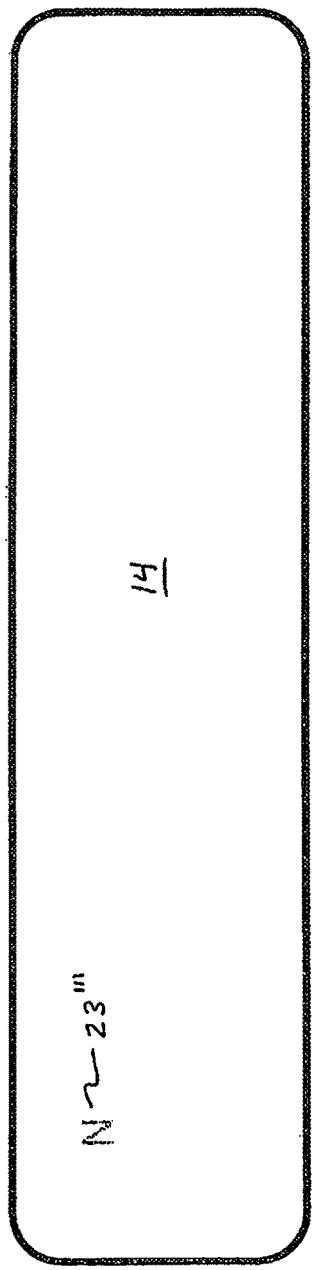

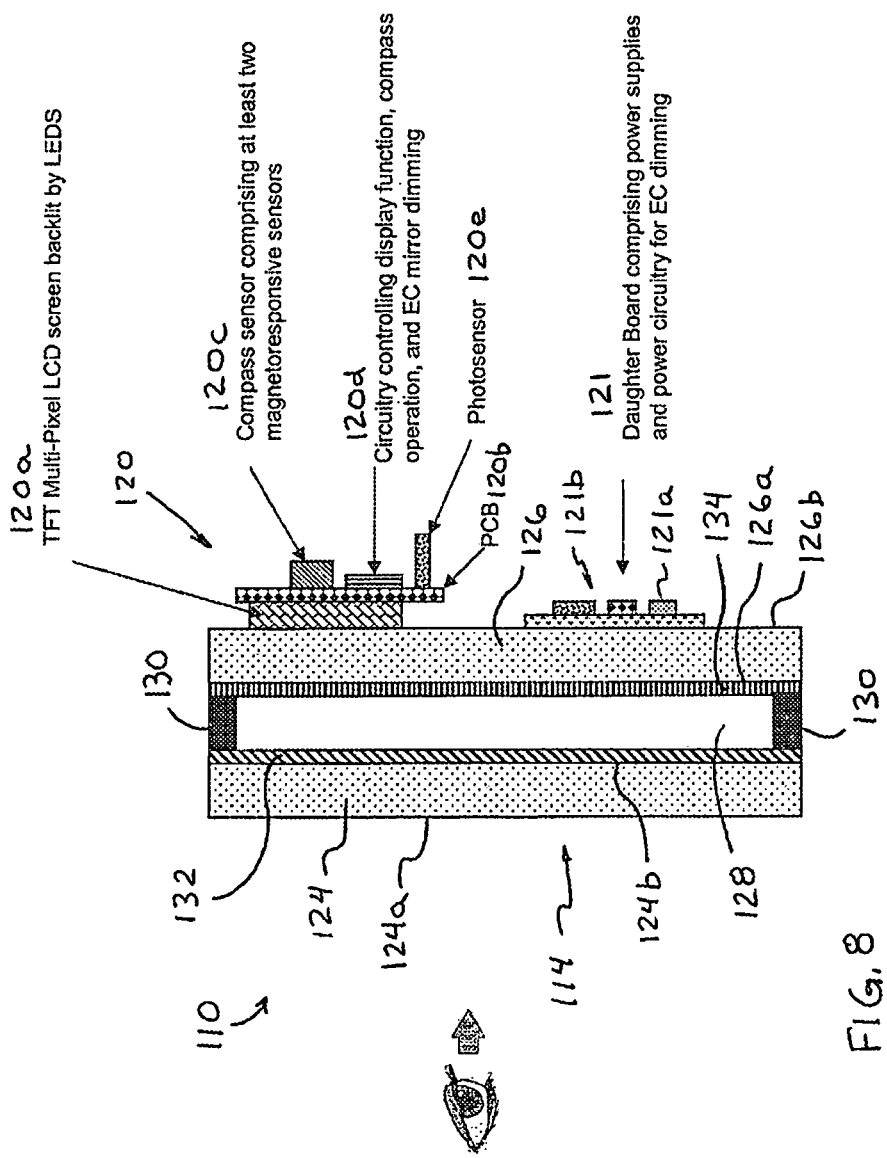

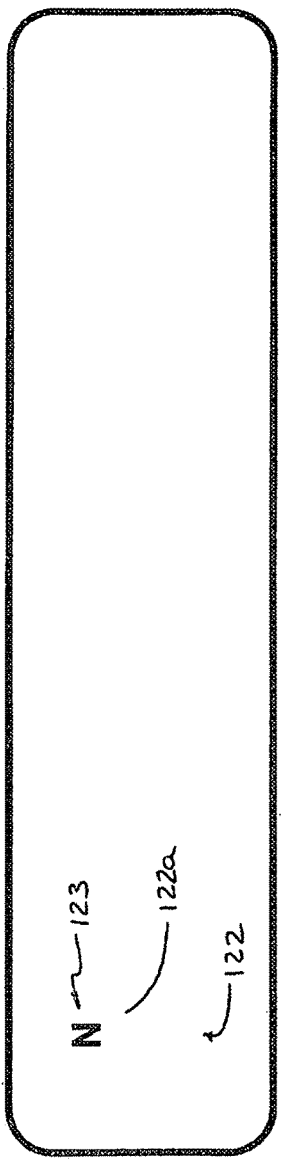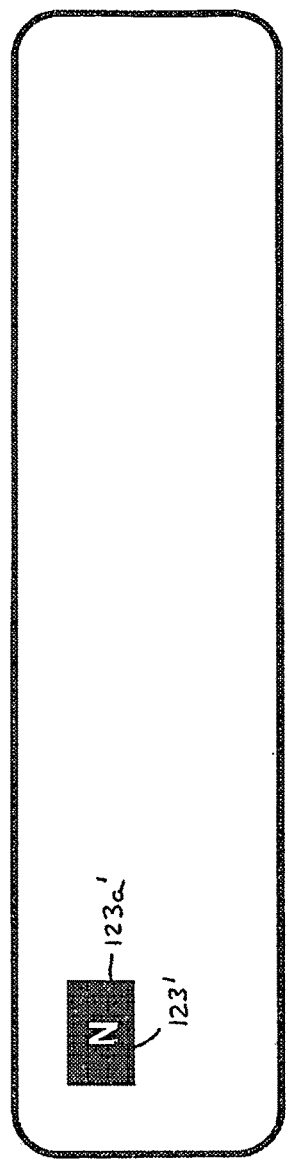
FIG. 10  DoD Transflective Interior Compass Rearview Mirror
FIG. 11  Window-thru-the-Reflector Interior Compass Rearview Mirror

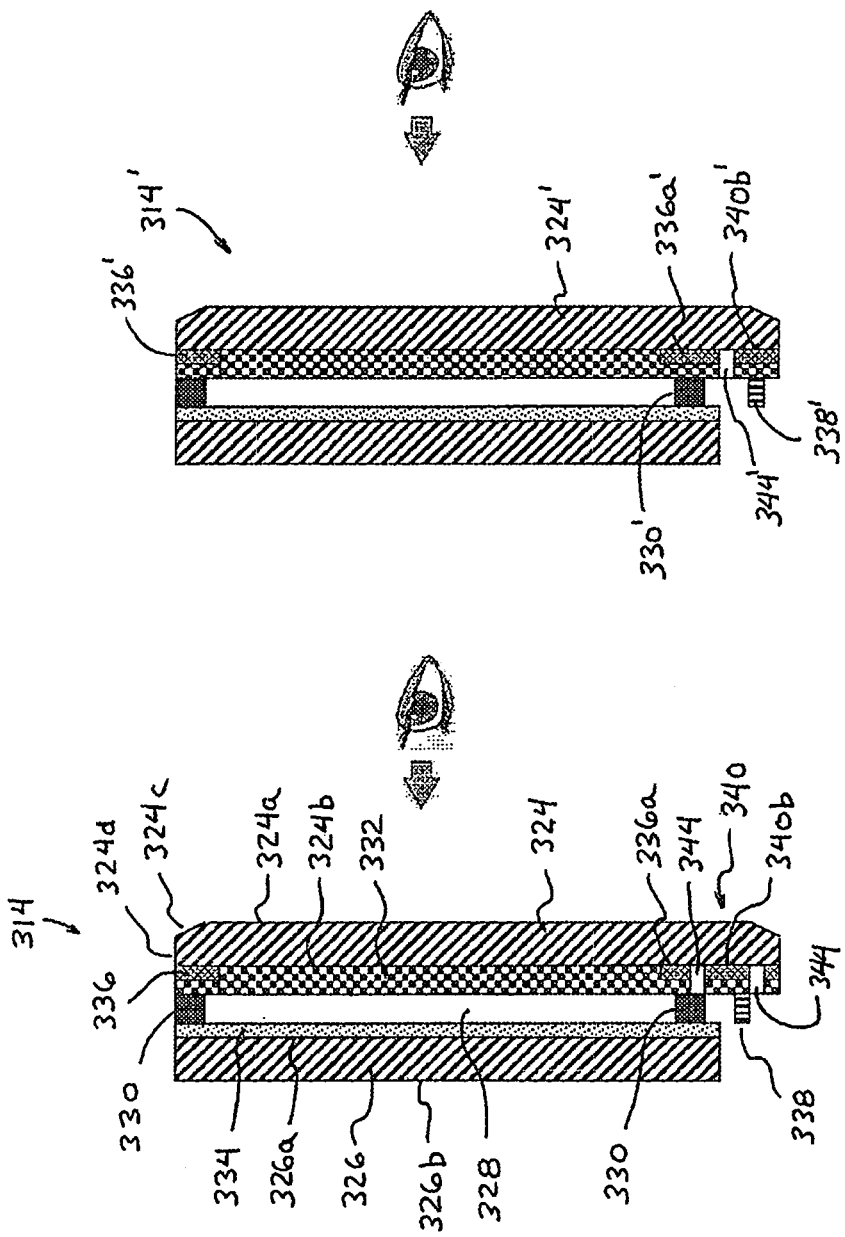

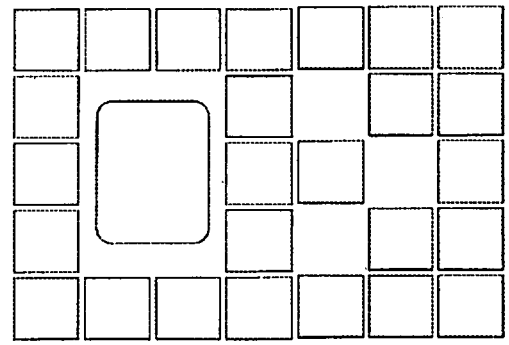
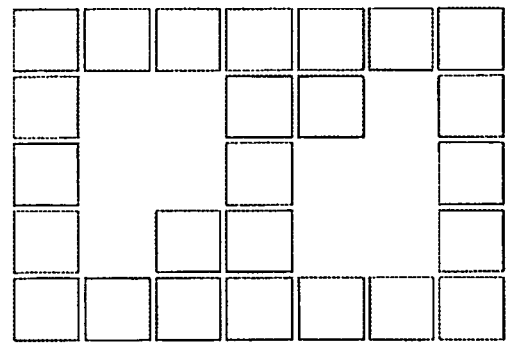
FIG. 19
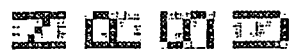

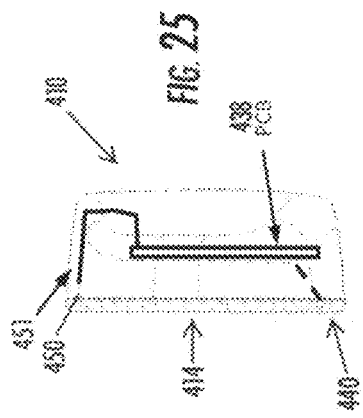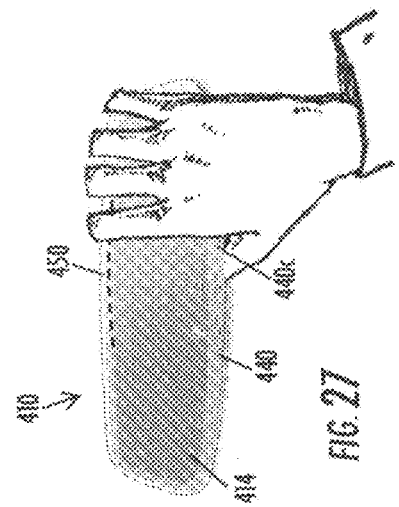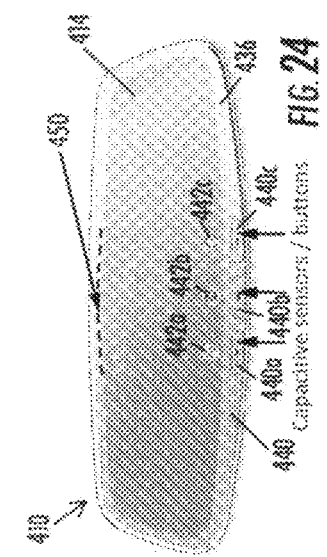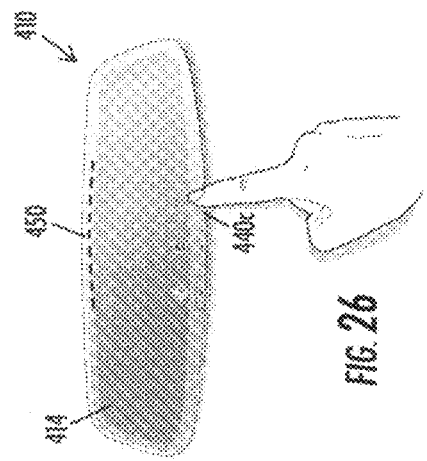

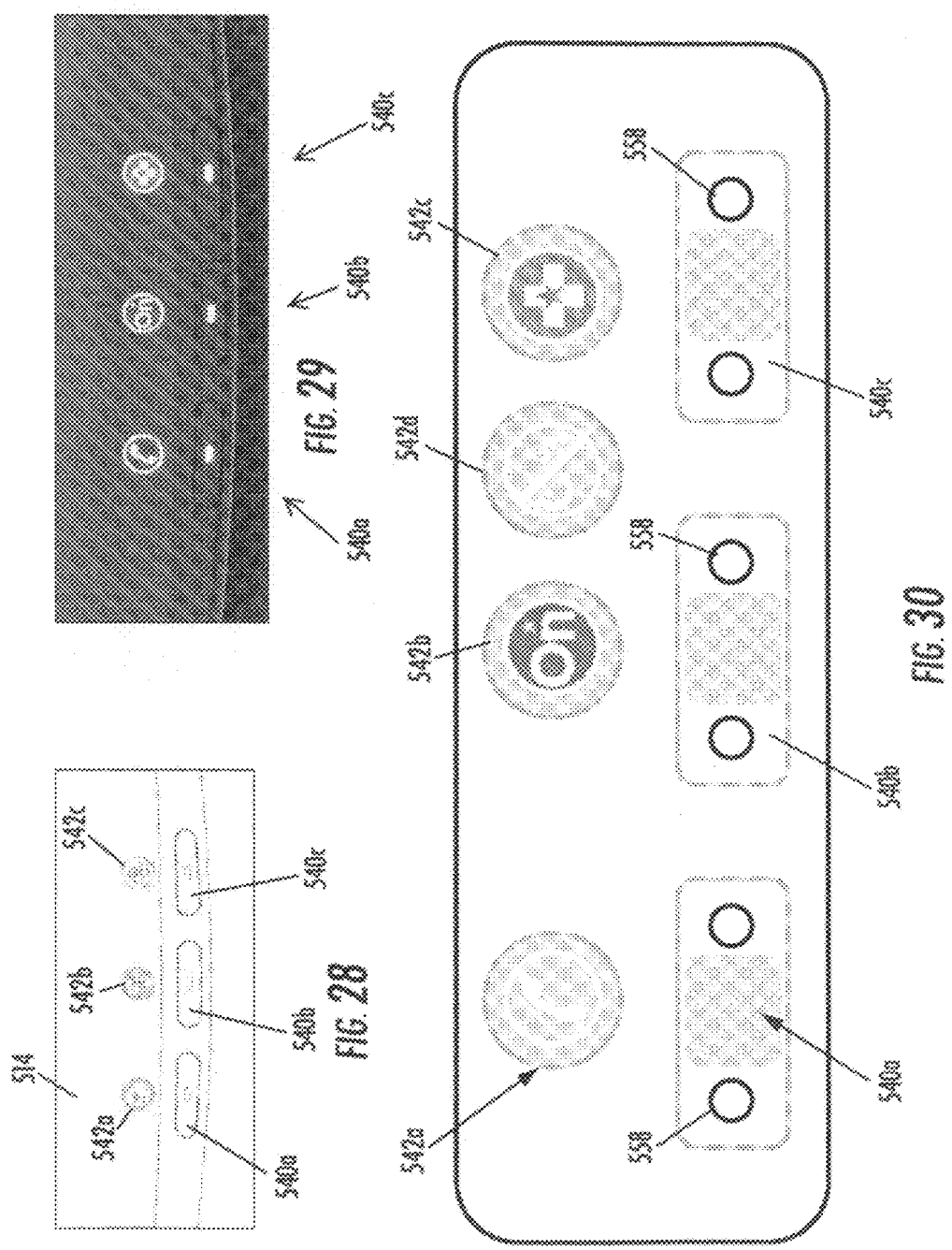

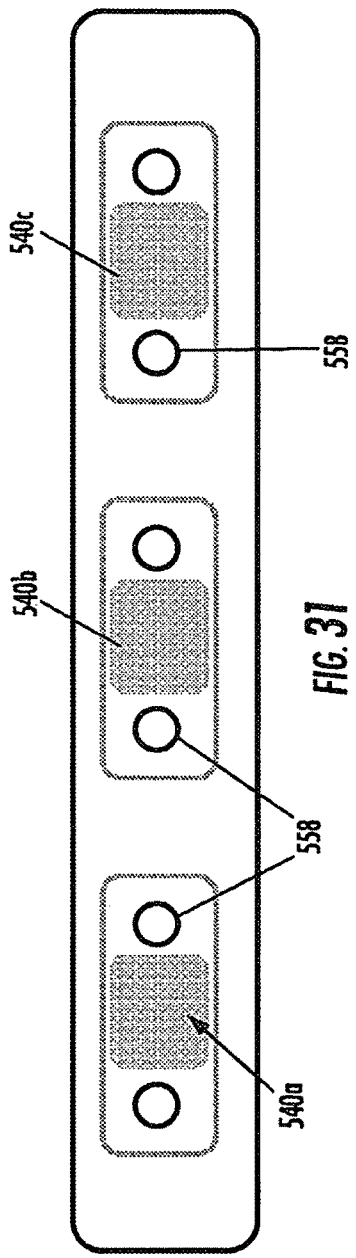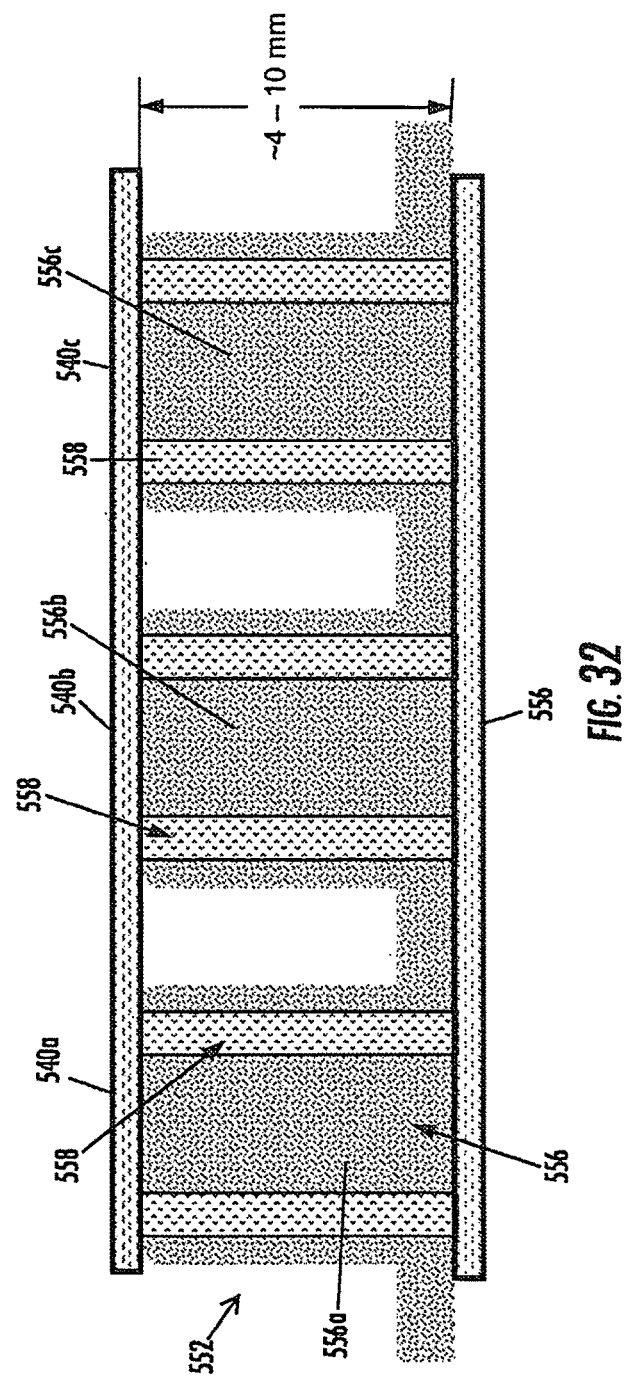

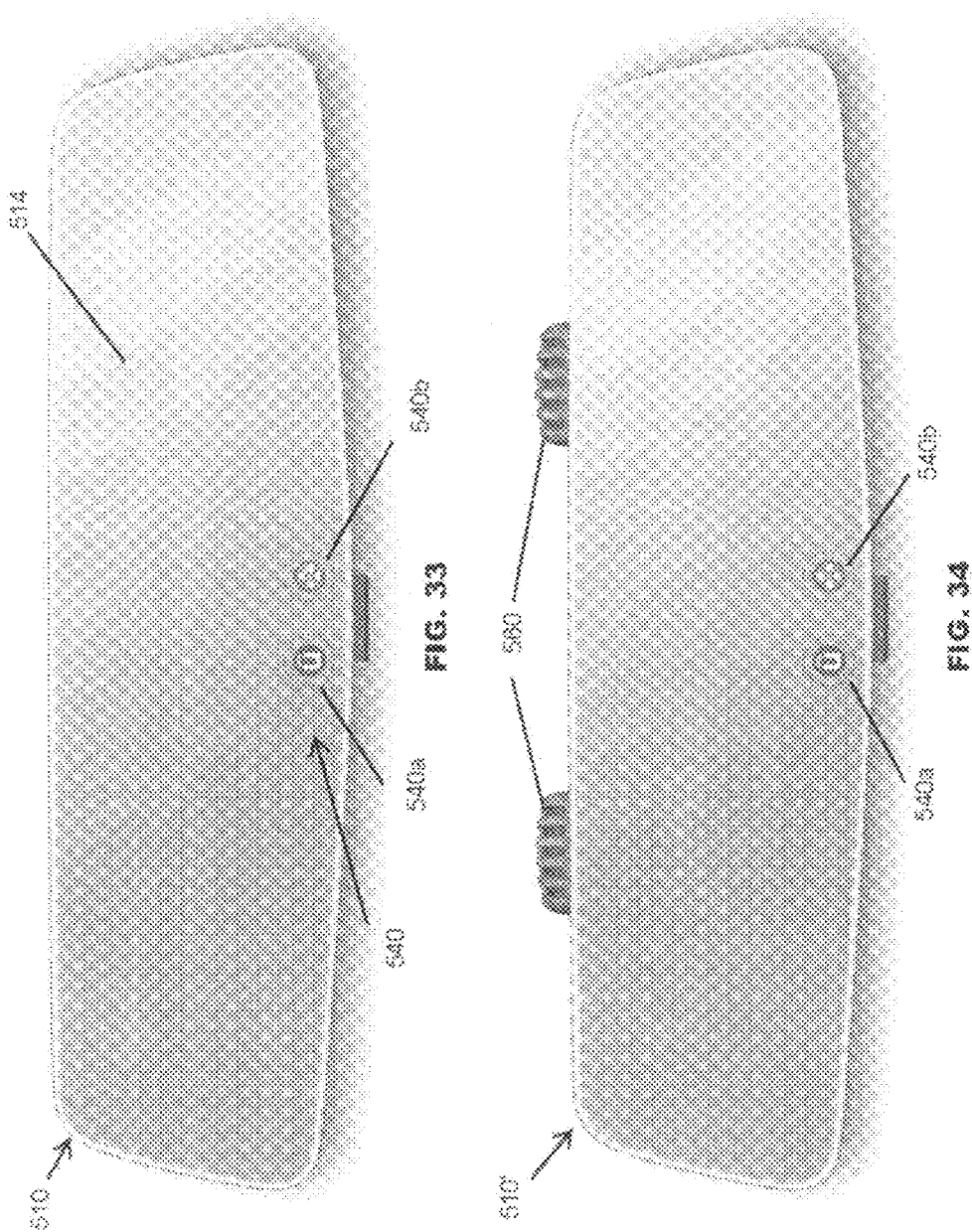

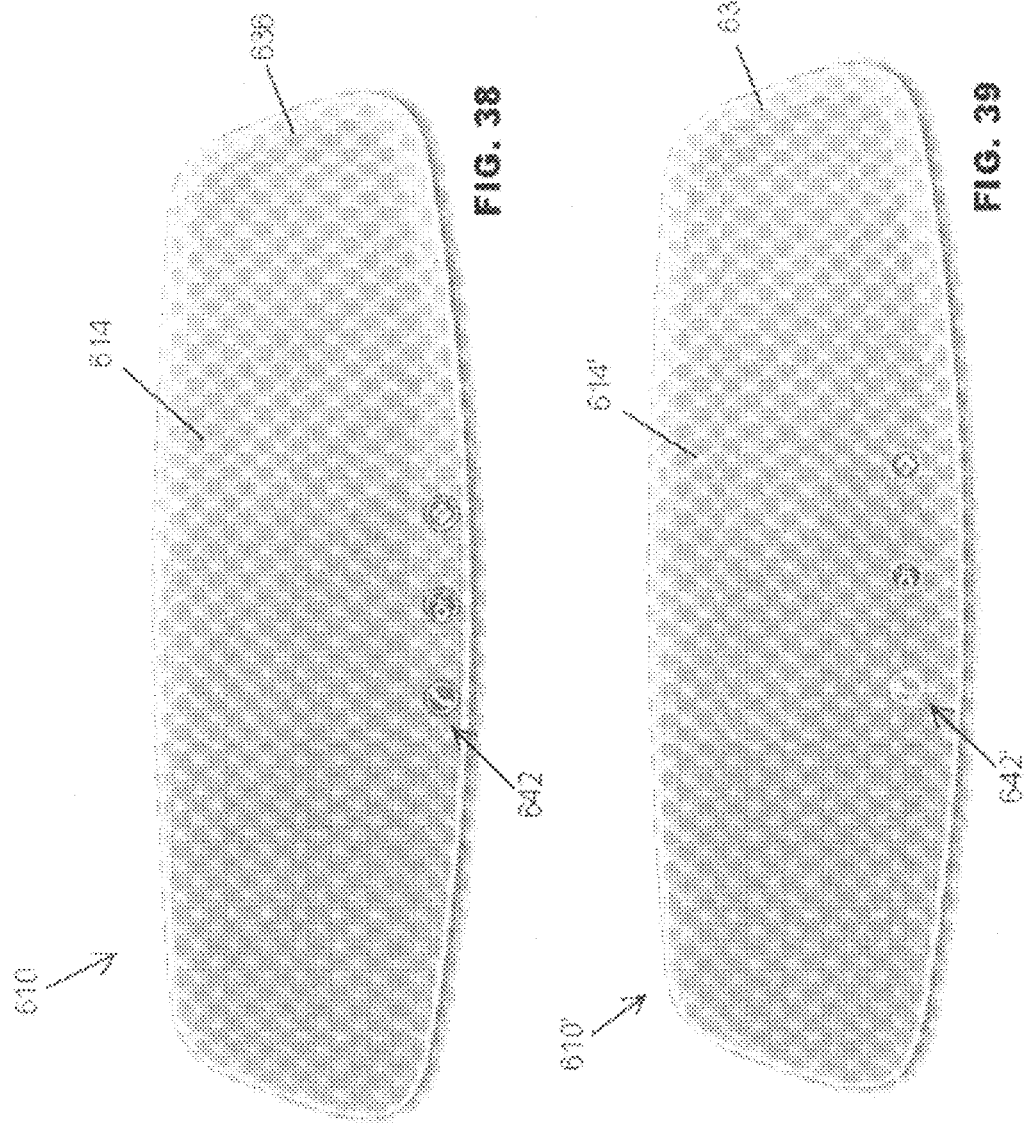

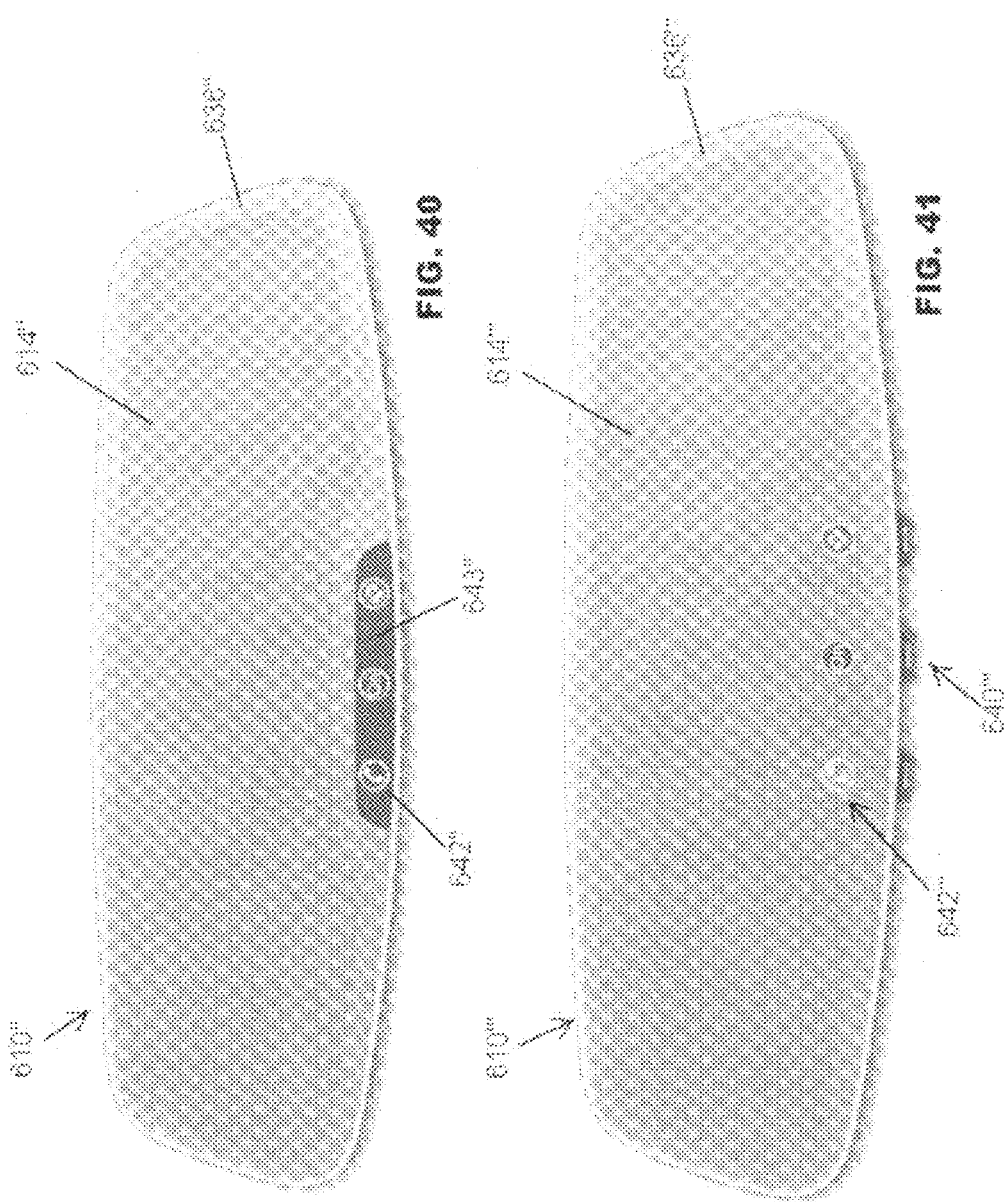

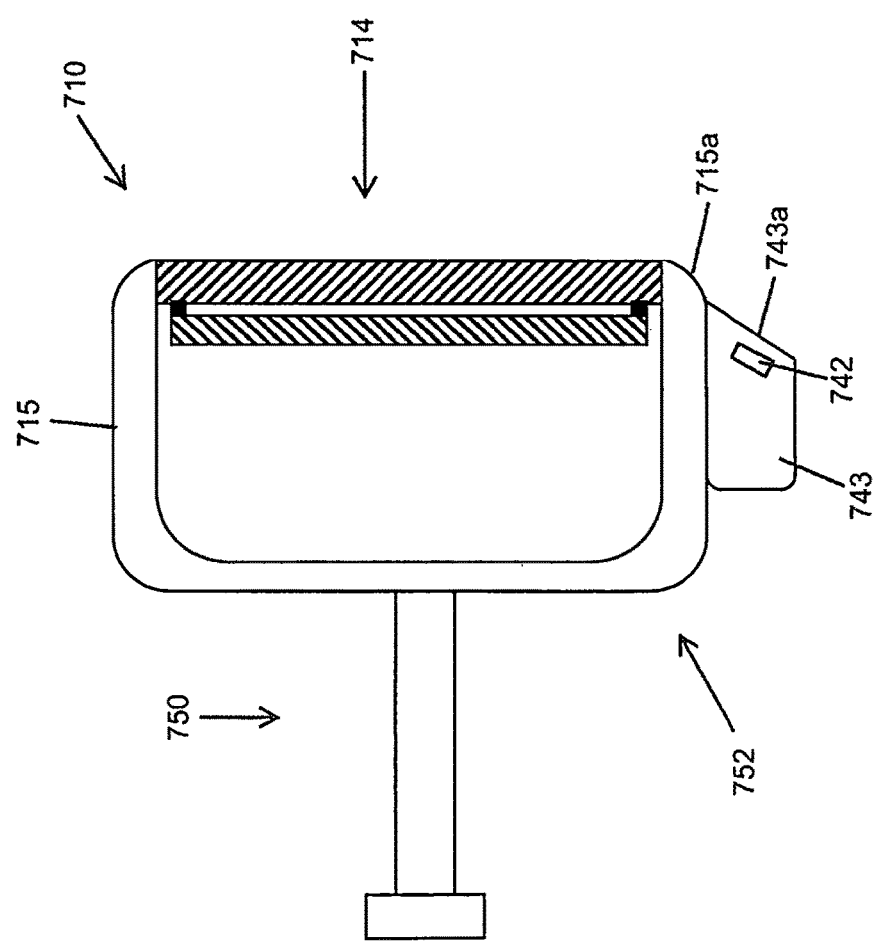

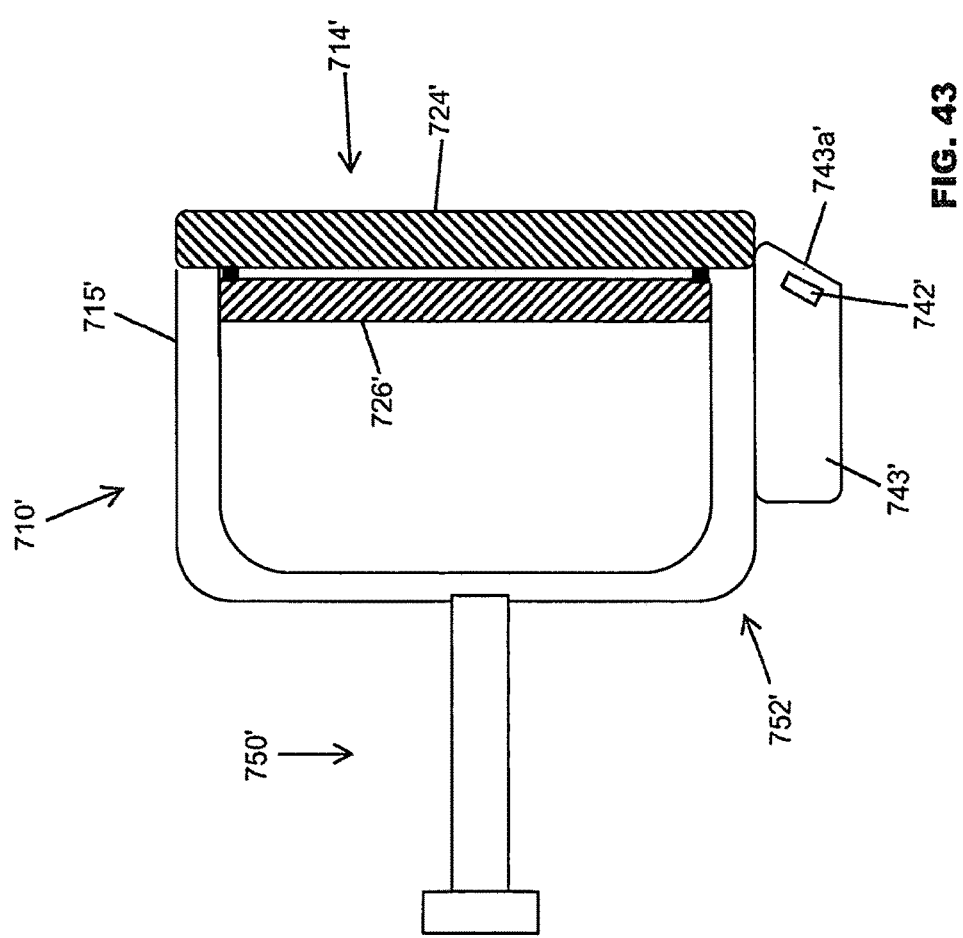

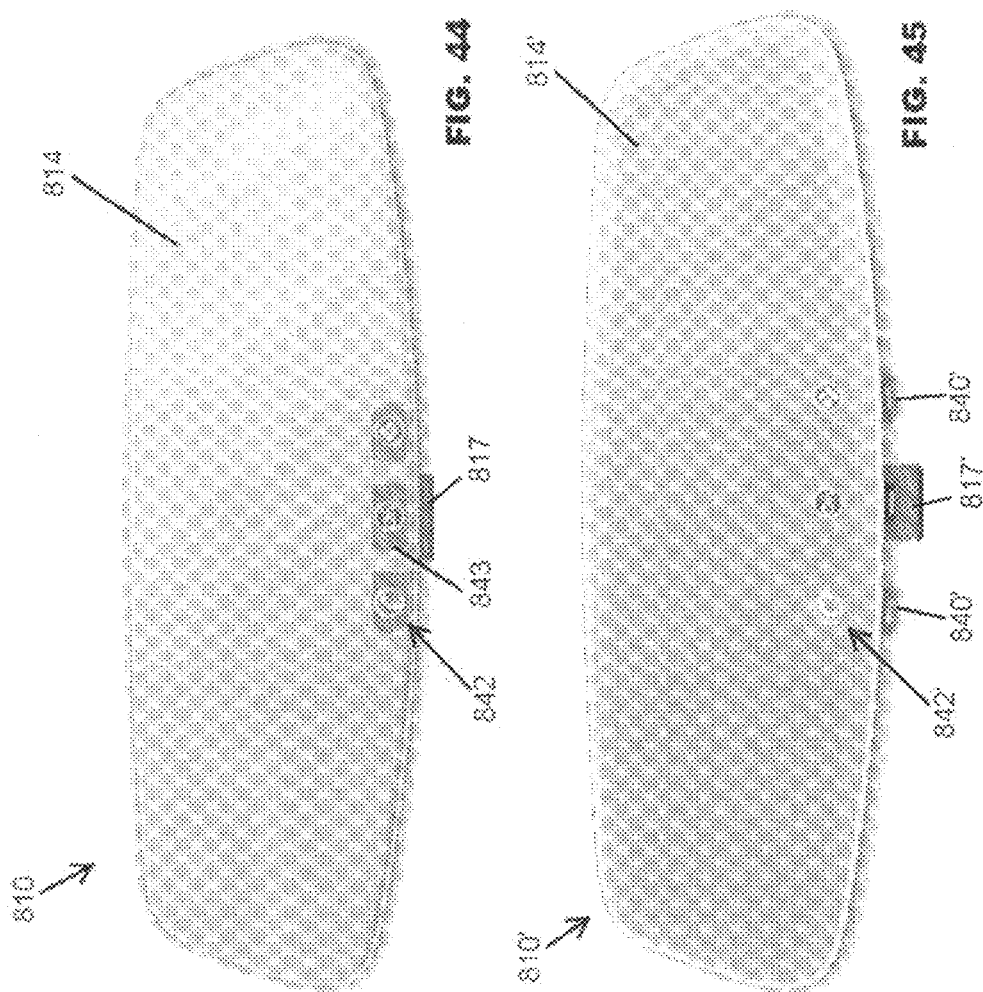

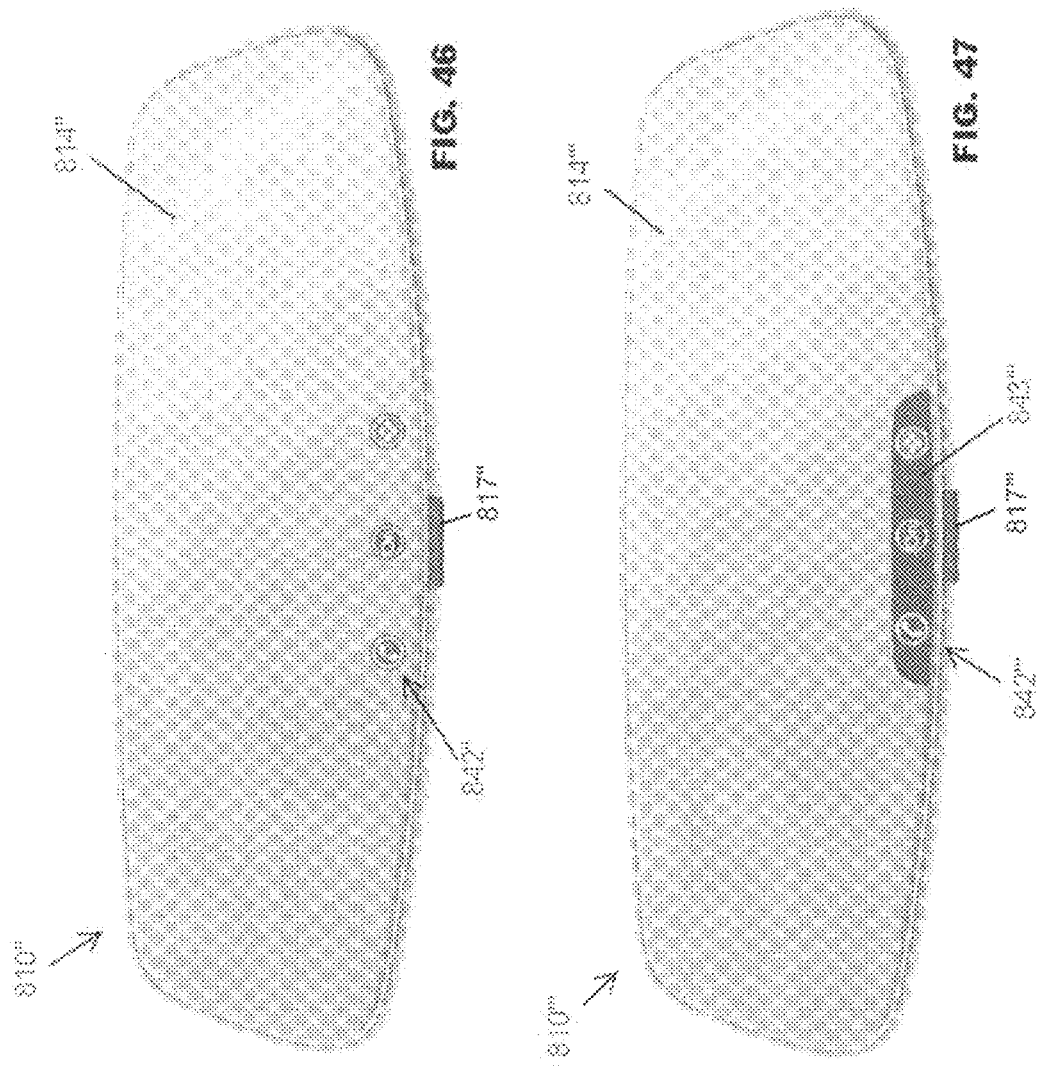

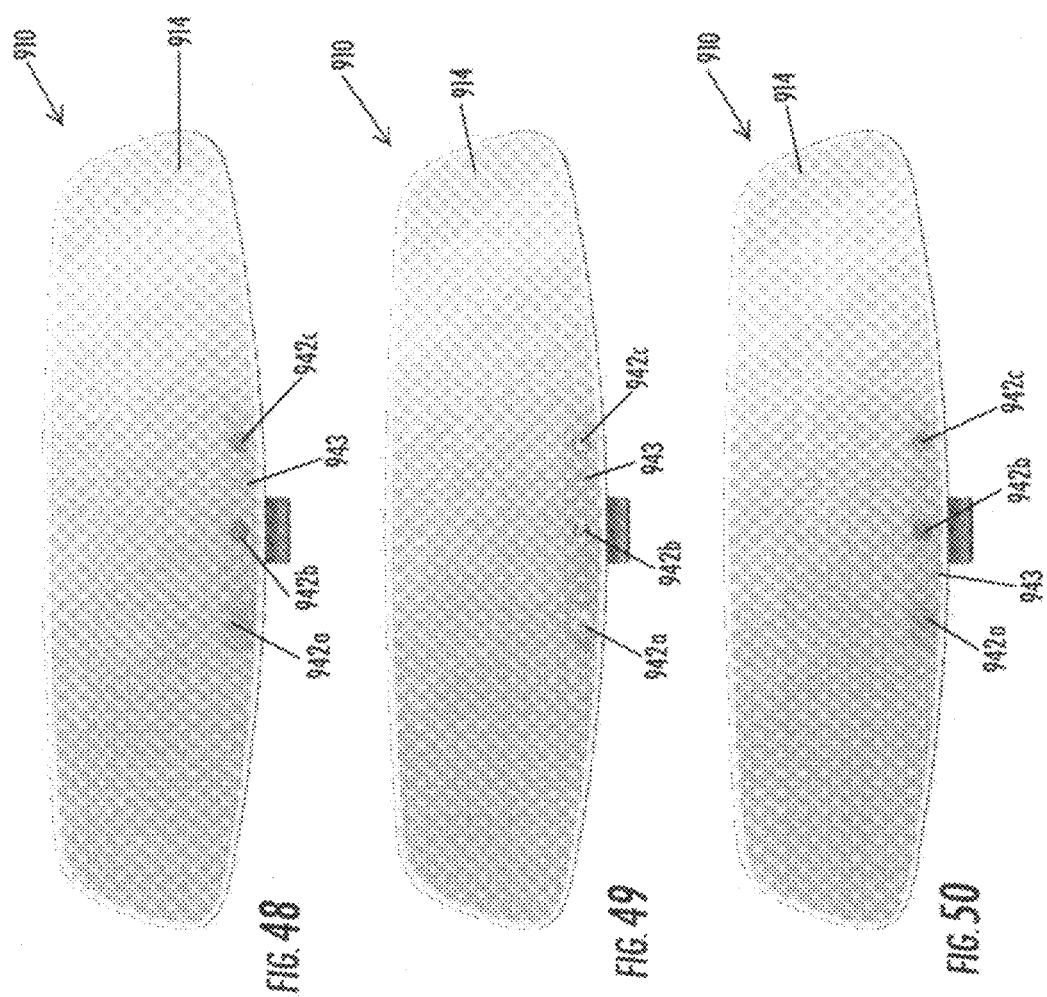

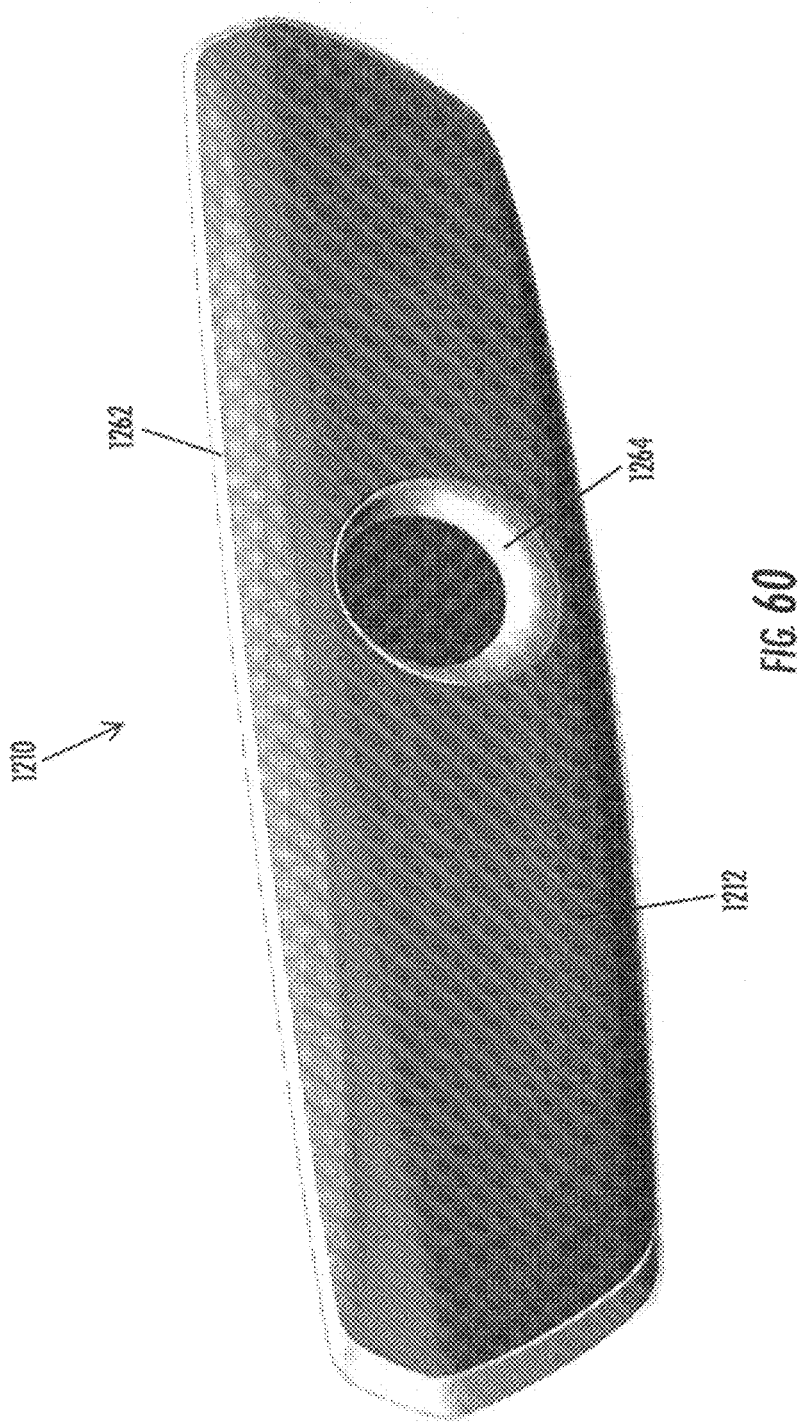

INTERIOR REARVIEW MIRROR ASSEMBLY

CROSS REFERENCE TO RELATED APPLICATIONS

The present application is a 371 national phase entry of PCT Application No. PCT/US2011/056295, filed Oct. 14, 2011, which claims the filing benefits of U.S. provisional applications, Ser. No. 61/490,375, filed May 26, 2011; Ser. No. 61/452,789, filed Mar. 15, 2011; Ser. No. 61/449,364, filed Mar. 4, 2011; Ser. No. 61/448,916, filed Mar. 3, 2011; Ser. No. 61/409,346, filed Nov. 2, 2010, and Ser. No. 61/393,407, filed Oct. 15, 2010, which are all hereby incorporated herein by reference in their entireties.

FIELD OF THE INVENTION

The present invention relates generally to the field of interior rearview mirror assemblies for vehicles and, more particularly, to an interior rearview mirror assembly that has a compass directional heading display.

BACKGROUND OF THE INVENTION

Image sticking is a phenomenon that can occur with a video display and can result in a faint, visible retained image of a persistently displayed image on the video display screen when the image is no longer actively displayed by the video display screen. Image sticking in a video display screen (also known as image retention or image ghosting or image burn-in) results in a faint but visually perceptible outline or image of a previously persistently displayed image (that has remained fixed/unchanged for a prolonged time period) remaining visible even when the previously displayed fixed or largely-fixed image has ceased to be displayed. The retained image can remain visible to/perceptible by a viewer for a prolonged period, and in extreme cases may be permanently visible to/perceptible by a viewer.

For phosphor-based video screens (such as, for example, a CRT or a plasma screen), a burnt-in retained "ghost" image can be a permanent blemish. For liquid crystal video display screens (such as thin film transistor (TFT) video display screens and/or the like), the effect can be reversed such as by operating the screen at an elevated temperature (such as about 30 degrees Celsius to about 55 degrees Celsius) for several hours (such as, for example, two to five hours or more) in "all-black" mode.

Use of the likes of screen savers and automatic power-downs are known methods useful to mitigate/reduce/avoid image sticking in video displays. Use of block patterns and avoidance of distinct lines or the like have also been suggested/used. Use of particular colors (such as grey) and/or avoidance of intense, bright colors for prolonged fixed static displayed images has also been suggested/used. Video screens may be particularly susceptible to image sticking when operated at elevated temperatures to display a static image for a prolonged time period (such as, for example, around 15 to 30 minutes or longer), and avoidance of display of a fixed static image for a prolonged period at an elevated temperature (such as higher than about 30 degrees Celsius) has also been suggested to avoid/mitigate image sticking.

SUMMARY OF THE INVENTION

The present invention provides an interior rearview mirror assembly that includes a video display operable to display a compass heading or directional heading of the vehicle (such as responsive to a compass sensor or the like of the vehicle or mirror assembly or to a global positioning system of the vehicle or the like). For such video mirror displays where the cardinal compass directional display (such as N or S or W or E or the like) or intercardinal compass directional display may be displayed for a prolonged period on the video screen in an interior rearview mirror assembly operated and used in a vehicle, particular challenges not overcome by prior imaging sticking suggested solutions can occur. The video display in accordance with an aspect of the present invention is operable to adjust the displayed compass heading to limit or mitigate or reduce image sticking or ghosting of the compass directional heading display.

According to an aspect of the present invention, an interior rearview mirror assembly for a vehicle includes a mirror reflective element and a video display device disposed behind the mirror reflective element and operable to display information at a display region of the mirror reflective element for viewing by the driver of the vehicle through the mirror reflective element. The video display device is operable to display a compass heading or directional heading of the vehicle at a portion of the display region and is operable to adjust the display of the compass heading or directional heading to limit or reduce or substantially preclude image sticking or ghosting in situations where the compass heading or directional heading may be displayed for a prolonged period of time.

For example, the video display device may change the display location or the portion of the display region at which the compass character or characters are displayed (preferably the change is executed in a manner and by means that are relatively unnoticeable and/or imperceptible to the driver who is operating the vehicle equipped with the interior rearview mirror and compass display), such as every ignition cycle of the vehicle or at the end of a timer cycle, such as every fifteen minutes or thereabouts (or more or less depending on the particular application). Preferably, the displayed cardinal heading (such as N, E, S, W) or inter-cardinal heading (such as NE, SE, NW, SW) may progressively and slightly move left or right or up or down or diagonally over a time duration and within a locale or region of the video display screen of the video mirror such that the change is relatively unnoticeable and/or imperceptible to the driver of the vehicle and such that no same set of illuminated pixels of a multi-pixel video display screen (such as a thin film transistor (TFT) liquid crystal video display screen) remain constantly illuminated to indicate a particular heading character for more than a prescribed time duration, such as for example, two minutes or fifteen minutes or thereabouts (or more or less depending on the particular application). The locale or local region of the display screen within which the cardinal heading (for example, "N") is displayed remains relatively local to where the driver first sees or would have seen or noticed or read the cardinal heading displayed to begin with (e.g., within a two square centimeter display region), such as when the ignition of the vehicle is cycled or when the vehicle is driven in a forwardly direction. Optionally, the video display device may slightly change the display location or the portion of the display region at which the compass character or characters are displayed every time there is a heading change or the like, and may slightly change the display location or the portion of the display region at which the compass character or characters are displayed at the end of a timer cycle, such as every fifteen minutes or thereabouts (or more or less depending on the particular application), in cases where there is no change in direction during the timer cycle. Optionally, the video display device may otherwise change the compass display information, such as by changing the color or intensity of the display or intermittently activating and deactivating the compass display, in order to limit or reduce or substantially preclude image sticking or ghosting.

These and other objects, advantages, purposes and features of the present invention will become apparent upon review of the following specification in conjunction with the drawings.

BRIEF DESCRIPTION OF THE DRAWINGS

FIG. 3 is a front elevation of the reflective element assembly of FIG. 2, with the display device operating to display a compass directional heading at a first location;

FIG. 4 is another front elevation of the reflective element assembly of FIG. 3, with the display device operating to display a compass directional heading at a second location;

FIG. 5 is another front elevation of the reflective element assembly of FIG. 4, with the display device operating to display a compass directional heading at a third location;

FIG. 6 is a front elevation of the reflective element assembly of FIG. 2, with the display device operating to display a compass directional heading;

FIG. 7 is another front elevation of the reflective element assembly of FIG. 2, with the display device operating to display the compass directional heading with a different color and/or different intensity;

FIG. 8 is a sectional view of another reflective element assembly of the present invention, showing a compass display module disposed at a rear surface of the reflective element;

FIG. 10 is a front elevation of the reflective element assembly of FIG. 8, with the display device operating to display a compass directional heading;

FIG. 11 is another front elevation of the reflective element assembly of FIG. 8, with the display device operating to display the compass directional heading as white characters or icons;

FIG. 14 is a sectional view of the mirror reflective element assembly taken along the line A-A in FIG. 13;

FIG. 15 is a sectional view of another mirror reflective element assembly in accordance with the present invention;

FIG. 19 is an enlarged plan view of the dot matrix display of the liquid crystal display screen of FIG. 18A;

FIGS. 20 and 20A-E are views of a light box suitable for use in the compass display unit of the present invention;

FIGS. 21 and 21A-E are views of a reflector suitable for use in the compass display unit of the present invention;

FIG. 24 is a plan view of another interior rearview mirror assembly in accordance with the present invention;

FIG. 25 is a sectional view of the interior rearview mirror assembly of FIG. 24;

FIG. 26 is another plan view of the interior rearview mirror assembly of FIG. 24, shown with a user touching one of the touch pads of the mirror assembly to actuate a user input;

FIG. 27 is another plan view of the interior rearview mirror assembly of FIG. 24, shown with a user grasping the mirror head to adjust the rearward view at the reflective element and touching one of the touch pad areas and other areas of the reflective element;

FIG. 28 is a plan view of a user input portion of an interior rearview mirror assembly of the present invention, shown in daytime lighting conditions;

FIG. 29 is another plan view of the user input portion of FIG. 28, shown in nighttime lighting conditions with the icons and touch pads backlit;

FIG. 30 is an enlarged view of the icons and touch pads useful with an interior rearview mirror assembly of the present invention;

FIG. 31 is a plan view of the touch pad assembly of the interior rearview mirror assembly of FIG. 30;

FIG. 32 is a sectional view of the touch pad assembly of FIG. 31;

FIGS. 33-37 are plan views of other interior rearview mirror assemblies in accordance with the present invention;

FIGS. 38-41 are plan views of other electro-optic interior rearview mirror assemblies in accordance with the present invention;

FIGS. 42 and 43 are sectional views of other electro-optic interior rearview mirror assemblies in accordance with the present invention;

FIGS. 44-47 are plan views of other prismatic interior rearview mirror assemblies in accordance with the present invention;

FIGS. 48-50 are plan views of another interior rearview mirror assembly in accordance with the present invention;

FIG. 60 is a rear perspective view of the interior rearview mirror assembly of FIG. 59.

DESCRIPTION OF THE PREFERRED EMBODIMENTS

Figure 1:
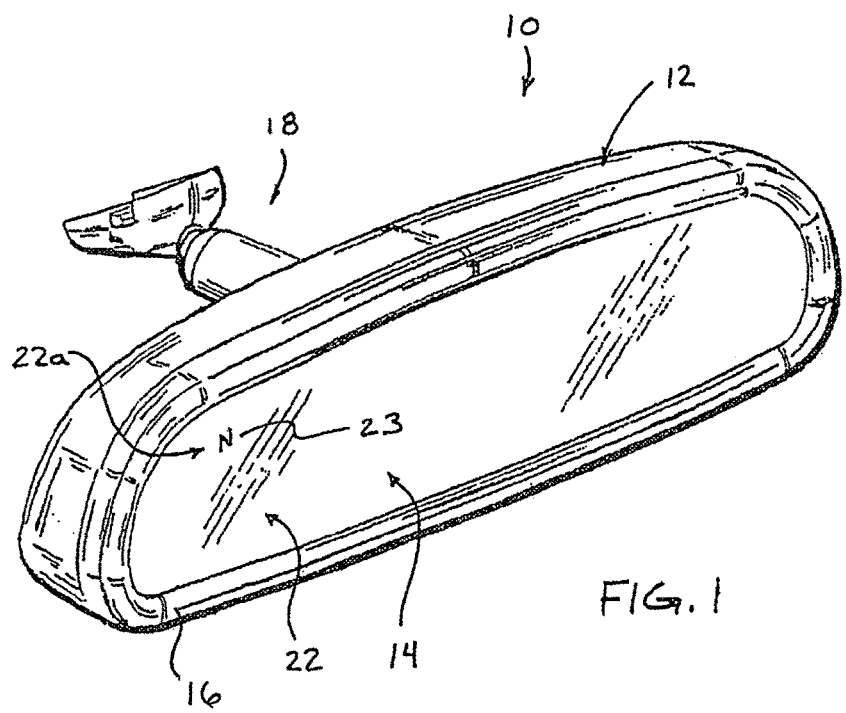
FIG. 1 is a perspective view of an interior rearview mirror assembly in accordance with the present invention.

Referring now to the drawings and the illustrative embodiments depicted therein, an interior rearview mirror assembly 10 for a vehicle includes a mirror casing or housing or shroud or cap or holder 12, a reflective element 14 positioned at a front portion of the mirror casing 12 and a bezel or front casing portion 16 disposed around a periphery of the reflective element. Mirror assembly 10 is adjustably mounted to an interior portion of a vehicle (such as to an interior surface of a vehicle windshield or a headliner of a vehicle or the like) via a mounting structure or mounting configuration or assembly 18. The mirror assembly 10 includes a display device 20 (FIG. 2) that is disposed behind the reflective element 14 and that is operable to display information at a display region 22 of the reflective element for viewing the displayed information through the reflective element by the driver of the vehicle. The display device 20 is operable to display a compass heading or directional heading of the vehicle (such as characters or icons 23 indicative of the directional heading of the vehicle) at a compass display region or portion 22a of the display region 22 of the reflective element 14, as discussed below. The display device 20 may operate to adjust the compass heading or directional heading display to mitigate/reduce/avoid image ghosting or image sticking, as also discussed below.

In the illustrated embodiment, reflective element 14 comprises an electro-optic (such as electrochromic) reflective element (but may comprise a prismatic or wedge-shaped reflective element), and includes a front substrate 24 having a front or first surface 24a (the surface that generally faces the driver of a vehicle when the mirror assembly is normally mounted in the vehicle) and a rear or second surface 24b opposite the front surface 24a, and a rear substrate 26 having a front or third surface 26a and a rear or fourth surface 26b opposite the front surface 26a, with an electro-optic medium 28 disposed between the second surface 24b and the third surface 26a and bounded by a perimeter seal 30 of the reflective element (such as is known in the electrochromic mirror art). The second surface 24a has a transparent conductive coating 32 established thereat, while the third surface 26a has a metallic reflector coating 34 established thereat. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

Figure 2:
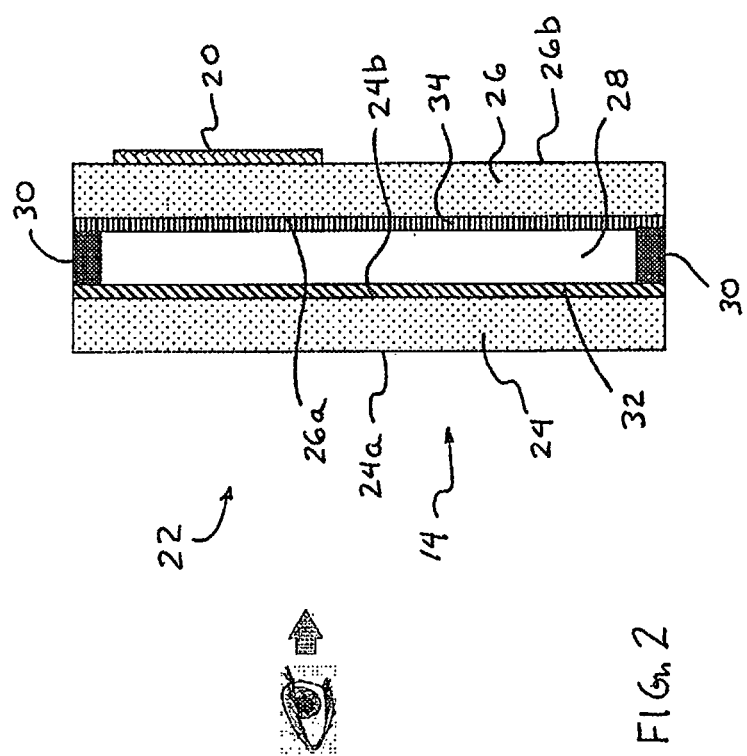
FIG. 2 is a sectional view of a reflective element assembly suitable for use in the interior rearview mirror assembly of FIG. 1.

As shown in FIG. 2, display device 20 is disposed behind the reflective element 14 and is operable to display information for viewing by the driver of the vehicle through the reflective element 14 and through the transflective mirror reflector coating 34. Display device 20 may comprise any suitable display device, such as a video display device, and such as a multi-pixel display screen (such as a thin film transistor or TFT display screen) that is backlit by a plurality of illumination sources, such as a plurality of white light-emitting light emitting diodes or the like. The display device 20 may operate, such as responsive to a compass sensor or compass system of the mirror assembly or vehicle, to display a compass heading or directional heading at a portion of the compass display region 22a. In situations where the compass heading or directional heading of the vehicle may stay the same (or within the tolerance of a particular directional heading or cardinal or intercardinal compass heading so that the displayed heading does not change) for a prolonged period of time, image sticking may occur at the compass display region. Thus, the display device of the present invention is operable to adjust or alter the compass heading display at the compass display region to mitigate or reduce or avoid such image sticking or ghosting.

As shown in FIGS. 3-7, the video display device may be operable to display the compass heading or directional heading character or characters 23 (such as N, S, E, W, NE, SE, SW, NW or the like) at a portion or region 22a of the video display screen and display region 22. The video display device and compass display system may display the compass directional heading responsive to the vehicle being driven in a forward direction of travel (and the compass display may be deactivated or otherwise operate to not display the compass icons or characters when the vehicle is stationary or being driven in reverse, such as responsive to the vehicle gear actuator being moved to a non-drive gear position, such as park or reverse or the like) or responsive to a user input or responsive to a change in the direction of travel of the vehicle or the like. The video display device may be operable to display images captured by a rearward facing camera of the vehicle during a reversing maneuver of the vehicle (such as responsive to the vehicle gear actuator being placed in a reverse gear position or the like) to assist the driver in backing up the vehicle, and may be operable to display the compass heading or directional heading character or icon when the vehicle is not undertaking a reversing maneuver, such as when the vehicle is being driven in a forward direction along a road. The video display device and compass display system may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. 2006/0061008, which are all hereby incorporated herein by reference in their entireties. The compass system may comprise a compass sensor with one or more magnetoresponsive sensing elements and/or may include or utilize a global positioning system of the vehicle or the like to provide the directional heading information or to augment directional heading information determined by a magnetoresponsive compass sensor of the vehicle, such as by utilizing aspects of the compass display systems described in U.S. Pat. No. 7,308,341, which is hereby incorporated herein by reference in its entirety.

In the illustrated embodiments, the video display screen and display region 22 is located at the driver side of the mirror assembly (when the mirror assembly is normally mounted in a vehicle) and the compass display region 22a is at an upper region of the display region 22, so that the compass heading is viewable to the driver of the vehicle generally at the upper left quadrant of the mirror reflective element when the mirror assembly is normally mounted in the vehicle and is viewed by the driver of the vehicle when the driver of the vehicle is normally operating the vehicle. Clearly, the video display device or display screen may be disposed at other locations behind the mirror reflective element and the compass display may be displayed at other regions of the video display screen, without affecting the scope of the present invention. Although the display region 22 and compass display region 22a are shown in FIGS. 3-5 in phantom, it is intended that the borders or boundaries of these regions would not be viewable by or discernible to a person viewing the mirror reflective element when the mirror assembly is normally mounted in the vehicle. Optionally, and desirably, the mirror reflector of the mirror reflective element comprises a transflective mirror reflector that is partially transmissive of visible light therethrough and partially reflective of visible light incident thereon and, thus, the presence of the video display device behind the reflective element is rendered covert by the transflective mirror reflector and information displayed by the video display device is only viewable through the mirror reflector and reflective element when the video display device is activated or backlit to display such information (such as rearward images of a backup assist system of the vehicle during a reversing maneuver of the vehicle or compass heading information and/or temperature information or the like during non-reversing maneuvers of the vehicle, such as when the vehicle is driven in a forward direction of travel or the like) for viewing by the driver of the vehicle when the driver is normally operating the vehicle.

Optionally, and as can be seen with reference to FIGS. 3-5, the present invention may slightly adjust the location of the display of the compass characters or icons so that the display location of the compass characters or icons changes over time to avoid image sticking or ghosting. For example, in FIG. 3, the compass icon or character 23 may be displayed generally centrally in the compass display region 22a, while in FIG. 4, the compass icon or character 23' is displayed at an upper region of the compass display region 22a, and in FIG. 5, the compass icon or character 23" is displayed at a lower region of the compass display region 22a. The compass display region 22a may be selected to be small enough that the change in location or position of the compass icon or character within the compass display region is not readily discernible or noticeable to the driver of the vehicle. For example, the compass display region may be selected to have an area of less than about two square centimeters, more preferably less than about one square centimeter or thereabouts (but could have an area of greater than about two square centimeters while remaining within the spirit and scope of the present invention). Thus, the driver of the vehicle, when the driver is normally operating the vehicle, would not likely notice a change in the display location of the compass character when the compass character is moved within the borders or boundaries of the compass display region 22a.

During operation of the vehicle and the video display system and compass system, if a vehicle is driven in a particular direction, such as, for example, North, the video display device will display the character "N" at the compass display region 22a (and should the vehicle be driven one of South, East or West, the corresponding cardinal compass directional display of S, E or W would be displayed). When displaying the appropriate compass character, such as "N" for North, the vehicle could travel in that direction for a substantial length of time, with no change in the direction of travel of the vehicle that would be significant enough to effect a change in the displayed character or icon (such as to an intercardinal compass directional display, such as "NW" or "NE" or the like). In such situations, ghosting of the character "N" could occur, whereby, if the vehicle's direction of travel changed after the prolonged period of time, the new character (such as, for example, "W" for a westerly direction of travel or a "NW" for a northwesterly direction of travel) would be at or over the ghosted or ghost image of "N", thereby inhibiting the driver's ability to quickly determine the directional heading of the vehicle.

Because the actual absolute position of the "N" (or other character or characters or icon or icons) at the display screen is not important to the driver of a vehicle as long as the compass indicator or icon or character is generally at the expected location or region (such as the upper left quadrant of the mirror reflective element as shown in FIGS. 1 and 3-7), the display device or display system may operate to progressively (and unnoticeably to the driver) slightly move/change the location, of the displayed "N" within a particular region (such as within a 1 cm×1 cm region or the like). For such small changes in the location of the displayed character or icon, the driver of the vehicle would have no cognitive recognition of the change while the driver is normally operating the vehicle. Over a prolonged period of time, the system may change the location of the displayed character or icon, and optionally may also modulate the intensity of the displayed character or icon, in order to reduce the period of time between the positional or locational adjustment of the displayed character or icon, while still limiting or reducing or substantially precluding image sticking or ghosting of the displayed compass character or icon.

The compass and display system may alter or adjust the location of the displayed compass character or icon in a selected manner. For example, the system may slightly change the location of the displayed compass character on the video display screen or TFT screen every ignition cycle of the vehicle (so that every time the driver starts the vehicle and travels in a forward direction, the displayed compass character may be at a slightly different location as compared to the previous ignition cycle). Optionally, for example, the system may slightly change the location of the displayed compass character on the video display screen or TFT screen every time there is a detected heading change of the vehicle that is significant enough that the compass system would, responsive to the detected heading change, change the display to a different compass heading character or icon (such as change the display from an "N" to a "NW" or "W" or the like). Optionally, for example, when the compass display operates to display the same character for a prolonged period of time, and during such period of time there is not a new ignition cycle or a detected significant heading change, the system may slightly change the location of the displayed compass character on the video display screen or TFT screen episodically, such as at the end of a repeating timer cycle, such as every 15 minutes or the like (or other selected time period depending on the particular application of the display system). The location change of the displayed character or icon may be within a predetermined compass display region or boundary and the displayed character may be moved within such region or boundary in any selected or random pattern, while remaining within the spirit and scope of the present invention.

The video display screen may comprise any suitable video display screen (such as the types discussed below), and may comprise a "wide screen" display screen, such as a 16×9 ratio of width to height display screen, with a cross diagonal dimension of greater than about 3 inches and less than about 5 inches. For a typical compass display at an interior rearview mirror, there is a zone or region at which the driver expects the compass display to be located. The compass display zone or region dim may comprise a square or rectangular region, such as about a 2 cm by 2 cm region or thereabouts (or more or less depending on the particular application). If the adjustment or movement of the displayed compass character or icon within or across the compass display region is too rapid, then the displayed compass character may appear to be moving to the driver of the vehicle (which may distract the driver), but if the adjustment or movement of the displayed compass character is accomplished over an extended period of time, such as ten minutes or thereabouts (such as at a rate of about 1 cm or less per 10 minutes or the like), the driver will not notice the movement of the displayed compass character.

Optionally, and with reference to FIGS. 6 and 7, the system may also or otherwise adjust or alter or modulate the intensity of the displayed compass character 23. For example, and as shown in FIG. 6, the compass character 23 may be displayed at a selected or appropriate intensity (such as depending on the ambient light at the vehicle and/or the degree of dimming/reflectance of the electro-optic reflective element or cell or the like) for viewing by the driver of the vehicle. The system may, such as after a period of time has elapsed with the displayed character being displayed at that intensity and location, adjust or modulate the intensity of the displayed character, such as by dimming the intensity of the displayed compass character 23''' such as shown in FIG. 7 (and/or optionally by changing the color of the displayed character or icon). Optionally, the compass and display system may adjust the location of the displayed compass character episodically, as discussed above, and may adjust the intensity of the displayed compass character during the timer cycle and between movements of the displayed compass character. Such an additional modulation of the displayed compass character may allow for a longer period of time between movements of the displayed compass character (such as allowing for a longer cycle time of, for example, 20 minutes or more), while still limiting or reducing or substantially precluding image sticking or image ghosting of the compass character or icon on the video display screen. Optionally, the compass and display system may also or otherwise adjust or modulate the displayed compass character to reduce or limit or substantially preclude image sticking or ghosting, while remaining within the spirit and scope of the present invention. For example, the compass and display system may adjust the size of the displayed compass character or shape or font or color of the displayed compass character (either alone or in combination with adjustment of the location and/or intensity of the displayed compass character) over a period of time to limit or reduce or substantially preclude image sticking or ghosting at the compass display region.

For a typical video display screen in an interior rearview video mirror of a vehicle for a vehicular rear camera backup assist system (that displays video images captured by a rearward facing camera of the vehicle when the driver of the vehicle is undertaking a reversing maneuver), the video display screen may comprise a multipixel backlit TFT liquid crystal video display screen, and may be backlit by a plurality of light sources or light emitting diodes, and preferably such as white light-emitting light emitting diodes or the like, such as an array of at least about 20, more preferably at least about 30 and more preferably at least about 60 white light-emitting light emitting diodes. For example, a video display screen may have a diagonal dimension from about 3.3 inches to about 3.5 inches or thereabouts, or larger, such as from about 4.3 inches or 4.5 inches or more, though for use in a typical interior rearview mirror assembly, a diagonal dimension of less than about 4.7 inches may be preferred due to packaging and other constraints). Such video display screens may have, for example, 480×272 RGB pixels and a 16:9 aspect ratio or may have more RGB pixels and/or different dimensions and/or aspect ratios. Preferably, the video display screen may have at least about 100,000 pixels. Such a video display screen may be disposed at the driver side (or elsewhere) of the interior rearview mirror assembly and may emit illumination or information that is viewable by the driver of the vehicle through the mirror reflector of the mirror reflective element of the interior rearview mirror assembly when the mirror assembly is normally mounted in a vehicle.

During a backup maneuver or event, it is desirable that the entire video display screen be used and is backlit to be as bright as possible. Thus, the backlighting array of LEDs is energized to provide a high intensity (such as greater than about 30,000 cd/m$^2$), uniform backlighting at the rear of the backlit video display screen, such as by utilizing aspects of the display systems described in U.S. Pat. No. 7,855,755, which is hereby incorporated herein by reference in its entirety. The video display screen provides high intensity, true color or full color (across the range of colors) video images for viewing by the driver of the vehicle through the mirror reflector of the mirror assembly during the backup maneuver (and at a display intensity of at least about 1,000 cd/m$^2$, more preferably at least about 2,000 cd/m$^2$ as viewed by the driver of the vehicle when viewing the mirror reflective element when the mirror assembly is normally mounted in the vehicle). Such high intensity, true color video images are desirable for backup maneuvers because the driver needs to be able to see the images clearly and discern objects or persons or the like rearward of the vehicle during the reversing maneuver. During such reversing maneuvers, it is desirable that the video display screen be backlit by highly intense and highly uniform light across the entire area of the video display screen. The backlighting LEDs may be selected to have a wide angle light emitting angle of up to about 180 degrees, or a narrower angle that channels or concentrates the emitted light, to emit the light and backlight the video display screen in a uniform manner across the entire area of the backlit video display screen.

Such as described in U.S. Pat. Nos. 5,949,331 and 6,222,447 (which are hereby incorporated herein by reference in their entireties), video-based or camera-based rear backup systems may display rearward video images when the reverse gear of the vehicle is engaged to commence a rear backup maneuver and may cease to display the rearward video images when the reverse gear of the vehicle is not engaged. Such vehicular video display systems may utilize, for example, a decoder, such as a Techwell 8817 decoder available from Techwell Inc. of San Jose, Calif., or other suitable decoder, at the video display screen and may receive standard video signals, such as NTSC signals or PAL signals or the like, from one or more cameras of the vehicle, such as a rearward facing camera at or near the rear of the vehicle. When the vehicle is normally traveling in a forward direction, the video display screen is not used to display the video images captured by the rearward facing camera, and instead may display the compass heading or directional heading characters or icons, typically responsive to a compass system of the vehicle, such as a compass system of the mirror assembly itself. Such directional heading characters need not be displayed at the high intensity of the backup video images (such as viewed through a transflective mirror reflector of the mirror reflective element of the mirror assembly), because the driver only needs to be able to cognitively recognize or discern the displayed characters upon a casual glance at the mirror reflective element while driving the vehicle forwardly along a road or highway. Thus, the backlighting LED or LEDs used to backlight the backlit video display screen to display the compass heading may be operated at a lower power and/or lower intensity, such as at about half (or more or less) of the power/intensity of the LEDs when operated for displaying rearward video images during a reversing maneuver of the vehicle (yet, for applications where the same LEDs operate to display the backup assist video images and to display the compass characters, the LEDs are operable, at any moment in time, such as when the vehicle gear actuator is moved to a reverse gear position, to provide full power and intensity for providing a high intensity backup assist video display). For example, the intensity of an LED or LEDs when used to display the directional heading characters during forward driving of the vehicle may be less than or substantially less than the intensity of those same LEDs when they are used to backlight the backlit video display screen to display video images during a reversing maneuver of the vehicle. The compass display thus cognitively becomes "invisible" to the driver of the vehicle as he or she blanks it out and ignores it unless he or she is looking for the compass display. The intensity of the compass display is selected to be low enough that the driver may readily ignore the compass display yet bright enough that the driver may, at a quick or casual glance at the compass display region, readily discern the displayed character and characters and become cognitively aware of the direction of travel of the vehicle.

The compass heading or directional heading display may be of a cardinal or intercardinal compass heading and may be displayed at a desired size and color, depending on the application. For example, the directional heading display may be selected to be displayed as white characters or non-white or colored characters (such as red, amber, black, blue etc.), and the color may be selected to match a "corporate color" of the vehicle manufacturer (such as amber or orange for BMW or red for Pontiac or the like) or may be selected in accordance with the consumer's personal preferences or the like. Clearly, other colors or intensities could be selected for displaying the compass/directional heading characters while remaining within the spirit and scope of the present invention. Such LEDs may comprise any suitable LEDs, and may, for example, comprise a TOPLED Enhanced Thinfilm LED, such as a TOPLED Enhanced Thinfilm LED commercially available from OSRAM Opto Semiconductors of Regensburg, Germany, and/or of Sunnyvale, Calif. USA, and/or of Hong Kong, and such as available from OSRAM Opto Semiconductors under model numbers LS T67F, LR T67F, LA T67F, LO T67F, LY T67F and/or the like. For example, for a BMW vehicle, an orange LED or LEDs may preferably be used to provide the desired display color.

Typically, the size of the displayed compass beading cardinal character (N, E, S, W) may be at least about 4 mm high and preferably is about 10 mm high and about 7-8 mm wide (and about 14-20 mm wide for intercardinal characters NE, SE, SW, NW). Such a 10×7 mm (or 10×15 mm) directional heading character (or characters) may be moved sideways and vertically within the compass display area (which may be about 15 mm high or more and 20-25 mm wide or more) to avoid image sticking or ghosting as discussed above. For such a 10 mm high and 7-8 mm wide character display area and for a 480×272 RGB pixel multipixel video display screen, the size of the displayed compass beading may be about 12 pixels wide and 18 pixels tall, with the lines (such as the upstroke of an "N") of the characters being about 2-3 pixels wide (if an intercardinal character (NE, SE, SW, NW) is displayed, the width of the two side-by-side displayed characters may be about 24 pixels wide). Thus, it is desirable that the compass display characters move (such as in the manner described above) at least about 2 pixels to either side (and/or diagonally or upwardly/downwardly) to limit or reduce or substantially preclude image sticking or ghosting.

Typically, the video mirror video display screen will be backlit by a plurality of LEDs, such as, for example, an array of 32 or 64 LEDs or the like, and such as multiple banks or sub-arrays of LEDs. During forward driving of the vehicle, the video display screen may be operable to only energize an array or sub-array or bank of LEDs that is at or behind the compass display region (such as at the upper left quadrant of the video display screen to a person viewing the display area at the front of the mirror reflective element when the mirror assembly is normally mounted in a vehicle). The activated LEDs backlight the display screen at the upper left quadrant of the video display region, and the video display screen displays the directional heading characters at the compass display region.

Optionally, the mirror assembly and video display screen may include one or two (or more) discreet dedicated LEDs at the compass display region, whereby, when the system is operating in the compass display mode (such as when the vehicle is traveling in a forward direction), the system may activate or energize only those discreet dedicated LEDs to backlight the directional heading characters so the driver can view the directional heading character while normally operating the vehicle. Such discreet dedicated LEDs may be operated at a lower power than the banks or arrays of LEDs at the video display screen, and allow for displaying the compass heading information or characters at a reduced power. Optionally, the discreet dedicated LEDs may comprise one or more white or colored LEDs (such as amber or red or blue or the like), and the video display screen may allow for the color to show through so that the driver views the colored compass heading characters at the compass display region of the reflective element. The discreet dedicated LED or LEDs may be selected to have a greater light emitting angle or cone to backlight the compass display area and thus backlight the compass heading characters as they are moved around the compass display area. For example, the light emitting cone may have a principal light emitting angle of around 120 degrees and may be more suited for flood lighting or wide angle lighting than the high intensity LEDs for backlighting the entire video display screen during a reversing maneuver of the vehicle. The discreet dedicated LED or LEDs thus may backlight the compass display region utilizing only one or two LEDs to reduce power consumption, heat generation and the like at the mirror assembly during forward driving of the vehicle, while the backlit video display screen may move the character display in any direction within the backlit compass display region to limit or reduce or substantially preclude image sticking or ghosting of the compass heading or directional heading display characters when the vehicle is traveling in the same or generally the same direction or heading for a prolonged period of time.

For example, for a video mirror disposed in or normally mounted in the same vehicle and on the same road and at the same time and place (such as, for example, in a vehicle at noon in Tucson Ariz. in the summer), when in a reversing situation, the display intensity of the displayed rearward video images (as viewed through the transflective mirror reflector of the mirror reflective element when the mirror assembly is normally mounted in the vehicle) may be greater than about 2,000 cd/m² to provide the desired viewability of the displayed video images in all lighting conditions. After the reversing maneuver, and when the vehicle is being normally driven in a forward direction of travel (for example, driving a convertible along a road at noon in Tucson Ariz. in the summer), the display intensity of the compass heading characters or icons may be less or substantially less than the backup assist video display intensity, such as about ½ of the backup assist display intensity or less than about ½ of the backup assist display intensity, thereby reducing or minimizing heat generation and power consumption by the video display device (which may be of particular importance in electric vehicle applications).

Thus, the compass display system of the present invention adjusts or moves or modulates the displayed compass character displayed by the video display screen in a manner that limits or reduces or substantially precludes or avoids the image sticking or image ghosting that may otherwise occur if the compass icon or character is displayed without change for a prolonged period of time. The compass display system of the present invention operates to adjust or move or modulate the displayed compass character in a manner that is not readily discernible or cognitively recognizable to the driver of the vehicle when the driver is normally operating the vehicle and driving the vehicle forwardly along a road.

The reflective element 14 and mirror casing 12 are adjustable relative to the mounting arm or pivot assembly 18 to adjust the driver's rearward field of view when the mirror assembly is normally mounted at or in the vehicle. The mirror assembly includes a socket or pivot mount that may receive a ball member of a mounting arm of the pivot assembly or mounting structure 18, such as a double pivot or double ball mounting structure or a single pivot or single ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860; and/or 6,483,438, and/or U.S. patent application Ser. No. 11/226,628, filed Sep. 14, 2005 and published Mar. 23, 2006 as U.S. Pat. Pub. No. US-2006-0061008, and/or PCT Application No. PCT/US2010/028130, filed Mar. 22, 2010, which are hereby incorporated herein by reference in their entireties). The mounting assembly may have a ball or socket element mounted to or attached to or established at a mirror attachment plate or backing plate (which may optionally include or incorporate circuitry thereat or thereon) that is attached at the rear surface of the mirror reflective element (optionally with a mirror casing disposed over or receiving the attachment plate or with a cap portion of a mirror assembly attaching to the backing plate or the like, such as by utilizing aspects of the mirror assemblies described in U.S. Pat. No. 7,289,037, which is hereby incorporated herein by reference in its entirety), or the mounting assembly may have a ball or socket element mounted to or attached to or established at a portion of the mirror casing (or to an attachment element disposed at or in the mirror casing), where the ball or socket or pivot joint element pivotally attaches to a mounting arm or mounting structure that attaches to an interior portion of the vehicle, such as an inner surface of the vehicle windshield or the like.

In the illustrated embodiment, mounting assembly 18 comprises a double-ball or double-pivot mounting assembly whereby the reflective element and casing are adjustable relative to the vehicle windshield (or other interior portion of the vehicle) about a pair of pivot joints. Mounting assembly 18 includes a base portion or mounting base and a mounting arm, with the reflective element 14 and mirror casing 12 pivotally mounted at one end of mounting arm about a mirror ball pivot joint (such as a ball and socket joint or the like) and the mounting arm pivotally mounted at the mounting base at the other end of the mounting arm about another or second mirror ball pivot joint (such as a ball and socket joint or the like) that allows for a driver of the vehicle to which mirror assembly 10 is mounted to adjust the reflective element to adjust the rearward field of view of the driver. Optionally, the mounting assembly may comprise other types of mounting configurations, such as a single-ball or single-pivot mounting configuration or the like, while remaining within the spirit and scope of the present invention.

In the illustrated embodiment, the mounting base is configured to be attached to an interior surface of a vehicle windshield (such as to a mounting button or attachment element adhered to the interior surface of the vehicle windshield). The mounting base may be mounted to a mounting button or attachment element at the vehicle windshield via a breakaway mounting construction, such as by utilizing aspects of the mounting constructions described in U.S. Pat. Nos. 5,820,097 and/or 5,100,095, which are hereby incorporated herein by reference in their entireties. The mounting arm may comprise a molded (such as injection molded) polymeric mounting arm or may be otherwise formed, depending on the particular application of the mirror assembly (and may utilize aspects of the mounting assemblies described in U.S. Pat. Nos. 6,318,870; 6,593,565; 6,690, 268; 6,540,193; 4,936,533; 5,820,097; 5,100,095; 7,249, 860; 6,877,709; 6,329,925; 7,289,037; 7,249,860; and/or 6,483,438, and/or U.S. patent application Ser. No. 11/226, 628, filed Sep. 14, 2005 and published Mar. 23, 2006 as U.S. Pat. Pub. No. US-2006-0061008, and/or PCT Application No. PCT/US2010/028130, filed Mar. 22, 2010, which are hereby incorporated herein by reference in their entireties).

Optionally, the compass sensor and circuitry for the compass and display system or device may be commonly disposed at or established at a circuit element, such as a printed circuit board or the like, at the rear of the display screen or device. For example, and with reference to FIG. 8, an interior rearview mirror reflective element assembly 110 has a compass display device or module or block 120 (such as a self-contained video and compass display module) disposed behind the reflective element 114 and that is operable to display information at a display region 122 (FIG. 10) of the reflective element 114 for viewing the displayed information through the reflective element by the driver of the vehicle. The display device 120 is operable to display a compass heading or directional heading of the vehicle (such as characters or icons 123 indicative of the directional heading of the vehicle) at a compass display region or portion 122a of the display region 122 of the reflective element 114, such as shown in FIG. 10 and such as in a similar manner as discussed above.

In the illustrated embodiment of FIG. 8, reflective element 114 comprises an electro-optic (such as electrochromic) reflective element (but may comprise a prismatic or wedge-shaped reflective element), and includes a front substrate 124 having a front or first surface 124a (the surface that generally faces the driver of a vehicle when the mirror assembly is normally mounted in the vehicle) and a rear or second surface 124b opposite the front surface 124a, and a rear substrate 126 having a front or third surface 126a and a rear or fourth surface 126b opposite the front surface 126a, with an electro-optic medium 128 disposed between the second surface 124*b* and the third surface 126*a* and bounded by a perimeter seal 130 of the reflective element (such as is known in the electrochromic mirror art). The second surface 124*a* has a transparent conductive coating 132 established thereat, while the third surface 126*a* has a metallic reflector coating 134 established thereat. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

As shown in FIG. 8, display device 120 is disposed behind the reflective element 114 (such as at the fourth or rear surface 126*b* of the rear substrate 126) and is operable to display information for viewing by the driver of the vehicle through the reflective element 114 and through the transflective mirror reflector coating 134. Display device 120 may comprise any suitable display device, such as a video display device, and such as a multi-pixel display screen (such as a backlit dot matrix liquid crystal display or a thin film transistor or TFT display screen) that is backlit by a plurality of illumination sources, such as a plurality of white light-emitting light emitting diodes or the like. In the illustrated embodiment, the display device 120 comprises a display module having a display screen 120*a* (such as a multi-pixel LCD screen backlit by a plurality of LEDs) and a circuit element 120*b* (such as a printed circuit board or the like, such as a silicon substrate having circuitry established thereon) disposed at the rear of the display screen 120*a*. Circuit board 120*b* has circuitry established thereat (such as by establishing the circuitry at or on a silicon substrate using CMOS technology or the like), and such circuitry may include a compass sensor 120*c* (having at least two magnetoresponsive sensors) and circuitry 120*d* for controlling the display functions, compass operation and optionally for controlling the dimming or variable reflectance of the reflective element. The circuit board 120*b* may also have a photo sensor 120*e* established thereat for detecting or sensing the light (such as ambient light or glare light) at the display device 120.

Figure 22:
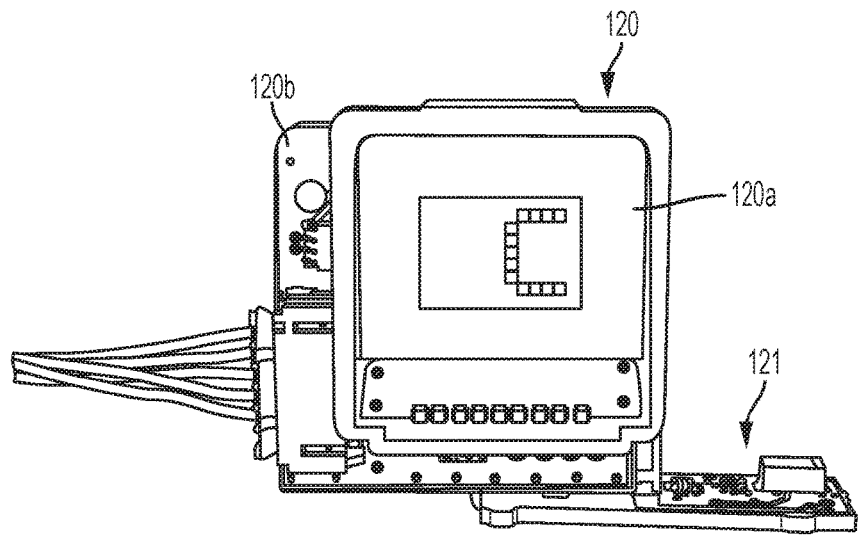
FIG. 22 is a plan view of a compass display unit of the present invention, showing a white character displayed by the display screen.
Figure 23:
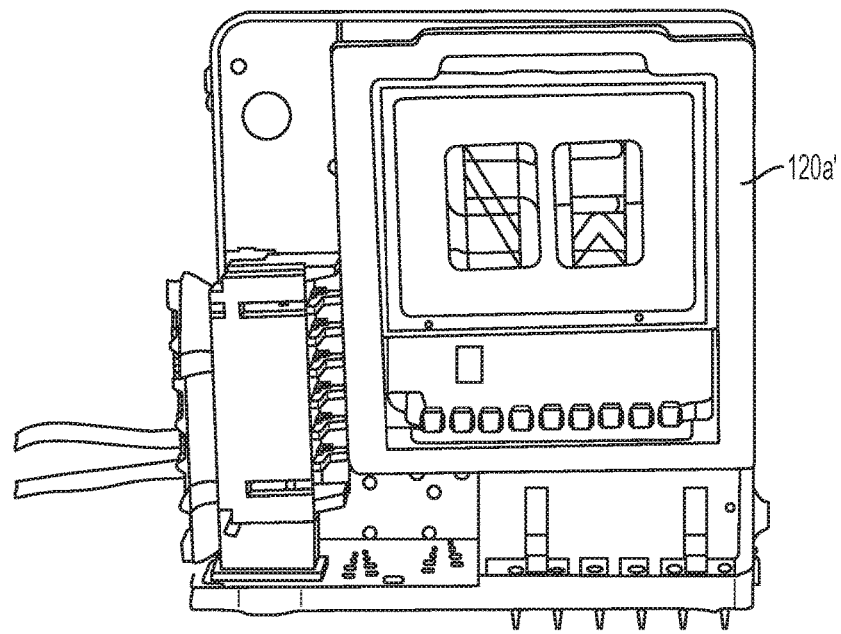
FIG. 23 is a plan view of another compass display unit of the present invention, shown with a standard liquid crystal display screen.

Optionally, the mirror reflective element assembly 110 may include another circuit element or printed circuit board 121 disposed at the rear surface 126*b* of the rear substrate 126 of the reflective element 114, wherein the circuit board 121 may have a power connector 121*a* (such as a multi-pin connector for connecting to a wiring harness of the vehicle when the mirror assembly is normally mounted in the vehicle) and/or power supplies and/or power/control circuitry 121*b* or the like for EC dimming or controlling of the variable reflectance of the mirror reflective element. Although shown as being disposed at a separate daughter or sister circuit board at the rear of the reflective element, it is envisioned that the power circuitry and/or connector and/or the like may be disposed at or incorporated in or at the circuit board 120*b* of display device 120, while remaining within the spirit and scope of the present invention. Optionally, and as shown in FIG. 22, the daughter board 121 may be disposed at a rear portion and/or lower portion of the circuit board 120*b* and may be oriented so as to be generally normal to the circuit board 120*b* (thus allowing for generally horizontal arrangement of compass sensing elements disposed on the daughter board 121 when the mirror assembly incorporating the compass display unit 120 is normally mounted in a vehicle). Optionally, the daughter board or other printed circuit board may be otherwise disposed at or near or on the circuit board of the compass display unit, such as in a parallel manner with respect to the printed circuit board 120*b*, while remaining within the spirit and scope of the present invention, or may be disposed separate from the compass display unit or the circuitry of the daughter board may be established at the printed circuit board of the compass display unit.

Figure 9:
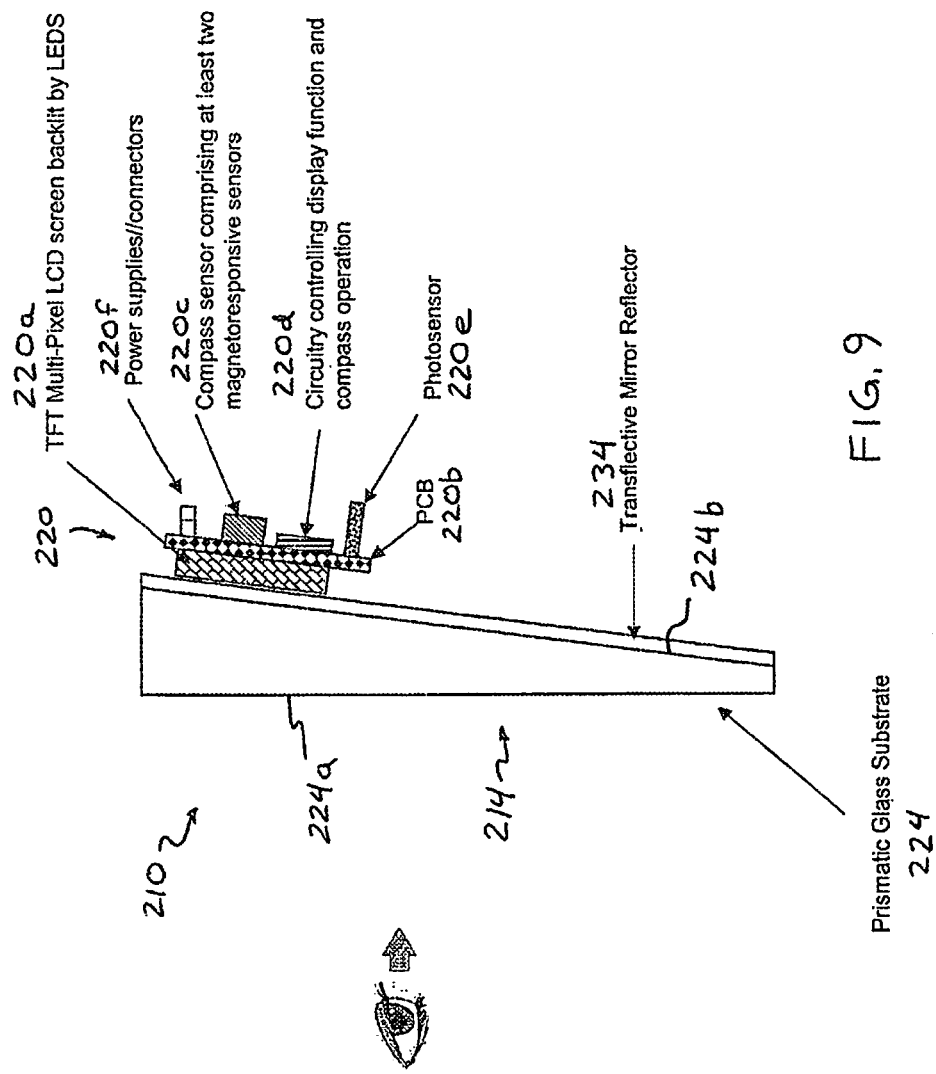
FIG. 9 is a sectional view of a prismatic reflective element assembly of the present invention, showing a compass display module disposed at a rear surface of the prismatic reflective element.

Optionally, and with reference to FIG. 9, an interior rearview prismatic mirror reflective element assembly 210 has a display device or module 220 (such as a self-contained video display and compass module) disposed behind the prismatic reflective element 214 and that is operable to display information at a display region of the reflective element for viewing the displayed information through the reflective element by the driver of the vehicle. In the illustrated embodiment of FIG. 9, reflective element 214 comprises a prismatic or wedge-shaped substrate 224 having a front surface 224*a* and a rear surface 224*b*, with a metallic reflector coating 234 established at the rear surface 224*b* of the glass substrate or prism. As shown in FIG. 9, display device 220 is disposed behind the glass prism or substrate 224 (such as at the rear surface 224*b* of the prism or wedge-shaped substrate 224) and is operable to display information for viewing by the driver of the vehicle through the reflective element 214, such as through a partially visible light reflecting, partially visible light transmitting transflective mirror reflector coating or through a window established through a non-transflective or substantially non-visible light transmissive mirror reflector coating or the like.

In the illustrated embodiment, and similar to display device 120, discussed above, display device 220 comprises a display module having a video display screen 220*a* (such as a multi-pixel LCD screen backlit by a plurality of LEDs) and a circuit element 220*b* (such as a printed circuit board or the like, such as a silicon substrate having circuitry established thereon) disposed at the rear of the display screen 220*a*. Video display screen 220*a* may comprise any suitable video display screen, such as a multi-pixel display screen (such as a thin film transistor or TFT display screen) that is backlit by a plurality of illumination sources, such as a plurality of white light-emitting light emitting diodes or the like (such as individually addressable LEDs to backlight particular or respective pixels of the display screen). Circuit board 220*b* has circuitry established thereat (such as via CMOS technology or the like), and such circuitry may include a compass sensor 220*c* (having at least two magnetoresponsive sensors) and circuitry 220*d* for controlling the display functions and compass operation of the display device. The circuit board 220*b* may also have a photo sensor 220*e* established thereat for detecting or sensing the light (such as ambient light or glare light) at the display device 220. The circuit board 220*b* may also include a power connector 220*f* (such as a multi-pin connector for connecting to a wiring harness of the vehicle when the mirror assembly is normally mounted in the vehicle) and/or power supplies and/or power circuitry or the like for connecting the circuitry of the display device to the vehicle wiring harness or the like when the mirror assembly is normally mounted in the vehicle.

Thus, the display device or module 120, 220 may operate, such as responsive to its compass sensor 120c, 220c, to display a compass heading or directional heading at a portion of the compass display region of the reflective element. As shown in FIGS. 10 and 11, the video display device or module may be operable to display the compass heading or directional heading character or characters 123 (such as N, S, E, W, NE, SE, SW, NW or the like) at a portion or region 122a of the video display screen and display region 122. As shown in FIG. 10, the reflective element 114 may comprise a transflective reflector and the displayed icon or character 123 may be viewable through the transflective reflector and reflective element for viewing by the driver when the mirror assembly is normally mounted in the vehicle and when the driver is normally operating the vehicle (and may be displayed in any suitable or selected color, such as amber, red, orange, blue, green, white, black and/or the like). Optionally, and as shown in FIG. 11 the display device or module may operate to display the icon or character 123' at a darkened or colored region 123a' (such as a framed region of the video display screen that is displayed as a color that is contrasting to the color of the displayed icon or character) of the video display screen to enhance the contrast between the displayed character and the surrounding area of the mirror reflector. Optionally, the darkened or colored region 123a' may be viewable through a window or aperture established at and at least partially or entirely through the mirror reflector coating at the compass display region, whereby the display module may display a darkened or colored background region at the window or aperture or may have that region otherwise darkened to enhance the contrast between the displayed character and the surrounding area of the mirror reflector at the window region.

Optionally, the characters or icons may be displayed in any selected or desired color, such as a color associated with the vehicle manufacturer or vehicle product line or the like. Optionally, because some vehicle manufacturers and/or consumers want to customize the color of the vehicle displays to suit personal tastes or fashions, it is envisioned that the color of the displayed characters may be selected and/or may be adjusted to provide the desired appearance of the compass display. Optionally, for example, to accommodate such a desired display color scheme, the display screen may comprise one or more, such as four (or more or less), multi-color LEDs, such as multi-color LEDs of the types commercially available from Nichia Corp. of Tokushima, Japan (such as the Nichia Chip Type Full Color LED, Model NSSM065T or the like). Each multi-color LED may be individually addressable to output red, green or blue or combination thereof to create a multicolor effect. Optionally, the end user or customer (such as the owner of the vehicle that has the display unit and mirror assembly installed therein) may cycle through a broad range of display colors and may select (such as a user input or the like) a desired color for the compass display in accordance with his or her personal tastes, or the compass display color may be selected to match or contrast or correspond to the display color scheme or trim color scheme of the vehicle manufacturer or product line or the like. For example, the system or unit may include software that is used to create a variable pulse width modulation (PWM) signal to each color channel. By varying the proportion of each color output (red, green, blue), any color can be achieved and output by the LEDs and the display screen. As the user cycles through the varying colors, the user may select the desired color, such as by actuating a user input or switch or button or the like when the desired color is displayed by the display screen. Optionally, the color may also or otherwise be selected by the vehicle manufacturer or the like, and/or may be selected by a vehicle communication bus or the selection may be made responsive to other external signals or influences.

The compass display screen and module or block or unit may comprise a compact, relatively small self-contained compass display/compass sensing module or device or block or unit that may be disposed at the rear of the reflective element, such as at a left (driver side) upper quadrant of the reflective element when the reflective element is normally mounted in the vehicle and viewed by the driver of the vehicle. For example, the display screen may comprise a relatively small display screen, such as, for example, a display screen that is up to about 25 mm wide and up to about 20 min high or tall (or could be larger or smaller), while the display module or block or unit may be sized to have dimensions that are, for example, up to about 30 mm wide and up to about 30 trim high (or larger or smaller), and the display screen and associated powering circuitry, compass sensing circuitry, deviating magnetic field compensation circuitry, display control and powering circuitry, and the like may be housed or located or disposed within a self-contained compass display/compass sensing module of such dimensions. The display block or unit preferably comprises a low profile display block with an overall depth dimension of up to, for example, about 10 mm (or more or less). The printed circuit board preferably comprises a double-sided printed circuit board that may be up to about 35 mm wide by to about 35 mm tall (or larger or smaller). In general, it is desirable and preferable that the display screen has a display area of at least about 10 square centimeters, but less than about 40 square centimeters, and that the printed circuit board to which the display screen is attached has an area of at least about 10 square centimeters and less than about 45 square centimeters. More preferably, the display screen has an area that is greater than 10 square centimeters, such as, for example, an area that is at or about 16 square centimeters.

FIGS. 17-21 depict an example of a standard liquid crystal display screen 120a' (FIGS. 17A-D and 23), a dot matrix liquid crystal display screen 120a (FIGS. 18A-D and 19), a lightbox 131 (FIGS. 20 and 20A-E) and a reflector 133 (FIGS. 21 and 21A-E), each of which may be suitable for use in the compass display unit of the present invention. As shown in FIG. 19, the dot matrix liquid crystal display screen 120a is operable to display the available characters shown in FIG. 19 via selective addressing of the pixels/elements shown in FIG. 19. The dot matrix compass display thus may comprise the segment hard tooled pairing and character mapping for the 37 addressable segment groups shown in FIG. 19. The displayed characters include each of the characters or letters for showing each of the cardinal directional headings (N, E, S, W) and each of the intercardinal directional headings (NE, SE, SW, NW), along with each of the numerical digits 0-9 and certain other letters and characters or symbols and/or the like. The dimensions and configurations shown in FIGS. 17-21 are of exemplary components suitable for use in the compass display unit of the present invention, and clearly other sized and shaped components may be utilized while remaining within the spirit and scope of the present invention.

For export and/or use in non-English speaking countries, such as in the likes of Asian countries, such as China, it is desirable to display the direction heading in a character (for example, in China, using a Chinese character) that is readable and understandable to the local driving population, which may not necessarily associate the character "N" with North. In this regard, use of a dot matrix display, such as described herein, is useful in that, taking General Motors as an example, vehicles manufactured for export to or manufactured in China may operate to display the Chinese characters associated with the meridian coordinates rather than the English characters N, S, E, W that are more readily understood and interpretable in western regions such as North America and the United States.

Preferably, such a dimensioned display screen of the display block or unit comprises a multi-pixel liquid crystal display screen that is backlit by at least on; and preferably by at least several, light emitting diodes (preferably white light-emitting light emitting diodes). Alternatively, the display screen may comprise a multi-pixel LED display screen, where each individual pixel comprises a light emitting diode junction operable to emit light when electrically powered. Alternatively, a multi-pixel electroluminescent display screen or multi-pixel plasma emitting display screen can be used. Where light emitting diodes (LEDs) are utilized, whether for backlighting or as light emitting pixels, such LEDs may be inorganic LEDs or may be organic LEDs. Thus, for example, an OLED multi-pixel LED screen may be used.

Figure 12:
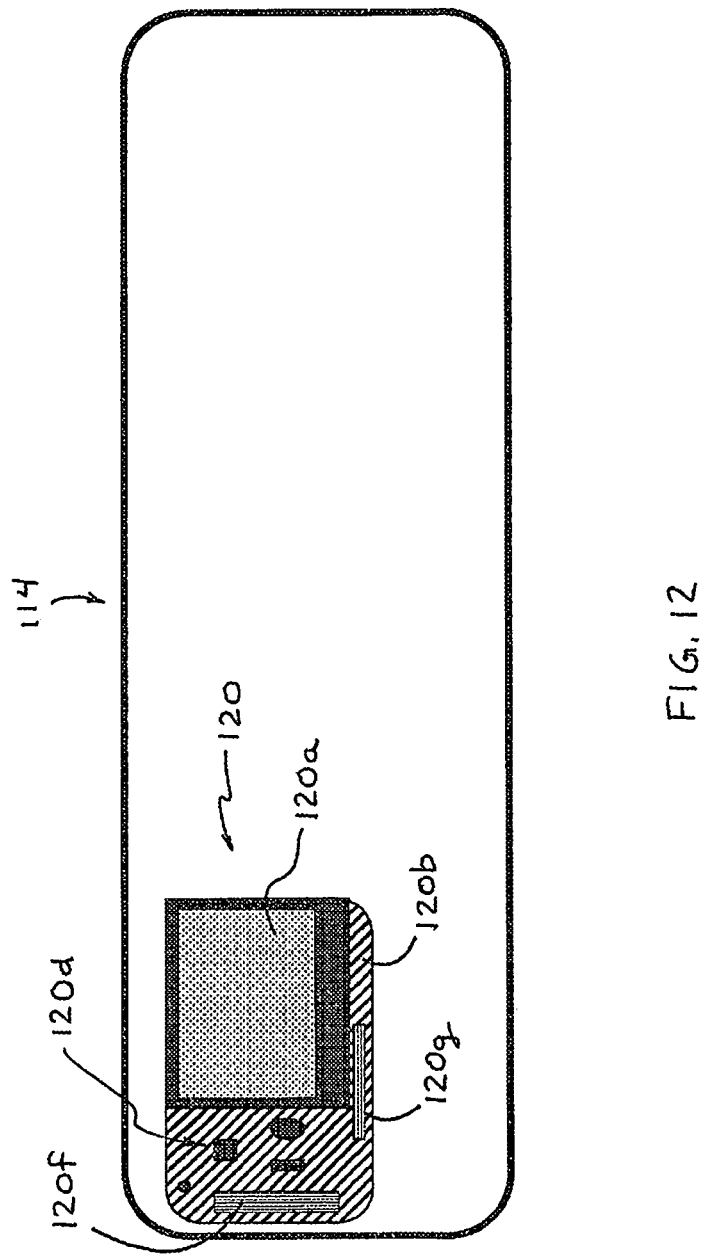
FIG. 12 is a front elevation of the mirror reflective element assembly of FIG. 8, showing the compass display block through the reflective element.

As shown in FIG. 12, the display block 120 may be disposed behind the reflective element 114 at the upper left quadrant of the reflective element 114, with the display screen 120a disposed so as to be generally flush at the upper right hand quadrant of the printed circuit board 120b (but could be disposed elsewhere if desired). In the illustrated embodiment, an electrical connector 120f (such as, for example, a 6 pin connector or plug) may be disposed at a side portion of the printed circuit board 120b, such as at a left portion or side of the printed circuit board) for electrically connecting to a power source, such as to a vehicle wire harness that is received in the mirror assembly and that connects to the vehicle power source (such as, typically, a 9 volt to 16 volt, 12 volt nominal, vehicle ignition voltage) and/or other vehicle circuitry (such as, for example, a 5 volt or 3.5 volt or other regulated voltage supply from other circuitry disposed in or at the interior rearview mirror assembly, such as, for example, electrochromic mirror dimming powering circuitry, such as shown in FIG. 8). Another electrical connector 120g (such as, for example, a multi-pin connector, such as a multi-pin connector having 11 pins or thereabouts) may be disposed or established at a lower portion of the printed circuit board 120b for electrically connecting to other circuitry of the mirror assembly. The printed circuit board 120b may support or include circuitry 120d thereat or thereon, such as for operating or controlling the display screen 120a and/or the compass sensor or circuitry and/or the like. Optionally, for example, a compass sensor chip, such as an application specific integrated chip (ASIC) may be disposed on a daughter printed circuit board, and the circuitry of the daughter board may be electrically connected to the display block or module via an electrical connector that plugs into the 11 pin connector of the printed circuit board of the display block (or optionally, the ASIC may be disposed at or established at the printed circuit board of the display block or module). The ASIC construction and/or operation may utilize aspects of the chips described in U.S. Pat. Nos. 7,815,326; 7,480,149; 7,004,593; 7,329,013 and/or 7,370,983, and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties.

Optionally, and preferably, the printed circuit board may have an ambient light sensing photosensor disposed or established thereat, and, responsive to an ambient light level detection that is representative of the ambient light level (such as a determination of whether the ambient light level is indicative of day or night lighting conditions), a control that is part of the display block or module or unit (preferably a microprocessor-based control) may control the display intensity of information displayed by the display screen, so that, for example, when operated and used in an equipped vehicle during daylight hours, the intensity of the information displayed is optimized/maximized so as to be visible and interpretable to a driver of the equipped vehicle during daylight driving conditions (such as may be experienced on a sunny day) and so as to minimize/mitigate display washout. Alternatively, at night or during low lighting conditions, and responsive to the low level of ambient light detected by the photosensor, the display intensity may be reduced so as to operate at a lower information display intensity so as to be visible/interpretable by a driver of the vehicle without unduly degrading that driver's night vision adaptation. Preferably, and responsive to such an ambient light detection by the photosensor, the display intensity may be continuously variable or may be multi-stepped variable (for example, may be variable up to 50 steps) to accommodate the wide variation in ambient light detected during normal day/night use. The photosensor may be disposed on the same side of the printed circuit board as is the display screen with its photosensing surface viewing through the mirror reflective element that the display block or unit is disposed behind (for example, a hole or aperture may be laser ablated or etched into the mirror reflector of the mirror reflective element local to and at where the photosensor is viewing through, or the mirror reflector may be constructed to be at least partially light transmitting (such as, for example, at least about 10 percent visible light transmitting) at least at that location). Alternatively, the photosensor may be disposed at the opposite side of the printed circuit board as the display screen so as to detect light elsewhere, and such a construction may include a light pipe or the like for directing light from exterior the mirror assembly to the photosensor at the rear of the printed circuit board disposed within the mirror assembly. Optionally; such as for prismatic mirror assemblies (such as shown in FIG. 9), where light may enter the case itself and the photosensor may be able to detect light in the case, whereby the system may operate to determine whether its day or night by the light levels within the cavity of the case. To assist in light entry into the case, the case may have slots or holes therethrough, such as in a manner that is aesthetically pleasing. Such a construction need not have a light pipe or alignment of the photosensor with a light pipe or aperture or hole in the mirror case during assembly of the mirror assembly.

Optionally, and alternatively, the display block or module may be responsive to a photosensor disposed elsewhere in the mirror assembly (such as responsive to one or both of the ambient light detecting and glare light detecting photosensors used for electrochromic dimming as is known in the automatic electro-optic interior rearview mirror system art), or optionally, the display block or module may be responsive to the instrument panel (IP) dimming circuitry/control of the vehicle. The display block or module may adjust the intensity of the display screen responsive to such a photosensor and/or dimming circuitry.

Advantageously, when an appropriate ambient light photosensing photosensor is included as part of the display block or unit, the mere provision of a 12 volt power supply (or alternatively a lower voltage as other electronic circuitry present in the mirror assembly may provide) enables the display block or unit to act as a self-contained compass sensing/compass display system. This is of particular advantage for non-electro-optic or prismatic mirror assemblies. Typically, such non-electro-optic mirror assemblies are not electrically serviced or have the likes of light modules or the like (such as described in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249,860, which are hereby incorporated herein by reference in their entireties) that operate from a 12 volt ignition line. This aspect of the present invention allows an essentially already designed and constructed prismatic mirror assembly to be upgraded to a compass prismatic mirror assembly with minimum change to existing tooling, manufacturing processes and/or the like associated with the prismatic mirror assembly.

Note that several of the aforementioned advantages can be achieved even when a display screen is not included. In such an application, the block or module or unit may send out or transmit or output the likes of a CAN or LIN output or signal to cause display of information at an information display distant and separate from the interior rearview mirror assembly, with the display information comprising or including a compensated compass heading determined by the compass circuitry and sensor of the block or module or unit.

As discussed above, the video display and compass module may display the compass directional heading responsive to the vehicle being driven in a forward direction of travel (and the compass display may be deactivated or otherwise operate to not display the compass icons or characters when the vehicle is stationary or being driven in reverse, such as responsive to the vehicle gear actuator being moved to a non-drive gear position, such as park or reverse or the like) or responsive to a user input or responsive to a change in the direction of travel of the vehicle or the like. The video display and compass module may be operable to display images captured by a rearward facing camera of the vehicle during a reversing maneuver of the vehicle (such as responsive to the vehicle gear actuator being placed in a reverse gear position or the like) to assist the driver in backing up the vehicle, and may be operable to display the compass heading or directional heading character or icon when the vehicle is not undertaking a reversing maneuver, such as when the vehicle is being driven in a forward direction along a road, such as discussed herein.

Thus, the present invention provides a self-contained compass display module that includes a video display screen, with its associated circuitry and with compass circuitry commonly established at a circuit element or printed circuit board at the rear of the video display screen. The video compass display module thus includes the video screen, with its associated circuitry and with the compass sensing elements and compass circuitry all disposed or established at the back or rear of the video display screen. The self-contained compass display module thus may be readily mounted or attached (such as via an adhesive layer or optical adhesive or the like) at or to the rear surface of the reflective element (such as by utilizing aspects of the display systems described in U.S. Pat. No. 7,855,755, which is hereby incorporated herein by reference in its entirety), and the vehicle wire harness (or mirror wiring within the mirror casing) may be readily electrically connected to the electrical connectors of the display module to power the display module when the mirror assembly is normally mounted in the vehicle. The self-contained compass display module with video display screen may comprise and/or utilize and/or incorporate various aspects of compass systems, such as by utilizing aspects of the compass systems and/or display systems described in U.S. Pat. Nos. 6,648,478; 5,708,410; 5,632,092; 5,576,687; 6,140,933; 6,023,229; 5,699,044; and/or 4,953,305, which are hereby incorporated herein by reference in their entireties.

The video display screen operates to display the compass heading or directional heading of the vehicle (responsive to the compass sensing elements and circuitry of the display device) through the mirror reflective element for viewing by the driver of the vehicle. Surprisingly and unexpectedly, it has been found that the color white for the directional heading characters or icons works well for viewing by the driver of the vehicle in high ambient lighting conditions, even and especially when using a transflective mirror reflective element. The white characters or icons (preferably displayed as white characters or icons through the transflective mirror reflector, to be viewed and seen by the driver of the vehicle as white characters or icons without the black background or surrounding display area shown in FIG. 11) are distinct and different from the colored icons or characters typically seen in known vacuum fluorescent displays and the like, and provide enhanced viewing and discernibility of the displayed white characters or icons by the driver of the vehicle, particularly when viewing the displayed white characters or icons in high ambient lighting conditions, such as, for example, when driving a convertible on a sunny day in Tucson Ariz. or the like.

The white characters or icons provide enhanced viewing in such high lighting conditions when viewed against the surrounding silver or silver-like transflective reflector of the transflective mirror reflective element assembly. For instance, when an operator is driving an equipped convertible at high noon in Tucson, Ariz., it is surprising how well the white characters appear in a transflective mirror reflective mirror assembly and how well the white characters are discernible and viewable against the reflection off the silver or silver-like reflector immediately beside or around or surrounding the displayed character. As shown in FIG. 22, the white characters may be displayed by the display screen 120a, which may be disposed behind a transflective or display-on-demand (DoD) reflective element so that the white display characters are viewed through a transflective mirror reflector of the transflective reflective element.

The displayed characters or icons may be displayed as white via one or more white light-emitting LEDs backlighting the video display screen at the compass display region (such as a bank or array of the backlighting LEDs of the video display screen or such as one or more discreet dedicated LEDs at the compass display region, such as discussed above), whereby the backlit multi-pixel LCD video screen operates to pass the emitted white light so as to emit white light through the transflective mirror reflector and reflective element for viewing by the driver of the vehicle when the mirror assembly is normally mounted in the vehicle and when the driver is normally operating the vehicle. Optionally, the display screen may operate to display the characters in other colors (such as discussed above), while remaining within the spirit and scope of the present invention.

Optionally, a mirror assembly of the present invention may incorporate one or more touch or proximity sensitive user inputs and associated icons or the like so a user can readily identify the purpose or function of the user inputs and actuate the appropriate or desired or selected user input. For example, and with reference to FIGS. 13 and 14, a mirror reflective element assembly 314 (such as an electro-optic reflective element assembly or cell, such as an electrochromic reflective element assembly or cell) includes a front substrate 324 having a front or first surface 324a (the surface that generally faces the driver of a vehicle when the mirror assembly is normally mounted in the vehicle) and a rear or second surface 324b opposite the front surface 324a, and a rear substrate 326 having a front or third surface 326a and a rear or fourth surface 326b opposite the front surface 326a, with an electro-optic medium 328 disposed between the second surface 324b and the third surface 326a and bounded by a perimeter seal 330 of the reflective element (such as is known in the electrochromic mirror art). The second surface 324a has a transparent electrically conductive coating or layer 332 established thereat, while the third surface 326a has a metallic reflector coating 334 established thereat. The front perimeter edge regions 324c of the front substrate 324 may be slanted or beveled or rounded or curved to provide a continuous or curved or smooth transition between the generally planar front surface 324a and a side surface of edge dimension 324d of the front substrate 324, and a perimeter band or concealing layer or band 336 is disposed around a periphery of the rear surface 324b of the front substrate 324 of the reflective element to conceal or render covert the perimeter seal and/or electrical connections of the reflective element (such as by utilizing aspects of the mirror assemblies described in U.S. Pat. Nos. 5,066, 112; 7,626,749; 7,360,932; 7,274,501; 7,184,190; and/or 7,255,451, and/or PCT Application No. PCT/US2010/032017, filed Apr. 22, 2010, and/or PCT Application No. PCT/US10/51741, filed Oct. 7, 2010, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties) to a driver of the vehicle when the mirror assembly is normally mounted in the vehicle. The reflective element assembly 314 includes user inputs or circuitry or switches 338 (FIG. 14) disposed behind the front substrate 324 and behind the touch zone 340 (having one or more etched or formed individual inputs or touch sensors 340a, 340b, 340c), with the user input circuitry or switches 338, such as touch or proximity sensing circuitry or capacitive switches (such as projection capacitance sensing circuitry or proximity sensing circuitry or capacitive switches or user inputs that utilize aspects of the mirror assemblies described in U.S. patent application Ser. No. 12/414,190, filed Mar. 30, 2009, now U.S. Pat. No. 8,154,418, and/or PCT Application No. PCT/US10/51741, filed Oct. 7, 2010, which are hereby incorporated herein by reference in their entireties) disposed at a lower perimeter region and behind the perimeter band 336 (and at a wider or waisted or broadened portion 336a of the perimeter band 336). The individual touch sensors thus comprise the individual electrically isolated touch pads 340a, 340b, 340c formed at the touch zone 340 of the perimeter band 336 and comprise the sensing elements and/or circuitry and/or switches 338 disposed at or behind the individual electrically isolated touch pads 340a, 340b, 340c at the touch zone 340. Given that advantage is taken in this design of projected capacitance sensing means, such as is known in the touch sensing and proximity sensing arts, it is preferable that the front glass substrate of the mirror reflective element (behind which the sensing pads and sensing circuitry are disposed) be no greater than about 2.3 mm thick or thereabouts, more preferably no greater than about 1.6 mm thick or thereabouts and more preferably no greater than about 1.1 mm thick or thereabouts.

Figure 13:
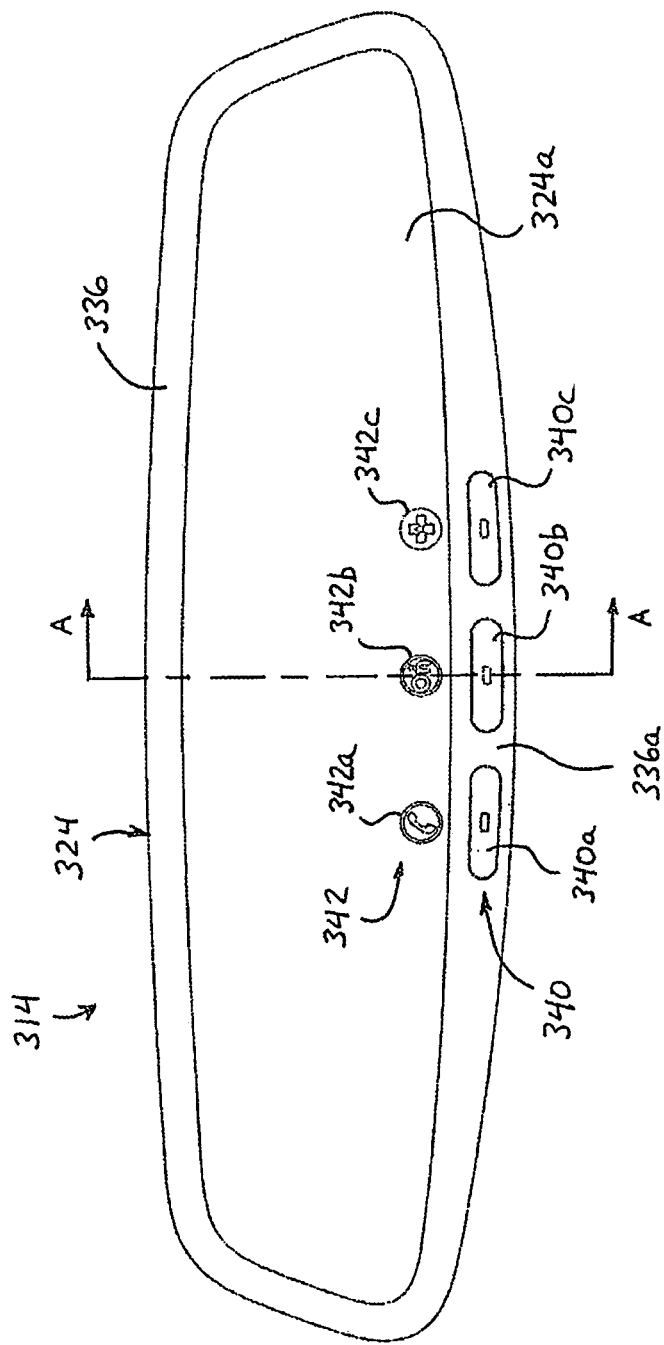
FIG. 13 is a front elevation of a mirror reflective element assembly in accordance with the present invention.

As can be seen in FIG. 13, the perimeter band 336 may be demarcated or etched (such as by laser etching or ablation) at the areas of the user inputs or touch sensors to provide indications or individual touch pads 340a, 340b, 340c that guide or invite the user where to touch or approach to achieve the predicted or fixed or variable features or functions (as achieved via actuation of the user input circuitry disposed behind the individual touch pads), so that a user may cognitively recognize where they are to touch or closely approach the touch zone to activate the desired or selected user input. Thus, the perimeter band 336 (which comprises an electrically conductive material and may typically comprise a reflective material or layer) is affirmatively used as an element of the touch system or sensors. Because the perimeter band 336 is not part of the electrochromically dimmable viewing area of the likes of a mirror reflector of an electrochromic mirror reflective element, touching of that area of the reflective element mitigates and reduces the impact of fingerprints at the touch zone or area of the mirror reflective element. Also, because the perimeter band region at which the individual touch pads are disposed or established may not be part of the dimmed portion of the reflective element, the touch zones or areas or regions are not affected by electrochromic activity. Optionally, the overall touch zone, where the individual touch pads are disposed, may itself be electrically isolated and insulated from the rest of the perimeter band, such as via a laser-ablated deletion line or the like, so as to ensure that touching at the touch zone will not affect electrochromic dimming.

The electrically isolated/insulated individual touch pads 340a, 340b, 340c (which may be electrically isolated via laser ablating or etching or the like) thus invite the user to touch the appropriate area or region of the front surface of the front substrate of the reflective element 314 to activate/control the selected function (and the user inputs may utilize aspects of the interactive systems described in U.S. Pat. No. 7,224,324, which is hereby incorporated herein by reference in its entirety). As shown in FIG. 13, the perimeter band 336 may be expanded or may be wider or waisted at the area where the user inputs are disposed to provide a larger touch zone or area 340 at which to form or establish the user input indicators or individual touch pads 340a, 340b, 340c and to provide a larger area at which the user may touch to activate/control the selected function. The user inputs or etched individual touch pads 340a, 340b, 340c are electrically isolated from the rest of the perimeter band so that the region or zone where the touching is to occur (the individual touch pad) is electrically isolated from the rest of the perimeter band 336 so that the individual touch pads are in electrical isolation from the rest of the perimeter band 336 and are in electrical isolation from the transparent conductive layer 332 at the rear surface 3246 of the front substrate 324. Thus, the electro-optic medium 328 may be electrically dimmed (including at the perimeter band) except at the electrically isolated individual touch pads of the touch zone. The electrically isolated individual touch pads or touch areas may be established via any suitable means, such as laser etching the perimeter band and transparent conductive layer to locally remove the coatings or layers to create a thin electrically insulating demarcation gap or separation 344 between the individual touch pad and the rest of the perimeter band and transparent electrically conductive coating. As shown in FIG. 14, the demarcation or isolation lines or gaps or electrical isolation/insulation lines or means or elements 344 may be disposed around an individual touch pad 340*b* (with a portion of the gap 344 disposed at the perimeter seal 330, or optionally, and as shown in FIG. 15, the demarcation or isolation lines or gaps 344 may be disposed partially around an individual touch pad 340*b*' (with associated circuitry 338' disposed thereat or therebehind), so that the lower or outboard peripheral edge of the individual touch pad 340*b*' is at the lower or outboard edge of the front substrate 324' (and with the demarcation or isolation line or gap 344' being formed outboard of the perimeter seal 330' of the reflective element assembly 314' so that the perimeter seal 330' is fully hidden by the broadened or waisted portion 336*a*' of the perimeter band 336').

To assist the driver's cognitive association and recognition of where to touch with his or her finger, in order to activate the desired or selected or particular touch pad, the to-be-touched area/region/pad of the touch zone may be differentiated from the immediately surrounding remainder of the touch zone in a variety of ways. For example, using the likes of a laser scriber, the perimeter band (that typically comprises a metal thin film coating, such as of chromium or titanium or metal alloy or the like) may be etched to outline and establish the touch pads and/or may be also or otherwise etched or patterned at the touch pad area, such as for example with a micro-dot pattern or parallel line pattern or stipple pattern or the like. Separate or in combination therewith, backlighting can be used to help differentiate the touch pad or pads so as to help guide the driver to touch thereat. Various decals, appliqués or the like may similarly be used at or local to the touch pad or pads for such differentiation purposes.

As shown in FIG. 14, the touch circuitry or sensing circuitry or switch 338 may be disposed at the rear of the front substrate and at the respective touch pads (such as individual touch pad 340*b* in FIG. 14). At the touch zone or region 340, the rear substrate may have its edge region inboard of the edge region of the front substrate so as to have an overhang region at the touch zone or region 340. Optionally, most of the perimeter edge regions of the rear substrate may be flush with the perimeter edge regions of the front substrate (including partially along the bottom edge region), and optionally the rear substrate may have a Jog in or recess established along its lower edge region along where the touch zone 340 is located or established.

Optionally, the reflective element assembly may include icons or indicia 342 that may be selectively actuatable or discernible or may be fixed, with the icons creating or providing a cognitive association between the icons and the individual touch pads at or near the respective icons. Optionally, the icons may be part of the electrochromic area or principal reflecting area of the mirror reflective element assembly or the icons may be part of the touch zone itself and established at or in or at least partially through the perimeter band of the mirror reflective element assembly.

In the illustrated embodiment, reflective element assembly 314 includes indicia 342 formed or established at or above the user input indicators or individual touch pads 340*a*, 340*b*, 340*c* to indicate to the user what the function of the respective user input (disposed behind the individual indicator or touch pad 340*a*, 340*b*, 340*c*) is so the user is invited to touch the appropriate area of the reflective element to activate/control that function. For example, and as shown in FIG. 13, the indicia 342 and user inputs may be established for a telematics system of a vehicle, such as an ONSTAR® system or the like. One of the indicia 342*a* thus may indicate that a respective or corresponding user input or touch pad 340*a* is for initiating a telephone call or the like, while another of the indicia 342*b* may indicate that a respective or corresponding user input or touch pad 340*b* is for connecting the vehicle communication system or telematics system to a remote service or the like and another of the indicia 342*c* may indicate that a respective or corresponding user input or touch pad 340*c* is for connecting the vehicle communication system or telematics system to an emergency response system or the like. Thus, the user may be readily recognize the functions associated with the user inputs and may be invited to touch the appropriate location of the front surface of the reflective element to activate/control the selected or desired function.

In the illustrated embodiment of FIG. 13, the interior rearview mirror assembly is designed and constructed as an electrochromic mirror assembly having a front glass substrate, with the front glass substrate of the electrochromic laminate element being constructed with its first surface/outermost perimeter edges slanted or beveled or rounded or the like, such as shown/described in U.S. Des. Pat. Nos. D633,423; D633,019; D638,761; and/or D647,017, and/or PCT Application No. PCT/US2010/032017, filed Apr. 22, 2010, and/or PCT Application No. PCT/US10/51741, filed Oct. 7, 2010, which are hereby incorporated herein by reference in their entireties, in order to obviate/avoid a sharp edge at the front or outermost perimeter surface of the mirror reflective element and mirror assembly that could potentially hurt/injure an occupant of a vehicle equipped with the interior rearview mirror assembly during an accident. In the illustrated embodiment, the mirror assembly is constructed as a mirror assembly of the types shown/described in U.S. Des. Pat. Nos. D633,423; D633,019; D638,761; and/or D647,017, and/or PCT Application No. PCT/US2010/032017, filed Apr. 22, 2010, and/or PCT Application No. PCT/US10/51741, filed Oct. 7, 2010, which are hereby incorporated herein by reference in their entireties. Mirrors of such construction are commercially available from the assignee of this application under the tradename INFINITY™ mirror.

As shown in FIG. 13, the mirror assembly is configured and constructed so as to function as a human machine interface (HMI) for the ONSTAR® telematic system available from General Motors of Detroit, Mich. In the illustrated embodiment of FIG. 13, the mirror assembly is configured and constructed so as to be readily recognizable and usable by General Motors' customers that are familiar with or used to interfacing with ONSTAR® via conventional mirror-bezel mounted buttons or the like, such as described in U.S. Pat. Nos. 6,329,925; 7,308,341; and/or 7,289,037, which are hereby incorporated herein by reference in their entireties. The individual icons 342*a*, 342*b*, 342*c* are preferably the shape and color associated with and expected for known ONSTAR® icons of conventional vehicle applications. Thus, for example, icon 342*a* is preferably a dark color or black and is recognizable to an ONSTAR® user to be associated with a telephone link established via the ONSTAR® telematic system, while icon 342*b* is preferably a blue color and is recognizable to an ONSTAR® user to be associated with a link to contact and talk with the ONSTAR® telematic system operator or concierge, and 342*b* is preferably a red color and is recognizable to an ONSTAR® user to be associated with a link to an emergency contact. Below the icons 342*a*, 342*b*, 342*c* and cognitively and positionally associated therewith are individual touch pads 340*a*, 340*b*, 340*c*, whereby a user can readily cognitively recognize that each touch pad 340*a*, 340*b*, 340*c* is associated with the respective icon 342*a*, 342*b*, 342*c*, such that touching a selected touch pad 340*a*,

340*b*, 340*c* actuates or controls the function or functions typically associated with the respective or associated icon 342*a*, 342*b*, 342*c*.

The icons 342*a*, 342*b*, 342*c* may be established at the mirror reflective element assembly via a variety of ways. Where the mirror reflector is a non-transflective reflector (i.e., is a mirror reflector having minimum to no light transmission therethrough), the icons may be established by laser scribing the icon or icons into the mirror reflector (that typically comprises a thin film metal coating) so as to create a light transmitting window/area/indicia thereat. In the case of a transflective mirror reflector, it is optional to laser etch the mirror reflector. Alternatively, the icons may be established at the rear of the mirror reflective element and may be viewed through the transflective mirror reflector.

Taking icon 342*b* as representative of the icons 342, icon 342*b* may be illuminated blue (or other selected color), such as by a blue light emitting diode disposed to the rear of the reflective element, and/or such as by a blue colored (or other, selected color) mask, tape, light transmitting appliqué and/or the like disposed at the reflective element. During normal use of the mirror assembly, touch pad 340*b* may be low level illuminated, such as via use of, for example, a green LED (or other suitable color) backlighting the touch pad. And icon 342*b* may be illuminated or made visible to the driver so that when the mirror assembly is normally mounted in the vehicle, the presence and location of the phone icon and its associated touch pad are readily discernible to the driver of the vehicle. When the driver then touches at or has his or her finger approximately closely to touch pad 340*b*, the intensity of the green backlighting LED (backlighting touch pad 340*b*) may substantially increase to acknowledge the driver's touch thereat or approach thereto, and concurrently (and after an appropriate debounce to avoid inadvertent triggering) the icon 342*b* illumination intensity may also increase to acknowledge/confirm the user's touch at touch pad 340*b*. When the phone conversation or event is to be concluded, the driver may retouch touch pad 340*b*, whereupon the LED may again increase in intensity to acknowledge the touch/approach at the touch pad, and concurrently (and after an appropriate debounce to avoid inadvertent triggering) the icon 342*b* illumination intensity may also increase to acknowledge/confirm the user's touch at touch pad 340*b*.

Figure 16:
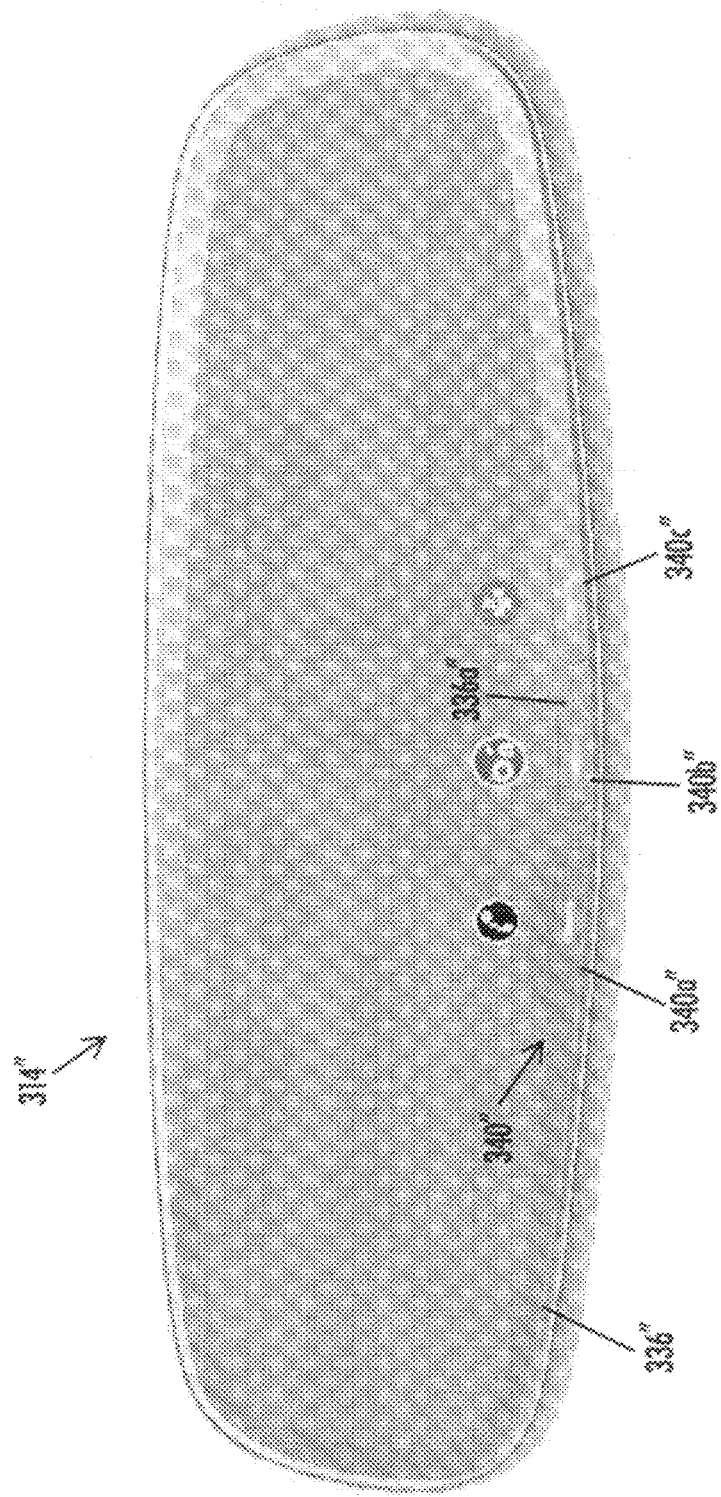
FIG. 16 is a front elevation of another mirror reflective element assembly of the present invention.
Figure 17:
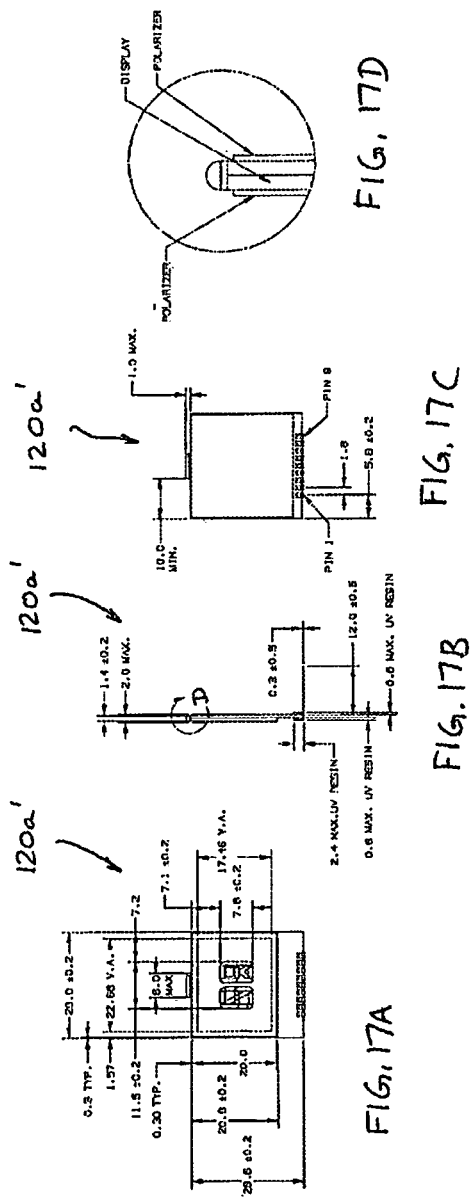
FIGS. 17A-D are views of a standard liquid crystal display screen suitable for use in the compass display unit of the present invention.
Figure 18:
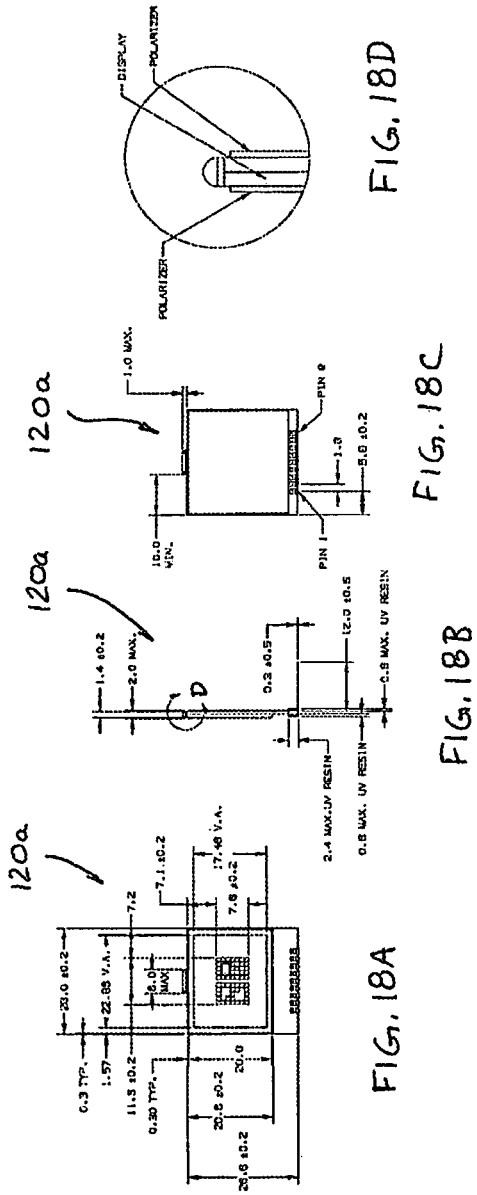
FIGS. 18A-D are views of a dot matrix liquid crystal display screen suitable for use in the compass display unit of the present invention.
Figure 20:
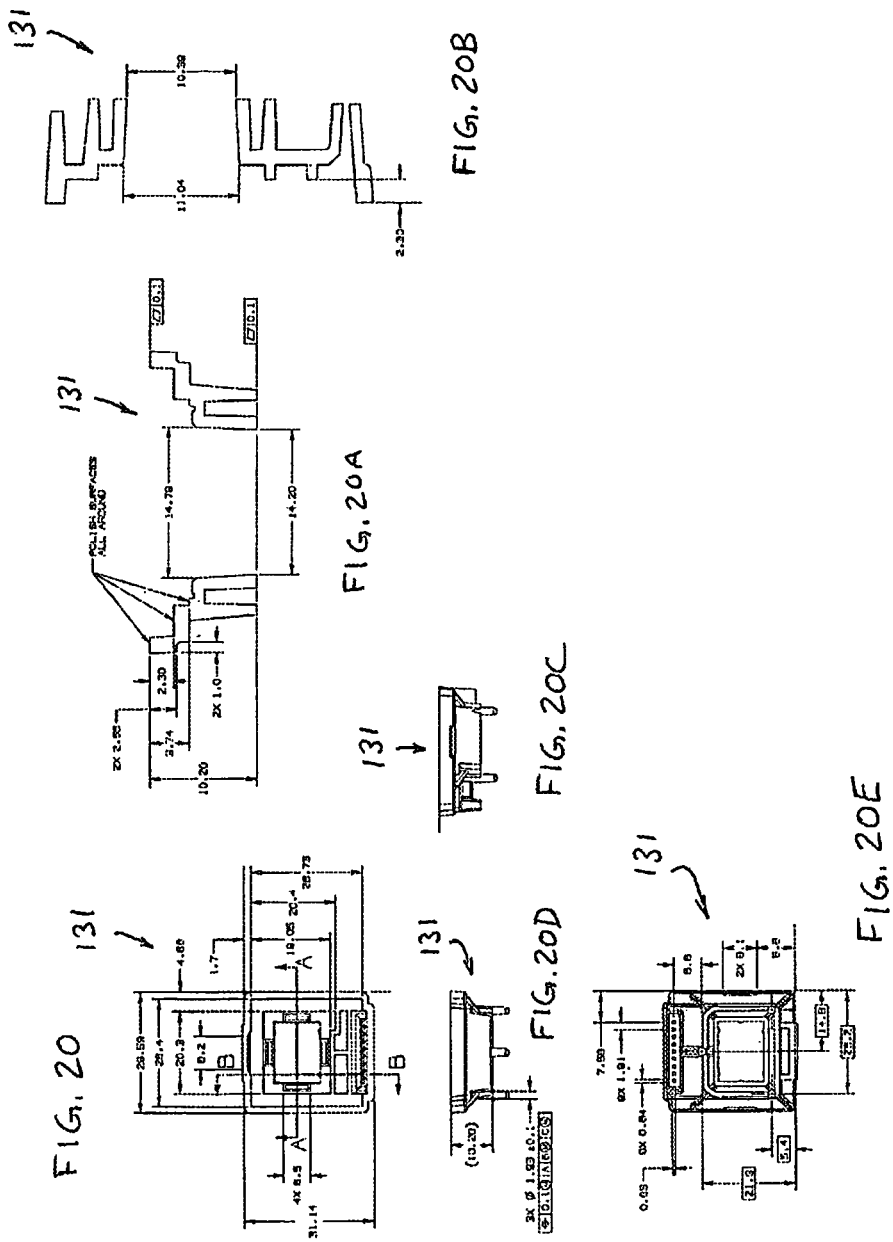
Figure 21:
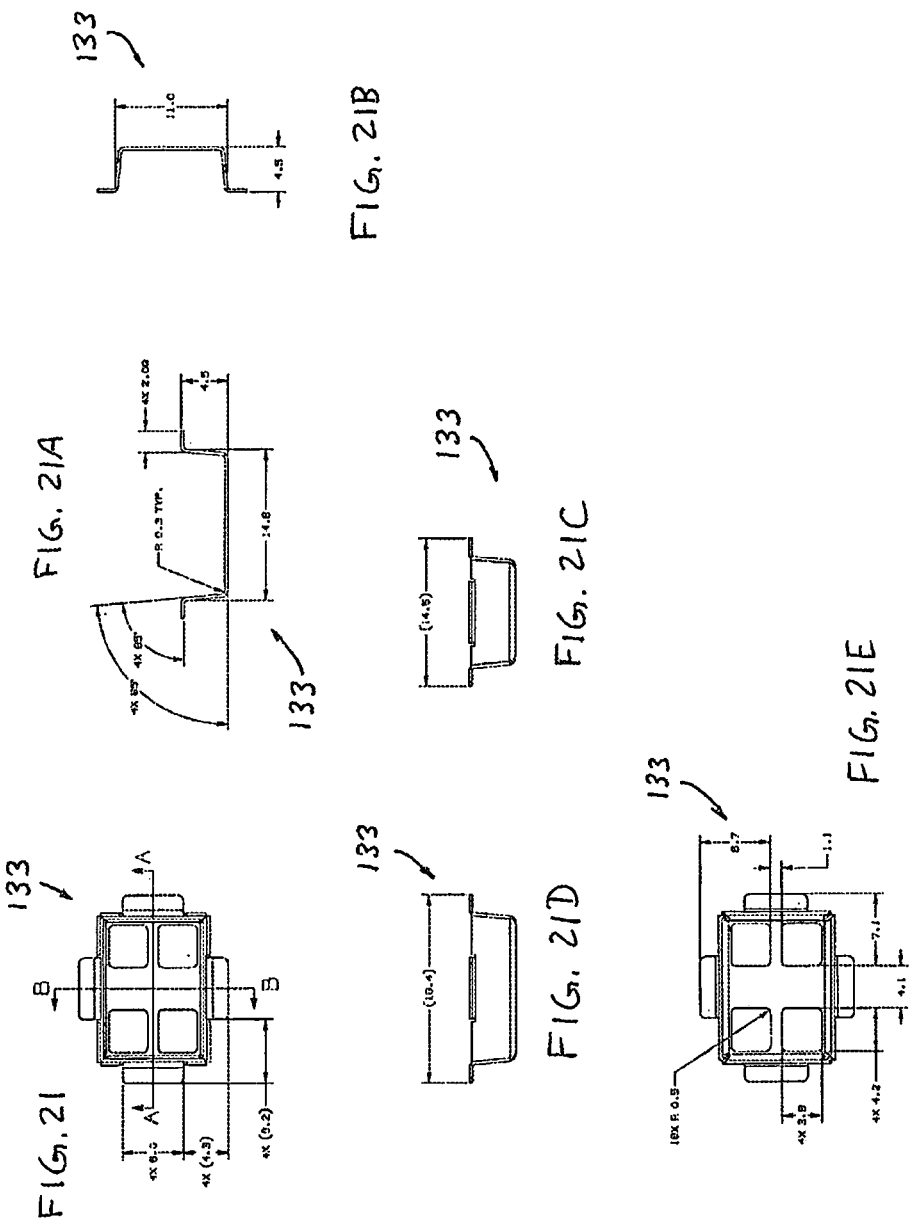

Typically, known mirror assemblies may provide buttons in the bezel portion of the mirror casing or housing of the mirror assembly. In the illustrated embodiment, the mirror reflective element comprises a frameless mirror reflective element assembly, such as a frameless mirror reflective element assembly of the types described in PCT Application No. PCT/US2010/032017, filed Apr. 22, 2010, and/or PCT Application No. PCT/US10/51741, filed Oct. 7, 2010, which are hereby incorporated herein by reference in their entireties. The mirror reflective element assembly 314 affirmatively uses the perimeter border band and the adjacent locale of the mirror reflective element to provide telematics (such as ONSTAR®) functionality. The touch sensors or touch pads utilized as part of the user inputs may be incorporated with the perimeter band. The perimeter border band 336 may be about 6 mm wide around the perimeter of the reflective element, which may be narrow for a user's fingers to selectively touch at the touch pads, so it may be desirable to expand or broaden the perimeter band locally at the touch pads or user input area or zone 340 (such as by locally expanding or widening or waisting the perimeter band local to and at the touch zone to be preferably, for example, at least about 8 mm wide and more preferably at least about 10 mm wide and more preferably at least about 12 mm wide at the user input area or touch zone, and preferably having a width of no greater than about 25 mm and more preferably no greater than about 20 mm and more preferably no greater than about 17 mm at the user input area or touch zone), so that the driver can readily and easily touch, the selected individual input or touch pad (which may have a length dimension of at least about 10 mm, preferably at least about 16 mm and more preferably at least about 20 mm, and a height dimension of at least about 50 percent of the height or width of the touch zone 340, such as having a height dimension of at least about 6 mm or thereabouts or more, such as having a height dimension of at least about 10 mm or at least about 15 mm or thereabouts). The individual user inputs or touch pads may be created such as by laser etching a generally rectangular or oval area (etched through the perimeter band material at the rear surface of the front substrate) that creates a cognitively recognizable or discernible location for the user's touch. Optionally, and as shown in FIG. 16, the perimeter border band 336" of a reflective element assembly 314" may have a locally broadened or waisted portion or touch zone 336*a*" that is broadened only at and around the individual user inputs or individual touch pads 340*a*", 340*b*", 340*c*" established at the perimeter band at the user input or touch zone or region 340". The reflective element may utilize aspects of the mirror assemblies disclosed in U.S. Pat. Nos. 7,224,324 and/or 7,110,156, and/or U.S. Des. Pat. Nos. D493,131 and/or D493,394, which are all hereby incorporated herein by reference in their entireties.

Optionally, and desirably, the perimeter band may be mirror reflective. Alternatively, the perimeter band may be light absorbing or non-reflective, while remaining within the spirit and scope of the present invention. Optionally, the perimeter band may be a different color and/or texture and/or pattern and/or appearance at the touch pad areas as compared to the rest of the perimeter band around the reflective element. Optionally, the perimeter band may be reflective all around the perimeter of the reflective element (such as, for example, a metallic material, such as chrome and/or the like), or optionally, the perimeter band may be metallic all around the perimeter of the reflective element but may be textured or treated or adapted at the touch zone or region to create or demarcate the touch position or touch pad. Optionally, the perimeter band may comprise a metallic material around the perimeter regions except at the touch zone, and may comprise a different material (such as a different metallic material or a non-metallic material) in the touch zone. Optionally, the broadened portion 336*a* of the perimeter border band 336 may be gradually broadened or widened across the bottom peripheral edge of the reflective element, such as shown in FIG. 13, or the broadened portion 336*a*" of the perimeter border band 336" may be locally broadened only at or near the touch zone, such as shown in FIG. 16, or the perimeter band may be otherwise configured to provide the location for the forming of individual touch pads at a perimeter region of the reflective element.

Optionally, the user inputs may provide a feedback to the user to confirm that the user activated the desired or selected user input when the user touches his or her finger at the user input area or individual touch pad. For example, the mirror reflective element assembly may provide a haptic or tactile feed back, such as by utilizing immersion technology or the like, that creates a vibration of the reflective element when the user input or touch pad is touched or approached and the touch sensor is activated. Optionally, the user inputs or reflective element assembly may provide a visible feedback to the user to confirm that the user activated the desired or selected user input. For example, when the user touches an individual user input area or individual touch pad, an illumination source (such as a light emitting diode or the like) to the rear of the touch pad or area may be energized to indicate that the user touched the touch pad or area correctly and successfully actuated the user input at that touch pad. The illumination source or LED may be activated or energized to illuminate or backlight the user input area prior to the user touching the area so as to invite the user touch that area and the LED may get brighter or intensify when the area is touched (or optionally the LED may be deactivated prior to the user touching the area and may be activated in response to the area being touched or approached by the user's finger). Optionally, the touch pad area or indicator area may have or incorporate lines or dots or patterns to cognitively invite the user to touch the touch pad area or areas.

Optionally, and such, as described in PCT Application No. PCT/US10/51741, filed Oct. 7, 2010 and published Apr. 14, 2011 as International Publication No. WO 2011/044312, which is hereby incorporated herein by reference in its entirety, in order to limit or avoid accidental actuations of one or more of the touch pads or capacitive sensors disposed at and behind the perimeter region of the mirror reflective element when the user is otherwise touching the front surface of the mirror reflective element, such as when wiping or washing the first or front surface of the reflective element or when adjusting the mirror to adjust the rearward field of view at the mirror, it is envisioned that the mirror assembly may include an additional touch or proximity sensitive sensor or switch or means, such as an additional capacitive switch or the like, that is disposed at or behind a portion of the reflective element or behind the rest of the reflective element, such as behind the entire or substantially the entire viewing area of the mirror reflective element (such as behind the entire or substantially the entire electro-optically dimmable area of an electro-optic mirror reflective element or cell). Thus, if the surface of the reflective element at the main viewing or dimming region is being contacted or elsewhere remote from the touch sensor regions, further contact at or near the user input or touch sensor input regions (such as at the lower perimeter region and such as where the icons or graphics are disposed) may be ignored by the touch sensor system. Thus, the system would recognize and respond to a user's touch at one of the touch sensors when the system did not at the same time receive an indication that another region or regions of the mirror reflective element were also being touched by the user (since such multiple touching areas would be indicative of the user cleaning or wiping the reflective element surface or otherwise adjusting the mirror assembly and reflective element).

For example, and with reference to FIGS. 24-27, an interior rearview mirror assembly 410 includes a mirror reflective element assembly 414 (such as an electro-optic reflective element assembly or cell, such as an electrochromic reflective element assembly or cell, such as similar to reflective element assembly 314 discussed above), and includes user inputs or circuitry or switches disposed behind the reflective element assembly 414 and behind the touch zone 440 (having one or more etched or formed individual inputs or touch sensors 440a, 440b, 440c), with the user input circuitry or switches, such as touch or proximity sensing circuitry or capacitive switches (such as projection capacitance sensing circuitry or proximity sensing circuitry or capacitive switches or user inputs that utilize aspects of the mirror assemblies described in U.S. patent application Ser. No. 12/414,190, filed Mar. 30, 2009, now U.S. Pat. No. 8,154,418, and/or PCT Application No. PCT/US10/51741, filed Oct. 7, 2010, which are hereby incorporated herein by reference in their entireties) disposed at a lower perimeter region and behind the perimeter band 436 (and optionally at a wider or waisted or broadened portion 436a of the perimeter band 436). The individual touch sensors comprise the individual electrically isolated touch pads 440a, 440b, 440c formed at the touch zone 440 of the perimeter band 436 and comprise the sensing elements and/or circuitry and/or switches disposed at or behind the individual electrically isolated touch pads at the touch zone 440.

As shown such as in FIG. 24, such touch sensitive user inputs are typically disposed at and along the lower rim or area of the reflective element (or at or in a plastic bezel below the lower rim or area of the reflective element), typically centrally located (such as illustrated in FIG. 24) or disposed at the driver side or at the passenger side relative to the seating position of the driver of the equipped vehicle. The interior rearview mirror assembly may be a two-ball or double pivot joint interior rearview mirror assembly or a one-ball or single pivot joint interior rearview mirror assembly, such as are commonly known in the interior rearview mirror art, and thus the mirror head (see FIG. 25) can be pivotally adjusted about a mirror support by the driver of the equipped vehicle grasping the mirror head, such as illustrated in FIG. 27, to adjust the rearward field of view of the mirror reflective element to suit that driver's desire or need. By locating the touch sensors at the lower rim or upper rim or perimeter region of the reflective element, the touch area is not at the central region of the mirror reflective element and thus the presence of discernible touch pads or "buttons" are not at the area that the driver of the vehicle views to view rearward of the vehicle during normal driving of the vehicle. A further advantage of having the touch pads localized at the lower rim of the reflective element is that any fingerprints or debris left on the mirror reflective element after a touch of one or more touch pads is localized and thus has reduced or minimum affect on the mirror function. However, when making such a mirror adjustment to the desired rearward field of view of the mirror reflective element, the grasping of the mirror head by the driver may inadvertently or falsely be interpreted by one of the touch or proximity sensitive sensors (such as one or all of touch pads 440a, 440b and 440c), leading to the likes of an inadvertent or false emergency call, telematics connection and/or telephone call initiation.

In accordance with the present invention, such potential erroneous touch determinations are mitigated and/or avoided by provision of a touch or proximity sensitive sensor or means remote from the touch pad area, such as one or more touch or proximity sensitive sensors proximate and along the upper rim or portion of the Mirror reflective element or along a plastic bezel that extends along the upper rim of the mirror reflective element, as mounted in the equipped vehicle, such as shown at 450 in FIG. 27. Thus, if any or all of sensors 440a, 440b, 440c detect a "touch" and the sensor or sensors 450 also and at approximately the same time sense a "touch," a logic control of the system determines and decides that a mirror adjust event is occurring and thus any emergency call and/or telematics connection and/or telephone call initiation is either not initiated or, if already initiated, is truncated/ceased. As an alternate or in addition to capacitive sensing means, preferably projection capacitive sensors, other means may be used to determine or decide that a mirror adjust is being initiated or is occurring. For example, and such as described in U.S. Pat. No. 7,329, 013, which is hereby incorporated herein by reference in its entirety, the likes of other sensors, such as motion sensors, accelerometers or the like, may be used to detect movement or motion of the mirror head, and/or pressure sensitive sensors may also or otherwise be incorporated into the interior rearview mirror assembly, such as at the casing thereof, to detect the likes of the grasping of the mirror head by a user such as shown in FIG. 27.

During normal operation or actuation of a user input at the touch zone 440, a user's finger may touch one of the touch pads 440*a*, 440*b*, 440*c* (such as touch pad 440*c* as shown in FIG. 26) to actuate the desired switch or circuitry. When the likes of a finger (whether gloved or ungloved) touches or closely approaches one touch-sensitive area, the circuitry and software on the circuit element 438 (such as a printed circuit board or the like) detest the capacitance change at the button area only and "closes" the switch. However, during a mirror adjustment (such as shown in FIG. 27), a user's hand may grasp the mirror head and may cover one or more of the button areas and other regions of the reflective element assembly, such as along an upper perimeter region of the reflective element assembly. In order to avoid unintentional actuation of one or more of the user inputs at the touch pads, the mirror assembly of the present invention may include one or more sensors disposed elsewhere at and/or around the reflective element assembly whereby, when a touch is detected at one of the other sensors, a corresponding touch at one of the touch pad areas may be ignored.

In the illustrated embodiment, the mirror assembly 410 includes one or more sensors or sensor elements 450 (such as a capacitive sensor or the like) disposed along and behind the upper perimeter region of the reflective element assembly 414. The capacitive sensor 450 may be electrically connected (such as via connection means or wires 451) to circuitry at the circuit element or printed circuit board 438. The capacitive sensor 450 may comprise any suitable sensing means, such as, for example, a flexible printed circuit (FPC), a stamping, a foil adhered to the mirror housing, a conductive paint on the inside or outside walls of the mirror housing, circuit traces of a printed circuit board extended near the wall of the mirror housing or a fourth surface chrome or other reflector at the glass substrate for use as a sensor surface, while remaining within the spirit and scope of the present invention. Thus, when a user's hand gabs the mirror (such as shown in FIG. 27), the hand can cover just one button area and the upper portion of the reflective element, whereby the software on the circuit board or element may detect the capacitance change at the touched button area and at the added sensor area and can ignore the touch at the touch pad so that no actuation of the switch of the touch pad occurs.

Optionally, and as also described in PCT Application No. PCT/US10/51741, filed Oct. 7, 2010 and published Apr. 14, 2011 as International Publication No. WO 2011/044312, which is hereby incorporated herein by reference in its entirety, when a touch or presence is detected at two or more buttons at the same time, but there is no detection of a touch or presence at the rest of the reflective element (such a double touch may be an erroneous double actuation of the inputs by the user when the user likely intended to actuate only one of two adjacent inputs or buttons), the system may implement a priority or hierarchy in determining which button or input to actuate in response to such a detection. For example, the system may process the detections and determine which input had a stronger reading or stronger detection of a touch and actuate or control the accessory according to that input or switch or button. Optionally, if the readings are generally or approximately the same strength or intensity or value (such as within a threshold tolerance or difference), the system may operate on a priority basis, and may actuate or control the accessory in accordance with a higher priority input over a lower priority input or the like.

Optionally, and with reference to FIGS. 28-32, an interior rearview mirror assembly may include touch pad areas 540*a*, 540*b*, 540*c* at the reflective element 514 (such as at and behind a glass substrate 524 of the reflective element, such as behind a glass prism for a prismatic reflective element or behind a front substrate of an electro-optic reflective element, such as an electrochromic reflective element), with icons or indicia 542*a*, 542*b*, 542*c* etched or established at the reflective element at or near the respective touch pads, such as in a similar manner as described above. M shown in FIG. 28, during daytime lighting conditions, the etched icons 542*a*, 542*b*, 542*c* and touch pads 540*a*, 540*b*, 540*c* are readily viewable at the reflective element assembly, while and as shown in FIG. 29, during nighttime lighting conditions, the icons and touch pads are backlit (such as via a plurality of light emitting diodes or the like) so that a user can readily discern the location of the touch pads 540*a*, 540*b*, 540*c* and their respective functions (shown by the associated or adjacent backlit icons 542*a*, 542*b*, 542*c*).

As shown in FIG. 30, the icons may be etched, such as via laser etching at least partially through a reflective coating or the like at the rear surface of the glass substrate, or may be otherwise established so that the are viewable to a person viewing the mirror reflective element assembly and that they may be backlit to enhance viewing in lower lighting conditions. Optionally, a layer of paint or ink or the like may be screen printed on or otherwise established at the surface of the substrate to enhance the appearance of the icons (such as via coloring them or the like so that they are more readily recognizable to the user). A perimeter portion of the touch pads 540*a*, 540*b*, 540*c* may be etched to demarcate the button or touch region, and a touch pad or keypad assembly 552 may be disposed behind the touch pads 540*a*, 540*b*, 540*c* for detecting the user's touch at one or more of the touch pads at the mirror reflective element assembly. The generally central regions of the touch pads (such as the shaded portions in FIG. 30) may be backlit to enhance visibility of the touch pads in low lighting conditions. The icons 542*a*, 542*b*, 542*c* associated with the touch pads 540*a*, 540*b*, 540*c* may be established at or near the touch pads, such as immediately above the respective touch pads, to enhance the user's cognitive awareness of the function associated with each touch pad or button. Optionally, a fourth icon 542*d* may be established at the reflective element that is not associated with any touch pad and that may be illuminated or backlit to indicate that the accessory (such as a telematics system) is not in use or a line of communication is unavailable or disconnected or the like.

In the illustrated embodiment, and as best shown in FIG. 32, keypad assembly 552 includes a circuit element or circuit board 554, with a translucent filler material 556, such as silicone or the like, disposed thereat. The silicone 556 is formed to extend between and fill the gap between the circuit element 554 and the rear surface of the substrate 524 and has separate fillers 556*a*, 556*b*, 556*c* for each of the touch pads 540*a*, 540*b*, 540*c* and for the respective circuitry and backlighting light sources at the circuit element 554 for the touch pads. The fillers 556*a*, 556*b*, 556*c* may be separated or isolated from one another via an opaque element or material disposed therebetween so that light emanating through one of the fillers does not leak to another of the fillers. As shown in FIG. 32, the keypad 552 includes at least one conductive element 558 that extends between and electrically conductively connects the conductive coating at the rear surface of the substrate 524 with sensor circuitry at the circuit board 554.

In the illustrated embodiment, a pair of conductive connectors 558 extend between the rear surface of the substrate 524 with sensor circuitry at the circuit board 554 for each of the touch pads 540a, 540b, 540c. The conductive elements 558 are disposed in and through the respective filler portions and may comprise any suitable electrically conductive material, such as, for example, electrically conductive rubber or other flexible/compressible conductive material, and/or an electrically conductive metallic material or electrically conductive polymeric material or the like. Optionally, and desirably, the conductive elements comprise a flexible or compressible rubber or polymeric material so that abrasion at the coated rear surface of the glass substrate may be reduced in situations where a relative vibration between the glass substrate and the conductive elements may occur. The conductive elements 558 may be disposed along passageways formed through the silicone fillers or may otherwise be disposed at or in the fillers. The conductive elements 558 may connect to and extend from sensor circuitry at the circuit board 554, while one or more backlighting elements (such as one or more light emitting diodes) may be disposed at the circuit element and generally at the base of the respective silicone filler portions 556a, 556b, 556c to provide illumination at and through the silicone material to provide a diffuse backlighting to the touch pad and/or icon of the respective silicone filler portions.

Thus, the keypad 552 may be disposed at and behind the touch pad areas of the mirror reflective element assembly and its individual conductive elements and silicone portions may be aligned with the respective touch pads and urged against the rear surface of the substrate of the reflective element at those touch pads, whereby electrical connection is established between the electrically conductive coating at the rear surface of the substrate and the sensor circuitry at the circuit board via the contact of electrical conductive connectors 558 (which extend from and are electrically connected at the circuitry at the circuit board) at the electrically conductive coating at the rear surface of the substrate. Thus, the keypad assembly 552 provides a translucent material between the backlighting light emitting diodes of the circuit board and the backlit buttons or touch pads at the reflective element substrate, thereby diffusing the light so that hot spots at the backlit buttons are reduced and/or obviated to enhance the backlighting of the button or touch pad areas. The keypad assembly 552 includes integral electrically conductive elements that extend through the translucent material (which may include diffuser pigments therein) between the circuitry at the circuit board and the electrically conductive coating or layer at the rear surface of the glass substrate (such as a metallic reflector coating at the rear surface of the substrate or a transparent electrically conductive coating or layer at the rear surface of the substrate), thereby providing electrical connection between the circuitry and the touch pad areas.

The electrically conductive elements are thus integrated in the keypad so that the keypad may be disposed at the circuit board at, for example, the rear surface of a rear substrate of an electrochromic mirror reflective element, and the conductive elements and translucent material may extend from the circuit board at the rear surface of the rear substrate and span the rear substrate and interpane cavity or gap so as to contact the rear surface of the front substrate at the touch pad area (and where the front substrate extends outboard beyond the perimeter edge of the rear substrate to provide an overhang region at which the touch pads are established and at which the keypad is disposed). As shown in FIG. 32, the conductive elements and translucent material may extend approximately four to ten millimeters (or more or less) depending on the particular application and location of the circuit board relative to the reflective element and glass substrate.

Although described above as having three touch sensors or proximity sensors at the mirror reflective element, it is envisioned that an interior rearview mirror assembly of the present invention may have more than three sensors or less than three such sensors, depending on the particular application of the mirror assembly. For example, and with reference to FIG. 33, an interior rearview mirror assembly 510 includes a mirror reflective element 514 (such as a prismatic reflective element as shown, but optionally could be an electro-optic reflective element assembly or cell), and includes user inputs or circuitry or switches disposed behind the reflective element 514 and behind the touch zone 540 (having two etched or formed individual inputs or touch sensors 540a, 540b), with the user input circuitry or switches, such as touch or proximity sensing circuitry or capacitive switches (such as described above) disposed at a lower perimeter region or rim of the reflective element. The individual touch sensors comprise the individual electrically isolated touch pads 540a, 540b formed at the touch zone 540 of the reflective element 514 and comprise the sensing elements and/or circuitry and/or switches disposed at or behind the individual electrically isolated touch pads at the touch zone 540.

As can be seen with reference to FIG. 33, the touch or proximity sensors may be disposed behind the reflective element and behind the icons or indicia that are indicative of the function of the electronic switch associated with each sensor (in other words, there are no separate "buttons" established at the sensors and at or near or below the icons or indicia that indicate the function of the buttons or touch pads). In the illustrated embodiment, the mirror assembly 510 comprises a bezelless or frameless prismatic mirror assembly, such as a mirror assembly utilizing aspects of the mirror assemblies disclosed in U.S. Des. Pat. Nos. D633,423; D633,019; D638,761; and/or D647,017, and/or PCT Application No. PCT/US2010/032017, filed Apr. 22, 2010, and/or PCT Application No. PCT/US10/51741, filed Oct. 7, 2010, which are hereby incorporated herein by reference in their entireties). However, the touch or proximity sensors may be used in other mirror constructions while remaining within the spirit and scope of the present invention.

In the illustrated embodiment, the mirror assembly includes two touch pads or sensors established at and behind the icons or indicia that are viewable by the driver of the vehicle to indicate to the driver the function of the sensors and associated circuitry or switches. The icons may be established (such as at the second or rear surface of the glass substrate) via etching or the like, and the icons may be painted or colored or shaped so that their associated functions are readily discernible to the driver viewing the reflective element. Preferably, the icons are established and printed on the rear surface of the glass substrate, but could be on the front surface of the glass substrate (or could be on the third or fourth surface of an electro-optic reflective element having a front and rear substrate, such as described herein). It is preferred to establish and print the icons at or on the rear surface of the glass substrate to avoid affects such as parallax (such as if the icons were established at a surface of a rear substrate of an electrochromic mirror reflective element or the like), and, with the icons or indicia printed at the rear surface of the glass substrate, the glass substrate itself protects against wear of the icons during use (because if the icon is printed on the front surface of the glass substrate, touching the icon may wear the printed ink or paint or the like from the icons over time).

The central region of the icons may have the reflective coating or layer (established at and across the rear surface of the glass substrate) removed so that the icons show through the reflective element, such as via soda blasting or laser ablation or etching or the like, and the desired color and indicia may be printed or painted at the established non-reflective region (for example, the icons or indicia may be printed at the second surface of the substrate, such as via ink jet printing, pad printing, screen printing, laser printing and/or the like). In order to provide the desired appearance, the painted or printed surface may have portions of the paint and/or reflective coating or layer soda blasted or laser etched off or otherwise removed from the second or rear surface of the glass substrate. The painting or printing and/or etching/removal may provide a shape and color and overall appearance of the icon or indicia that is typical of the standardized color and shape of user inputs for the particular system and/or particular brand of automaker for which the mirror assembly is provided. Optionally, and as shown in the illustrated embodiment, an additional isolation ring or line may be established (such as via soda blasting or laser etching or the like) around the printed icon or indicia, in order to further demarcate the icon and electrically isolate the conductive area of the touch pad or touch region at the icon from the rest of the reflective surface of the reflective element.

In the illustrated embodiment of FIG. 33, the mirror assembly 510 includes two touch sensors or touch pads 540a, 540b (instead of the three sensors of the mirror assemblies 310, 410 discussed above). The functions of the touch sensors may vary depending on the particular application of the touch sensors and mirror assembly and depending on the vehicle manufacturer of the vehicle that incorporates or is equipped with the mirror assembly. For example, the illustrated mirror assembly 510 includes touch sensors for a U-CONNECT™ system, such as for a telematics system used on Chrysler vehicles. Such a system includes user inputs that provide a telematics connection or telephone call initiation function (such as touch pad 540a) and an emergency call function (such as touch pad 540b), but clearly other functions could be provided while remaining within the spirit and scope of the present invention.

The icon and associated touch or proximity sensor may be used as the actual switch and may utilize multiple technologies. Optionally, for example, the touch proximity sensor may utilize capacitive touch technology, IR touch technology, ALSENTIS™ touch systems technology, capacitive sensing technology, field effect technology, HSS technology and/or the like, depending on the particular application of the mirror assembly and user inputs or touch/proximity sensors.

Optionally, the icons or indicia at the touch pads may be backlit by one or more light sources, such as light emitting diodes or the like. Optionally, for example, the mirror assembly may include an FPC material or a thin FR-4 PCB and light pipes to implement the switches and/or backlighting for the mirror assembly. Optionally, for example, the mirror assembly may eliminate the ITO and utilize a chrome or copper material on the FPC directly connected to the second surface of the glass to implement the switches and backlighting. Optionally, for example, the mirror assembly may include small carbon pads to connect a thin FR-4 PCB or FPC to the switch area (that can be any suitable conductive layer, such as ITO or chrome or the like), in order to provide capacitive touch switches and to minimize alignment with the touch pad areas. Optionally, for example, the mirror assembly may configure the FPC or thin FR-4 PCB to handle two or three (or more or less) switches on the same circuit element or printed circuit board (PCB) that could connect through an electrical connector (such as, for example, a zero insertion force or zif connector or the like) to a main PCB assembly of the mirror assembly. Optionally, for example, the mirror assembly may include a black mask on the front side of the FPC and LEDs on the back side of the FPC, with light piping built in for back lighting the icons at or near the touch pad area, and the circuit element may include an electrically connector (such as a small tab or connector) to electrically connect to a mother board of the mirror assembly (that may be disposed at the rear of the reflective element or the like).

Optionally, and with reference to FIGS. 34-37, the mirror assembly 510', 510", 510''', 510'''' may include a variety of accessories, such as one or more microphones 560. The microphone or microphones may be disposed at any desired location at the mirror head or mirror casing, such as along the bottom region or side region, but preferably at the upper or top region of the mirror head. The microphone or microphones may extend or protrude from the casing or may be recessed in the casing so as to be less visible to the driver of the vehicle. Optionally, the microphone or microphones may be disposed at the angled rear wall of the mirror casing (and may be recessed thereat or be proud thereof) so as to be generally not visible to the driver of the vehicle when the mirror assembly is normally mounted in the vehicle. The microphone may comprise any suitable microphone or microphones, and may comprise a plurality or array of at least two microphone elements (such as by utilizing aspects of the microphones described in U.S. Pat. No. 7,657,052, which is hereby incorporated herein by reference in its entirety). The audio pickup from within the vehicle cabin may be fed to and processed by a digital signal processor or DSP (which may be located in the interior rearview mirror assembly itself or may be located elsewhere in the vehicle), such as described in U.S. Pat. Nos. 7,853,026; 6,278,377 and/or 6,420,975, which are hereby incorporated herein by reference in their entireties.

Figure 37:
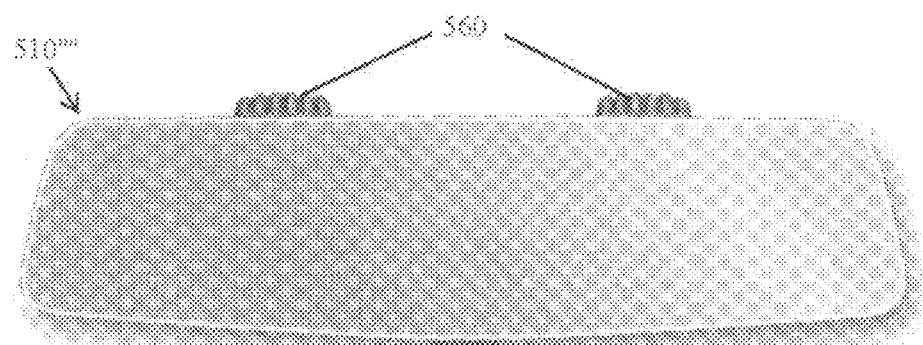
Figure 36:
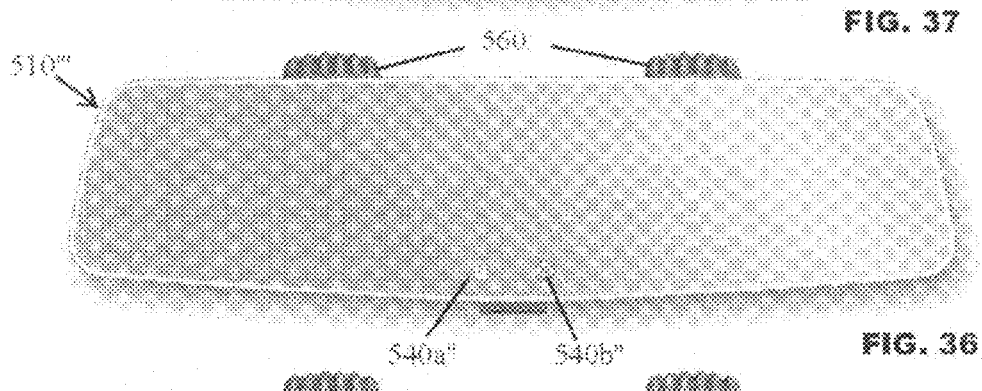
Figure 35:
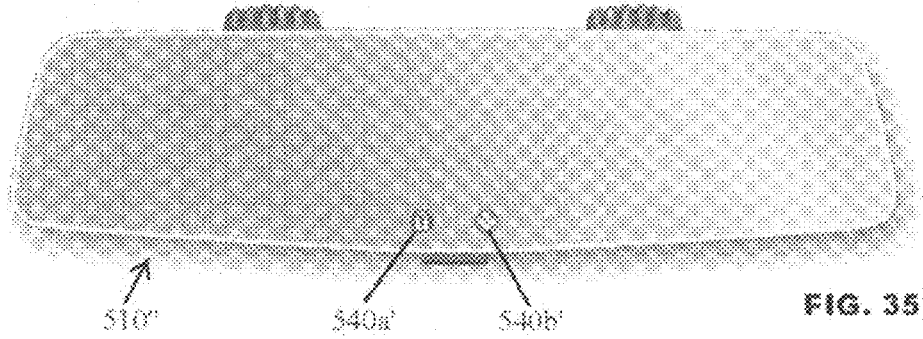

As shown in FIG. 34, the mirror assembly 510' may include one or more touch sensors or touch pads and icons 540a, 540b, such as in a similar manner as described above. Optionally, and as shown in FIG. 35, the mirror assembly 510" may include touch sensors or touch pads and icons 540a', 540b', which do not include the additional isolation line around the sensor/pad area (and shown with the icons soda blasted or laser etched at the switch area and printed or painted with the desired graphics/colors). Optionally, and as shown in FIG. 36, the touch pads and icons 540a''', 540b'' may be similar to the touch sensors described above, but the telematics icon or telephone call initiation icon may be an etched icon, without the colored background (with the etching of an outline of the indicator or icon through the mirror reflector), such that the icons provide display-on-demand icons that are readily viewable and discernible to the driver of the vehicle when backlit but are not readily viewable and discernible when not backlit. Optionally, and as shown in FIG. 37, the mirror assembly 510'''' may include microphones 560, and not any touch pads or icons at the mirror reflective element.

Although illustrated as a prismatic element, a mirror assembly of the present invention may comprise an electro-optic mirror assembly, such as an electrochromic mirror assembly having an electrochromic mirror reflective element with a front substrate and a rear substrate and an electrochromic medium disposed therebetween. In that regard, where projection/projective capacitance is used for the touch/proximity sensors or pads at the reflective element, it is preferable to use thinner glass substrates for the electrochromic mirror laminate, such as a glass substrate having a thickness of around 1.1 mm or thereabouts and/or 1.6 mm or thereabouts (or more or less depending on the particular application). The thinner substrate or substrates reduces the distance and glass medium that the capacitive sensor has to sense through to detect the "touch" at the mirror reflective element. Optionally, the touch sensor may be disposed behind only the front substrate, with the rear substrate being either offset or recessed at the touch sensor area so that the touch sensor need only sense the change in capacitance through the front glass substrate of the electrochromic mirror reflective element (and thus has less glass to sense through). Optionally, for example, the mirror reflective element could have a recess or jog in the rear substrate at the touch pads (such as described in U.S. Pat. Nos. 7,224,324 and/or 7,110,156, and/or U.S. Des. Pat. Nos. D493,131 and/or D493,394, which are all hereby incorporated herein by reference in their entireties).

Other mirror constructions and configurations and touch sensor/touch input/touch control constructions and configurations are contemplated within the scope of the present invention. For example, and with reference to FIGS. 38-41, an interior rearview mirror assembly 610, 610', 610", 610''' includes a reflective element 614, 614', 614", 614''' with touch sensors or touch pads or touch inputs disposed at and behind the reflective element. The mirror assembly and mirror reflective element constructions of FIGS. 38-41 are generally similar to one another, with icons 642, 642', 642", 642''' established at different areas or in different manners to indicate the presence and/or function of respective touch sensors or user inputs disposed at or near the icons. The user inputs and touch sensors and mirror assemblies may be otherwise similar to the mirror assemblies discussed above, such that detailed discussions of the mirror assemblies need not be repeated herein.

For example, as shown in FIG. 38, the icons 642 are established at and through a light absorbing, preferably substantially opaque and optionally reflecting, perimeter band 636 established around the border of the reflective element, preferably established at a second surface of a two substrate laminate type electrochromic mirror construction or at a second surface of a single substrate prismatic reflective element construction (such as in a similar manner as described above with respect to band 336 of mirror assembly 310), with the perimeter band 636 being enlarged or broadened at the user input area, and with the icons 642 being disposed in front of the touch sensors so that a user touches the icons to activate the respective user inputs or electrical switches or sensors disposed therebehind. The intuitive button design provides the icons or touch pads below the primary reflective area to keep fingerprints away from view and to limit viewability or discernibility of any smudging at the icons. The icons may be visible at all times (regardless of backlighting status or degree of dimming of the reflective element), and optionally a "fault" icon (that indicates to the driver of the vehicle when an error or fault is detected in the telematics system, such as ONSTAR® or U-CONNECT™ or the like, or when the telematics system or user input or touch system is not functioning properly) may be disposed at the primary reflective area and may be viewable through the mirror reflector when backlit (thus providing a display on demand type of display for the fault icon).

Optionally, and as shown in FIG. 39, the mirror assembly 610' may have the icons 642' established at the primary reflective area of the reflective element. Such icons may comprise display on demand type icons or displays and thus may be viewable through the mirror reflector and be discernible to a driver viewing the reflective element when the icons are backlit or illuminated, and may be substantially not discernible when not backlit or illuminated. Thus, it is envisioned that a telematics electrochromic mirror and a base electrochromic mirror may use the same reflective element, which would appear the same when the icons are not backlit or powered. The sensors may be disposed behind the rear substrate (such as at the fourth surface of the reflective element) or behind only the front substrate (at the second surface of the reflective element and at a cutaway or offset region). Because the icons and touch sensors are disposed at the primary reflective area of reflective element 614', the reflective element may have a reduced width perimeter band 636', if desired.

Optionally, and as shown in FIG. 40, the icons 642" of mirror assembly 610" are disposed below the primary reflective area and at a darkened or generally or substantially light absorbing or opaque background area 643" established at the button or touch region and optionally through a perimeter band 636" of the reflective element. The icons thus may be visible and discernible at all times and the darkened background may help to hide or render less noticeable any fingerprints or smudges at the touch area. Optionally, the area at which the icons are established may be devoid or partially or substantially devoid of the mirror reflector (such as by masking of the reflective element during deposition of the mirror reflector coating so as to establish a light transmitting window through the reflective element), and an appliqué may be disposed at or established at the window area to render covert the icons when the icons are not backlit. Optionally, the appliqué may comprise a darkened or opaque appliqué or may comprise a reflective appliqué (that may match or substantially match the spectral reflectance of the mirror reflector as viewed by the driver of the vehicle so that the appliqué is not readily discernible to a person viewing the mirror reflective element when the mirror assembly is normally mounted in the vehicle) that is substantially reflective and partially transmissive of visible light so that the icons are rendered covert behind the appliqué when not backlit but are viewable through the appliqué when the icons are backlit or illuminated or activated. For example, a prismatic mirror reflective element may have a mirror reflector coating established at its rear surface except at a window area that is devoid or substantially devoid of the mirror reflector coating, and a partially reflective and partially light transmissive appliqué may be established at the window area so that the icons disposed behind the appliqué and the reflective element are substantially hidden or rendered covert by the appliqué (such that the mirror reflective element appears to have a continuous and uniform reflector coating when viewed by a driver of the vehicle and when the icons are not illuminated or activated) and are viewable through the appliqué when the icons are illuminated or activated.

Optionally, the mirror assembly 610''' may include icons 642''' established at the primary reflective surface or area of the reflective element 614''' (or at a perimeter band region or a darkened region such as in the manners described above), while the user inputs or touch sensors or buttons 640''' may be accessed at a lower region of the mirror assembly beyond and below and separate from the outer glass surface of the reflective element. Such a construction avoids or reduces fingerprints or smudges at the outermost glass surface of the reflective element and may allow for a smaller or thinner or narrower perimeter band 636''' around the reflective element. The icons may always be viewable or may comprise display on demand type icons or displays and thus may be viewable through the mirror reflector and be discernible to a driver viewing the reflective element when the icons are backlit or illuminated, and may be substantially not discernible when not backlit or illuminated. Optionally, it is envisioned that a telematics electrochromic mirror and a base electrochromic mirror may use the same reflective element, which would appear the same when the icons are not backlit or powered. Optionally, a "fault" icon (that indicates to the driver of the vehicle when an error or fault is detected in the telematics system, such as ONSTAR® or U-CONNECT™ or the like, or when the telematics system or user input or touch system is not functioning properly) may be disposed at the primary reflective area and may be viewable through the mirror reflector when backlit (thus providing a display on demand type of display for the fault icon).

Optionally, and with reference to FIGS. 42 and 43, the user inputs or touch sensors 742, 742' of a mirror assembly 710, 710' may be disposed at a touch element 743, 743' disposed at a lower region of the mirror assembly (such as at a bottom surface of the mirror casing or the like). As shown in FIGS. 42 and 43, the mirror assembly may include a mounting assembly 750, 750' for adjustably mounting the mirror head 752, 752' (including the reflective element) at the interior surface of the vehicle windshield. The mounting assembly may comprise a single ball pivot joint construction (with the mirror head mounted to a mirror mount via a single pivot joint attachment) or a double ball or pivot joint construction, such as shown in FIGS. 42 and 43 (with the mirror head mounted to a mirror mount via a double pivot joint attachment with a mounting arm extending between two pivot joints to pivotally attach the mirror head to the mirror mount, which may be attached to a mirror mounting button at the vehicle windshield), while remaining within the spirit and scope of the present invention. The touch element 743, 743' may have a surface 743a, 743a' that generally faces the driver of the vehicle when the mirror assembly is normally mounted in the vehicle and the surface may be angled downwardly as shown in FIGS. 42 and 43. The icons associated with the user inputs may be disposed at the reflective element or at the driver-facing surface of the touch element (and may be backlit or otherwise illuminated to enhance viewability of the icons and touch areas in low lighting conditions) so that the user or driver is cognitively aware of the function of the respective user inputs. The touch element may include one or more illumination sources to illuminate or backlight the user inputs to ease the driver's use of the user inputs in lower lighting conditions.

The mirror assembly may comprise any suitable construction, such as the mirror assembly 710 of FIG. 42, with the reflective element 714 nested in the mirror casing 715 and with the mirror casing having a curved or beveled perimeter edge 715a around the reflective element 714 and with no overlap onto the front surface of the reflective element (such as by utilizing aspects of the mirror assemblies described in U.S. Pat. Nos. 7,255,451; 7,289,037; 7,360,932; and/or 8,049,640, and/or U.S. patent application Ser. No. 12/900,063, filed Oct. 7, 2010, now U.S. Pat. No. 8,277,059; and/or Ser. No. 12/752,305, filed Apr. 1, 2010, now U.S. Pat. No. 8,529,108, or such as the mirror assembly 710' of FIG. 43, with the rear substrate 726' of the reflective element 714' nested in the mirror casing 715', and with the front substrate 724' having curved or beveled perimeter edges such as described in U.S. Des. Pat. Nos. D633,423; D633,019; D638,761; and/or D647,017, and/or PCT Application No. PCT/US2010/032017, filed Apr. 22, 2010, and/or PCT Application No. PCT/US10/51741, filed Oct. 7, 2010, which are hereby incorporated herein by reference in their entireties (mirrors of such construction are commercially available from the assignee of this application under the tradename INFINITY™ mirror). As shown in FIG. 43, the touch element 743' may be disposed at the perimeter edge of the front substrate of reflective element 714' or the touch element may be disposed rearward of the front substrate and at the bottom wall or surface of the mirror casing, while remaining within the spirit and scope of the present invention.

Thus, the touch element 743, 743' provides touch pads or touch sensors that are ergonomically and readily accessible by the driver simply touching or approaching the element 743, 743' under the mirror assembly. The touch element may comprise a separate element attached at the lower region of the mirror casing or may be integrally formed with and at the lower region of the mirror casing. Although shown in an electrochromic mirror application, it is envisioned that such touch elements may be suitable for prismatic mirror constructions as well, while remaining within the spirit and scope of the present invention. Optionally, the touch sensors of the elements may comprise any suitable touch sensing or proximity sensing means, such as, for example, capacitive touch technology, IR touch technology, ALSENTIS™ touch systems technology, capacitive sensing technology, field effect technology, HSS technology and/or the like, depending on the particular application of the mirror assembly and user inputs or touch/proximity sensors.

Optionally, any of the user inputs and iconistic touch pads or display areas discussed above may be suitable for use in a prismatic interior rearview mirror assembly, while remaining within the spirit and scope of the present invention. For example, and with reference to FIGS. 44-47, a prismatic interior rearview mirror assembly 810, 810', 810'', 810''' may include a reflective element 814, 814', 814'', 814''' and toggle mechanism 817, 817', 817'', 817''' and user inputs, such as user inputs disposed behind the reflective element. Optionally, for example, the user inputs may be disposed behind associated icons 842, 842'', 842''' in FIGS. 44, 46 and 47, or user inputs 840' may be disposed at a lower region of the mirror assembly below the respective icons 842' as shown in FIG. 45. Optionally, and such as shown in FIG. 44, the icons 842 may be formed at darkened touch areas 843, or optionally, and such as shown in FIG. 47, the icons 842''' may be formed at a darkened touch band or area 843''', such that fingerprints and/or smudges at the touch areas may be less visible/discernible. The user inputs and touch sensors and mirror assemblies may be otherwise similar to the mirror assemblies discussed above, such that a detailed discussion of the mirror assemblies need not be repeated herein.

Optionally, an interior rearview mirror assembly may provide other user input layouts and/or designs and/or lighting schemes while remaining within the spirit and scope of the present invention. For example, and with reference to FIGS. 48-50, an interior rearview mirror assembly 910 (such as a prismatic mirror assembly as shown or such as an electro-optic mirror assembly such as an electrochromic mirror assembly) may include a reflective element 914 and user inputs, such as user inputs disposed behind the reflective element and disposed behind associated icons 942a, 942b, 942c. Optionally, and such as shown in FIG. 48-50, the icons may be formed at darkened touch areas 943, such that fingerprints and/or smudges at the touch areas may be less visible/discernible. The user inputs and touch sensors and mirror assemblies may be similar to the mirror assemblies discussed above, such that a detailed discussion of the mirror assemblies need not be repeated herein.

The indicia or icons 942*b*, 942*c* and associated user inputs are provided for a telematics system of a vehicle, such as an ONSTAR® system or the like. One of the indicia thus may indicate that a respective or corresponding user input or touch pad is for initiating a telephone call or the like, while another of the indicia 942*b* may indicate that a respective or corresponding user input or touch pad is for connecting the vehicle communication system or telematics system to a remote service or the like, and another of the indicia 942*c* (such as a red cross or an "SOS" icon or the like) may indicate that a respective or corresponding user input or touch pad is for connecting the vehicle communication system or telematics system to an emergency response system or the like. In the illustrated embodiment, the third icon or indicia 942*a* is for displaying a status of a passenger side airbag system, but it could indicate a user input for initiating a telephone call or other feature. Thus, the user may be readily recognize the functions associated with the user inputs and may be invited to touch the appropriate location of the front surface of the reflective element to activate/control the selected or desired function.

In the illustrated embodiment, the indicia or icons may be established at an appliqué that is disposed behind a window or area with a background color that demarcates or distinguishes the window or area from the principal reflecting area of the reflective element (such as, for example, a grey background color or the like). When the backlighting light sources (such as one or more light emitting diodes (LEDs) or the like) are deactivated (such as shown in FIG. 48), such as when the telematics system is not in use, the "white" portions of the graphics of the icons may be dark (or not backlit or illuminated), but the user can still readily identify where the telematics inputs or buttons are located. As can be seen with reference to FIG. 48, the icons 942*b*, 942*c* are still discernible at the reflective element, but the airbag status indicator 942*a* is dark not readily discernible at a person viewing the reflective element (because when the status indicator is off, there is no need for the user to know where the indicator is since the user would not have a need to access or touch the indicator).

As shown in FIG. 49, when the icons 942*a*, 942*b*, 942*c* are backlit (such as via a white backlighting LED or LEDs or the like), the white or clear portions of the graphics are illuminated and are highly visible or discernible at the reflective element. The icons may be individually backlit by respective LEDs or the like, and the intensity of the backlighting may be great enough so that a person may readily discern the backlit icons even during high ambient lighting conditions such as a sunny day (and the backlighting intensity may be adjustable responsive to an ambient light sensor and/or a glare light sensor and/or a mirror dimming sensor or element (such as for electrochromic mirror applications where the intensity may vary depending on the degree of darkening or dimming of the electrochromic mirror reflective element).

When a fault is detected (such as when an error or fault is detected in the telematics system, such as ONSTAR® or U-CONNECT™ or the like, or when the telematics system or user input or touch system is not functioning properly), the icon 942*b* may be illuminated in red (such as via a red backlighting LED or LEDs or the like) or other desired color (and/or may be illuminated or backlit at a different intensity, such as brighter, as compared to the normal operating intensity of the backlights) so the user can readily discern a change in the icons and readily recognize that a fault is detected. The icon 942*b* (the telematics or ONSTAR® graphic or the like) may be constantly or intermittently illuminated to indicate the fault condition. Optionally, and as shown in FIG. 50, all three of the icons 942*a*, 942*b*, 942*c* may be constantly illuminated or intermittently illuminated or flashed in red (or other color as desired) to indicate a detected fault condition. By constantly illuminating or flashing or otherwise illuminating (at a desired color and/or intensity) one or more of the icons to indicate a detected fault condition, the mirror assembly 910 may obviate the need for a separate fault indicator or light at the mirror reflective element.

Figure 51:
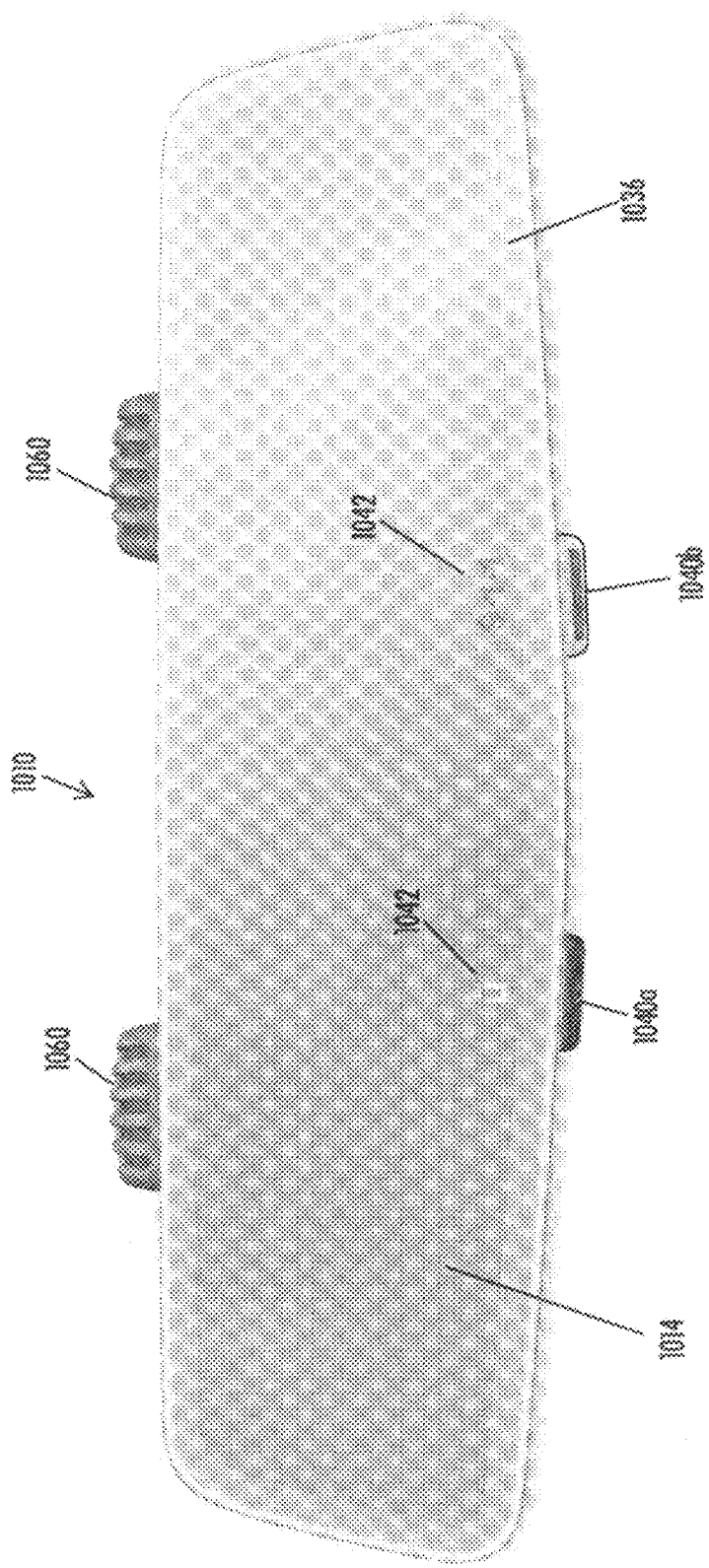
FIGS. 51-55 are views of another interior rearview mirror assembly in accordance with the present invention.
Figure 52:
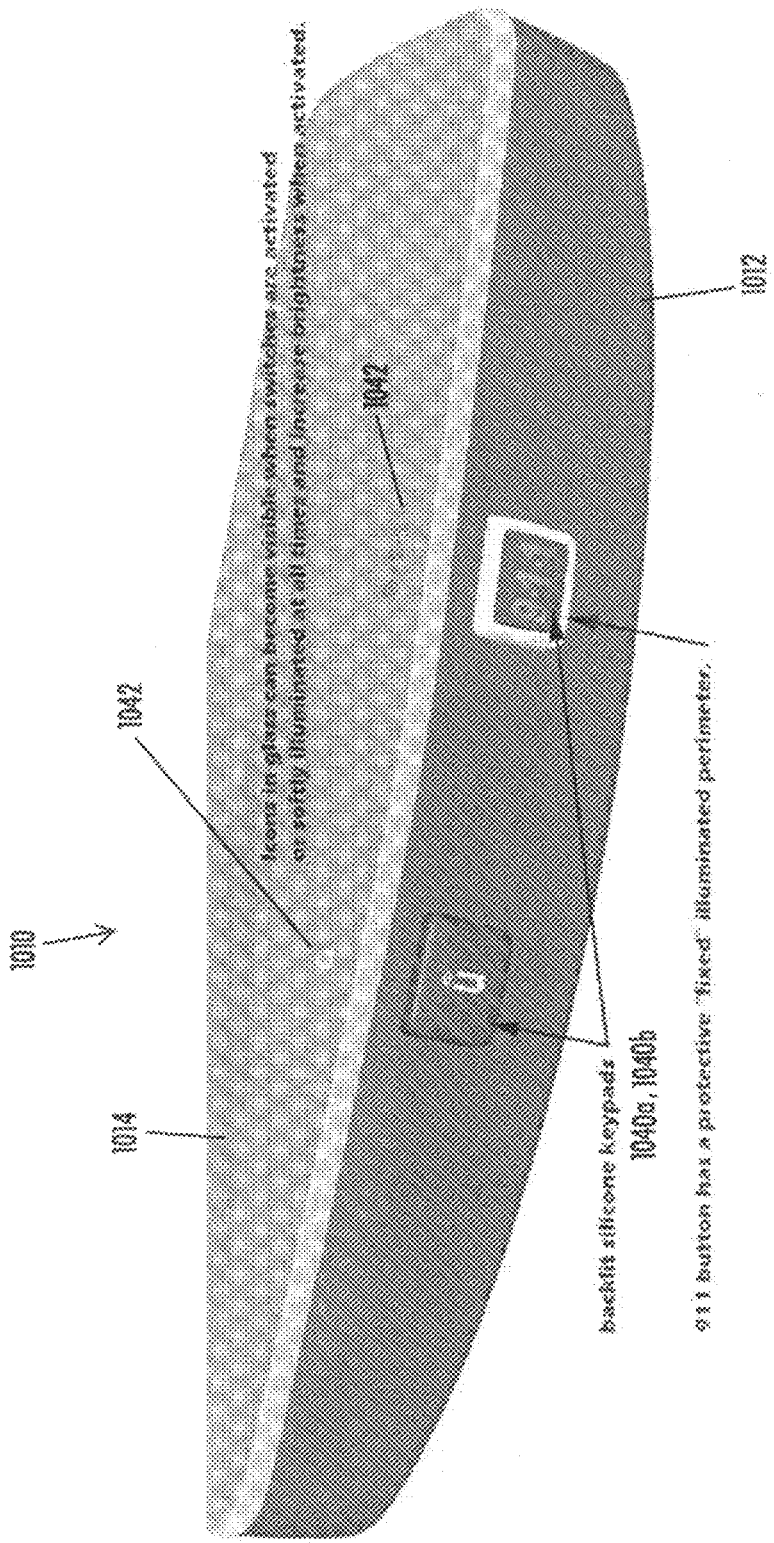
Figure 53:
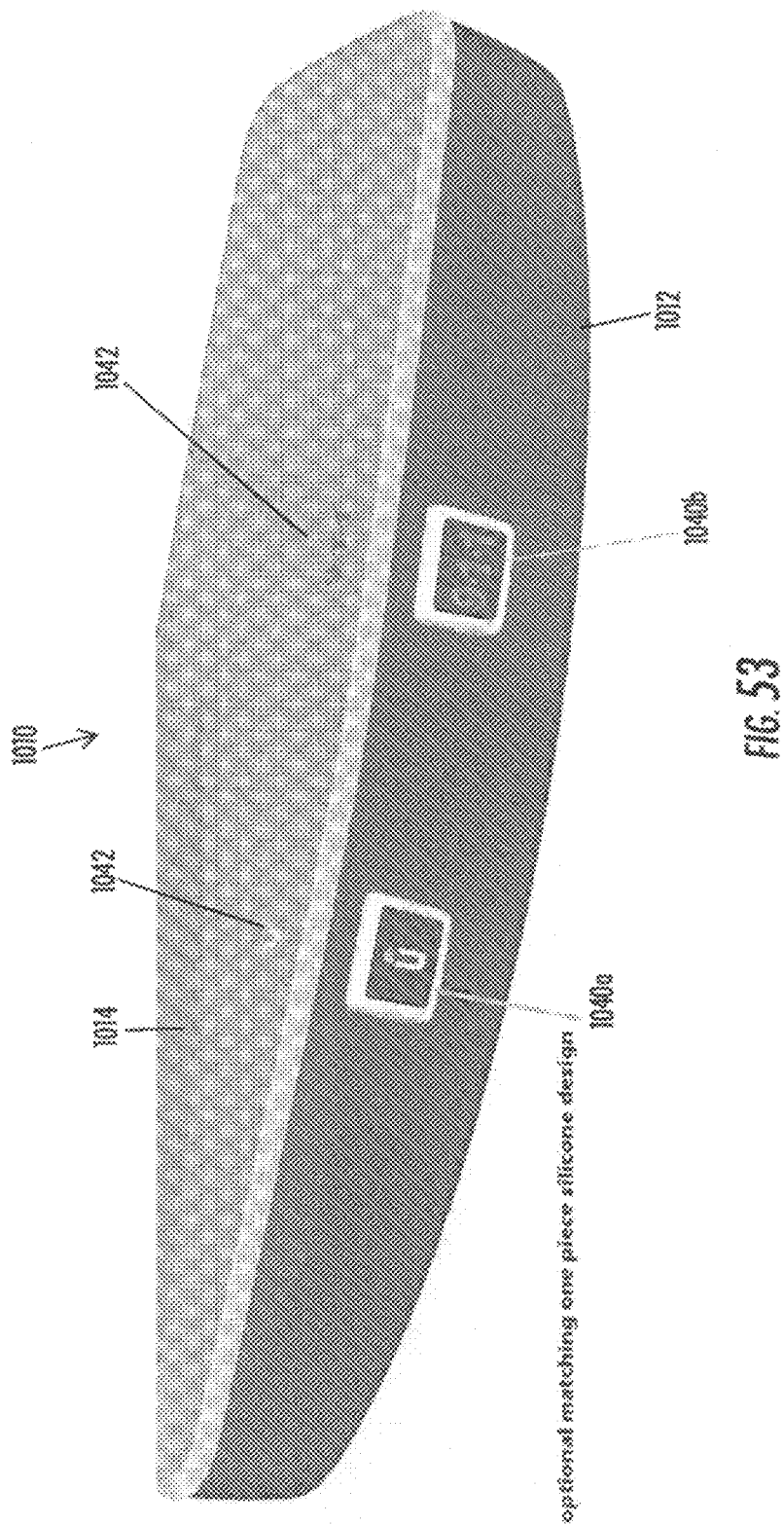
Figure 54:
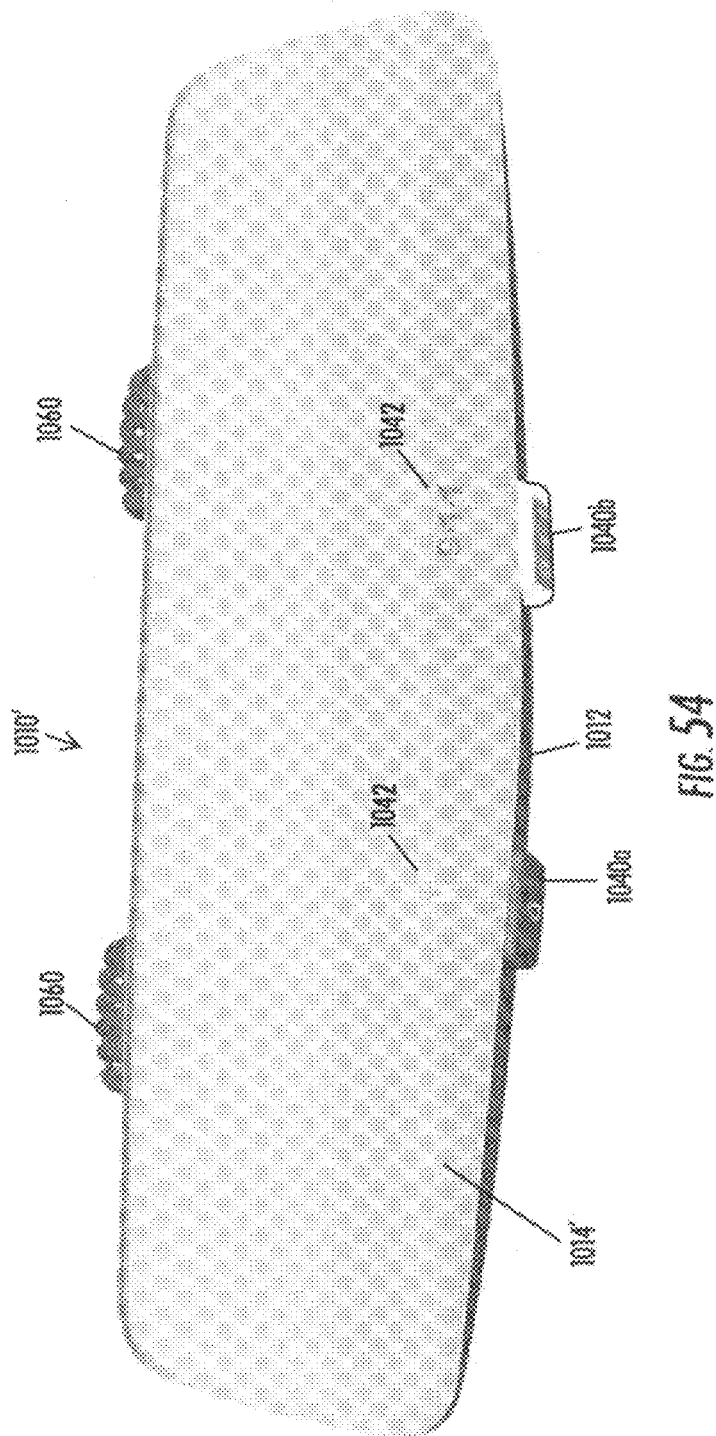
Figure 55:
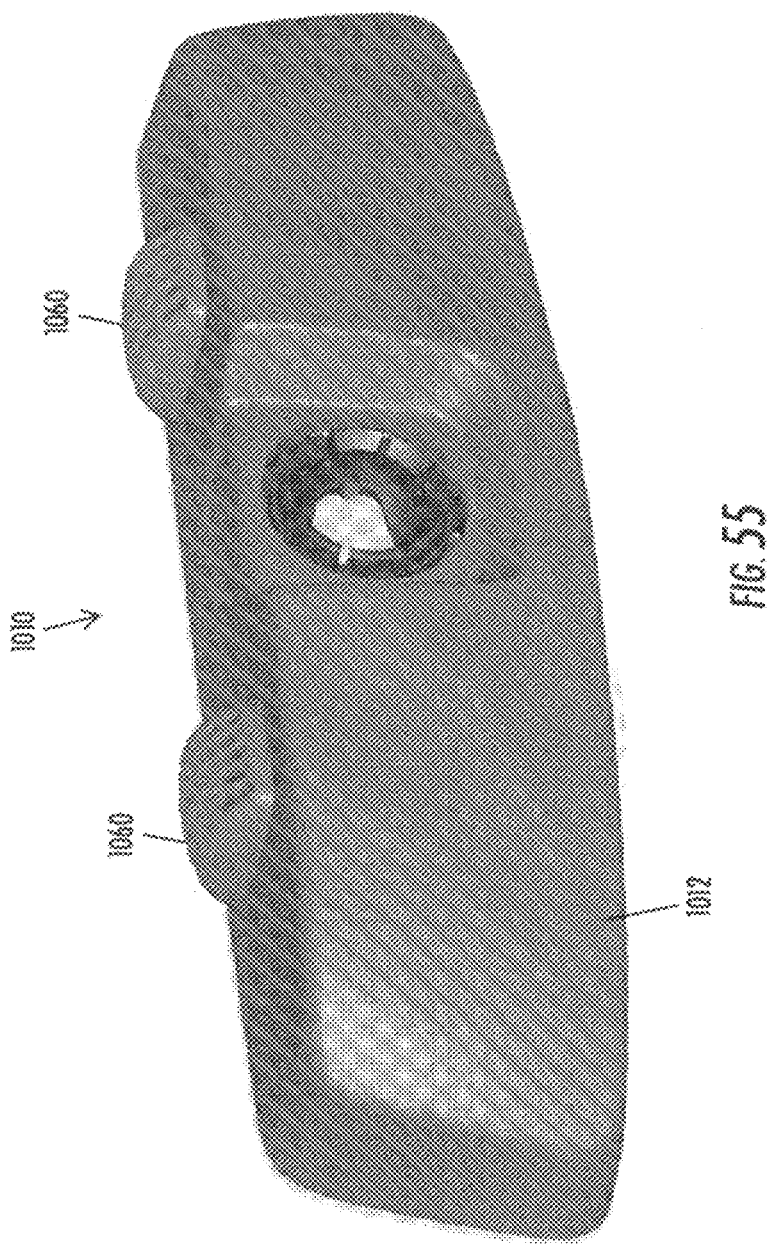

Optionally, and with reference to FIGS. 51-55, an interior rearview mirror assembly 1010 may include a reflective element 1014 and user inputs 1040*a*, 1040*b* disposed at a lower region of the mirror assembly below the respective icons 1042 (and optionally with microphones 1060 disposed at an upper region of the mirror casing 1012). Optionally, and such as shown in FIGS. 51 and 52, the icons 1042 may be established at the reflective element and may be illuminated when the user input 1040*a* or 1040*b* is activated so that the icons at the glass reflective element can become visible when the switches or inputs are activated, or the icons 1042 may be softly illuminated or backlit at all times (such as when the vehicle is being operated) and may have the intensity or brightness of the icons increased when the respective user input 1040*a*, 1040*b* is activated. In the illustrated embodiment, the user input 1040*a* may be for a telematics system (such as for ONSTAR® or U-CONNECT™ or the like, such as discussed above), while user input 1040*b* may be an emergency connect input, such as for calling 9-1-1 or the like (which may be part of the vehicle telematics system). As shown in FIG. 52, the user inputs 1040*a*, 1040*b* may comprise backlit silicone (or other material) keypads or the like, and optionally, the emergency button or input 1040*b* may have a protective illuminated perimeter portion that may be continuously or substantially continuously illuminated when the vehicle is operated. Optionally, and as shown in FIG. 53, the telematics input 1040*a* may also have a matching backlit/illuminated portion to correspond with the emergency input 1040*b*. The user inputs and touch sensors and mirror assemblies may be otherwise similar to the mirror assemblies discussed above, such that a detailed discussion of the mirror assemblies need not be repeated herein. Optionally, the reflective element 1014 of mirror assembly 1010 may include a perimeter band or hiding band 1036, such as described above, or the reflective element 1014' of mirror assembly 1010' may not include such a band (such as shown in FIG. 54). Although shown as an electro-optic mirror assembly (such as an electrochromic mirror assembly), aspects of the mirror assembly are suitable for prismatic mirror assemblies while remaining within the spirit and scope of the present invention.

Optionally, the mirror assembly may include a touch sensor or user input (such as behind or at the reflective element or at or in a bezel portion or casing portion of the mirror assembly) that is operable to selectively adjust the dimming level of the electrochromic mirror reflective element. Electro-optic (such as electrochromic) mirrors are typically automatically adjusted (responsive to a photosensor and/or glare sensor and/or the like) to pre-set levels of dimming for a given amount of ambient light or glare detected, and depending on the programming of the dimming circuitry or control. Optionally, a user input (such as a touch sensor or sensors or a mechanical switch or dial or the like) may be provided at the mirror assembly to provide a means of allowing the user (such as the driver of the vehicle) to manually and selectively adjust the level of darkness/ brightness that the mirror reflective element dims to (via darkening/lightening of the electrochromic medium), depending on the user's preference.

Because the mirror manufacturer or vehicle manufacturer pre-set dimming levels or programming may not be appropriate for all consumers, the user input and dimming control of the present invention allows the user to manually and selectively control or adjust the dimming of the mirror. For example, some users may prefer the mirror to be darker to allow for easier forward vision after looking at the rearview mirror, while other users may prefer the mirror to be lightened to enhance their rearward vision, such as during a reversing maneuver or the like (optionally, the dimming may be reduced automatically to lighten the mirror and enhance rearward vision during a reversing maneuver, such as responsive to the vehicle being shifted into a reverse gear).

The process of adjusting the level of the electrochromic reflective element or cell darkness (via the user input) may be accomplished via any suitable means. For example, a capacitive sensor may be disposed at or near the reflective element (such as behind the reflective element or at or in a bezel portion of the mirror casing or at or in a rear casing portion of the mirror casing or the like), whereby the user may move their finger along the surface of the housing, bezel or glass substrate, and the sensor may adjust the dimming or darkening accordingly. For example, if the user moves their finger from left to right along the sensor area, the mirror dimming may be reduced so that the reflectance is enhanced and the reflected images are brighter, while if the user moves their finger from right to left along the sensor area, the mirror dimming may be increased so that the reflectance is reduced and the reflected images are darker.

Optionally, a display or visual readout or audible feedback or the like may be provided to indicate to the user or operator what the level of dimming is adjusted to (such as the selected level relative to the maximum brightness (no dimming) and the minimum brightness (maximum dimming)). For example, one or more bars may appear (such as similar to bars that are typically used to show cell phone signal reception or the like) to show the level of dimming of the mirror reflective element. The display or visual feedback may be provided as a display or icon viewable through a transflective reflector of the mirror reflective element (where the display or icon is viewable when it is illuminated or backlit or energized and is not readily viewable or discernible when not illuminated or backlit or energized), or may be otherwise located at the reflective element or mirror casing for viewing by the driver of the vehicle. Optionally, for applications where the mirror assembly is equipped with a video display screen (such as for a reverse aide system or the like), the visual feedback may be displayed by the video display screen.

For example, a mirror assembly may include a capacitive sensor disposed along a lower portion or region of the reflective element or bezel or mirror casing with a display element disposed behind the reflective element and generally along and above the sensor. When a user's finger approaches the sensor area, the display be activated (and may show the level of dimming that the mirror reflective element is then set at, such as by the automatic dimming control of the mirror assembly) so that the user may view the displayed dimming level through the reflective element. Movement of the user's finger in either direction causes the mirror dimming control to adjust the dimming or to vary the reflectivity of the mirror reflective element accordingly, while the display is adjusted to provide visual feedback to the user pertaining to how much the user is adjusting the dimming level relative to the range of dimming that can be achieved (or relative to a range of dimming allowed or appropriate relative to the then current automatic dimming setting that is set by the automatic dimming control responsive to the then current ambient and glare lighting detected at or near the mirror assembly). The user thus can adjust the mirror dimming to a desired amount and may thus effectively override the automatic dimming set by the dimming control responsive to the ambient and/or glare light detected. Optionally, it is envisioned that the user may select and save a dimming profile (such as in a mirror memory function, which may provide for a driver 1 and driver 2 memory functions to allow multiple drivers to select and save a customized dimming profile) to save a selected amount or percentage of increased or decreased dimming, so that for all levels of automatic dimming, the mirror assembly sets the dimming level to a selected and saved amount above or below the factory pre-set levels. Thus, the user may customize the mirror dimming feature or profile to his or her desired dimming levels or dimming profile for any given ambient and/or glare lighting conditions.

Figure 56:
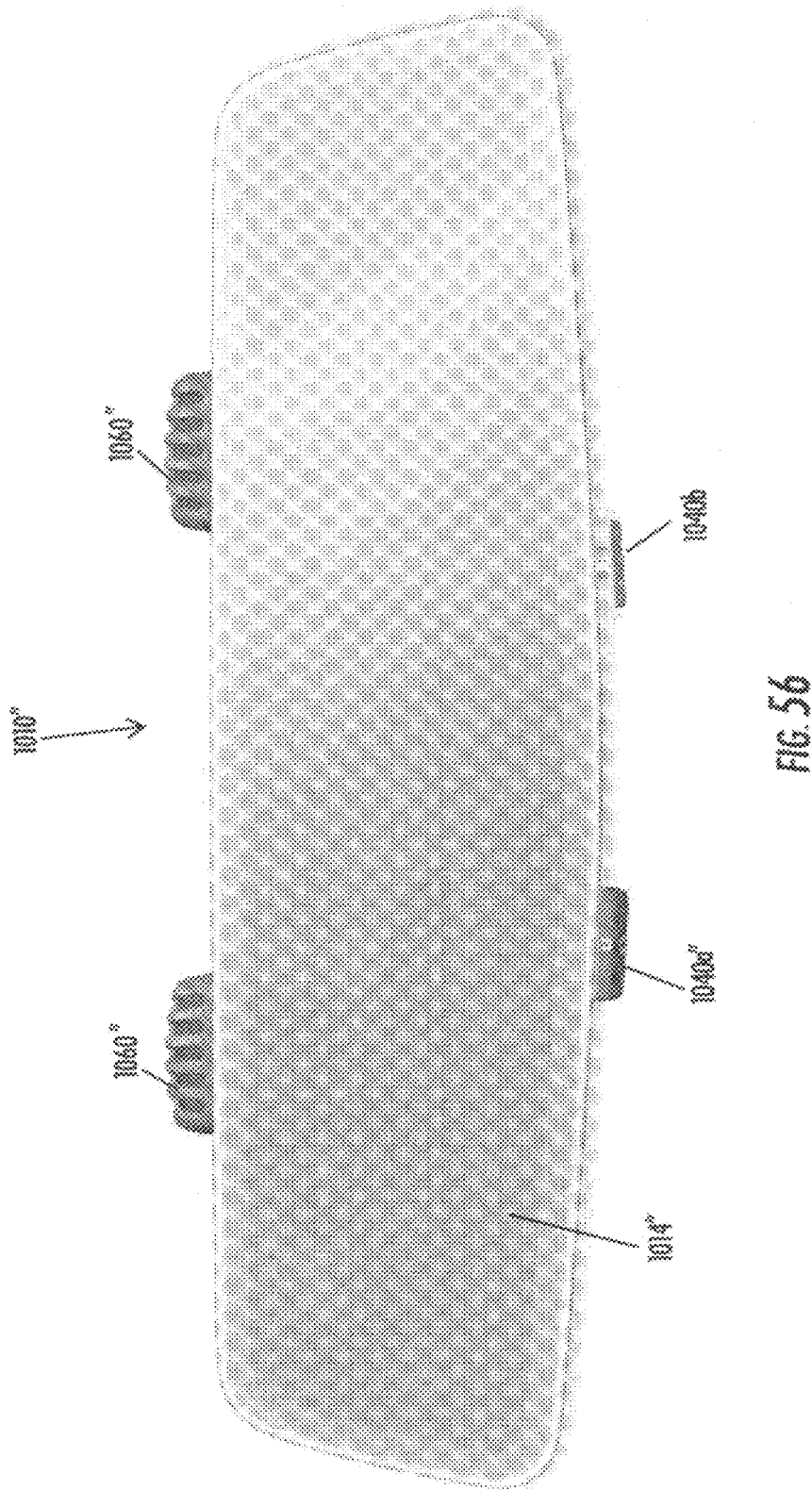
FIGS. 56 and 57 are views of another interior rearview mirror assembly in accordance with the present invention.
Figure 57:
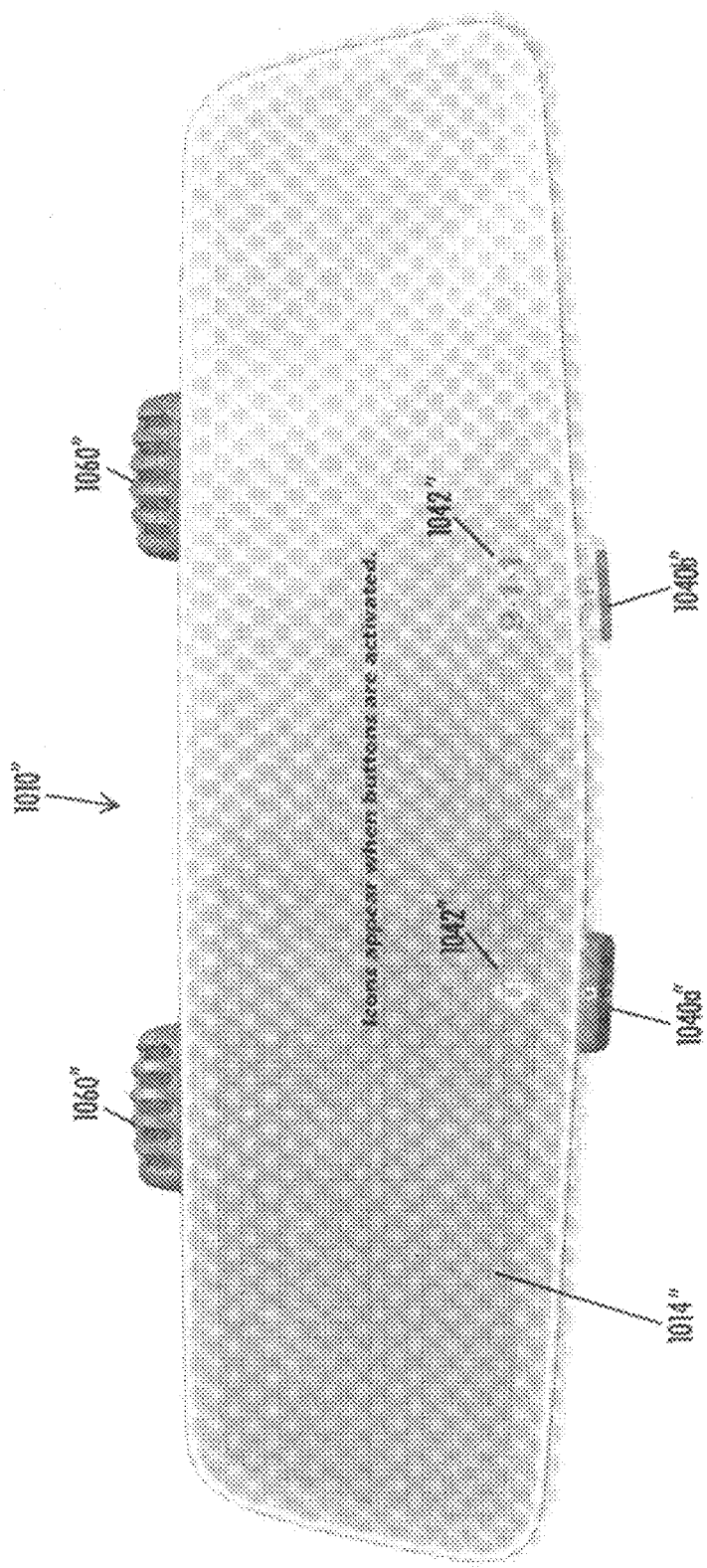

Optionally, and with reference to FIGS. 56 and 57, a mirror assembly 1010" may include a reflective element 1014" and user inputs 1040a", 1040b" disposed at a lower region of the mirror assembly below the respective icons 1042" (and optionally with microphones 1060" disposed at an upper region of the mirror casing). In the illustrated embodiment, the icons 1042" may be illuminated or backlit when the user input 1040a" or 1040b" is activated so that the icons at the glass reflective element can become visible when the switches or inputs are activated (such as shown in FIG. 57), yet are not illuminated or backlit and thus are not visible to the driver of the vehicle when the switches or inputs are not activated (such as shown in FIG. 56).

Thus, the mirror assembly includes mechanical switches at the bottom side or portion of the mirror assembly. The switches can be illuminated for night time viewing, if desired. The mirror assembly may include the icons behind the reflective element or cell (which may be display on demand type of icons or the like). Optionally, the switches may comprise mechanical push-button type switches or may comprise touch sensors or the like, while remaining within the spirit and scope of the present invention.

Figure 58:
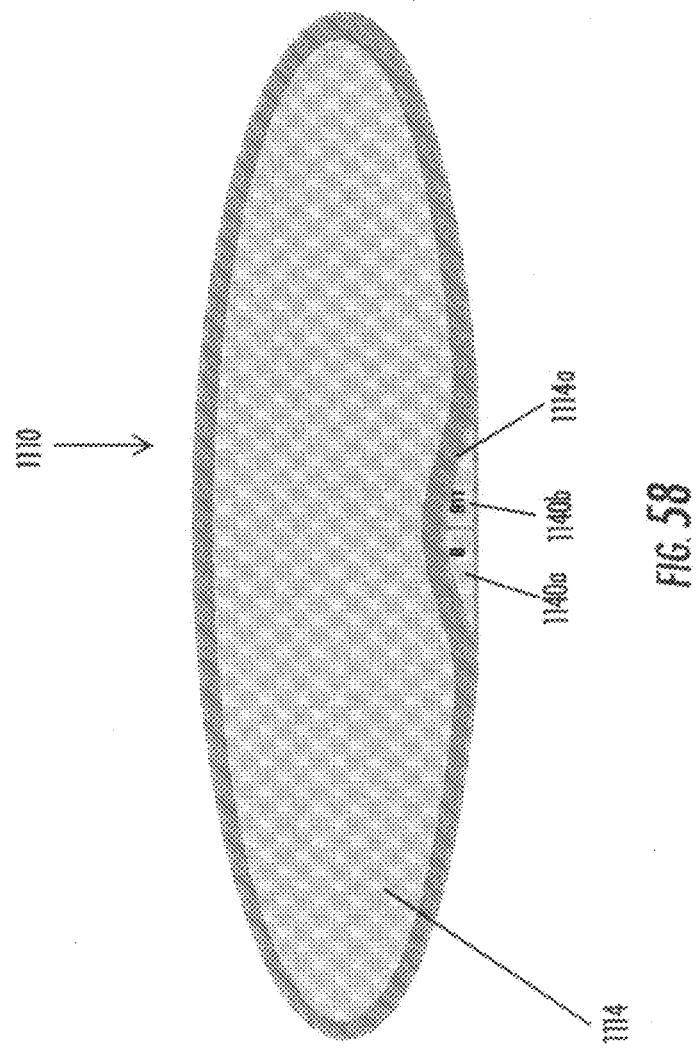
FIG. 58 is a plan view of another interior rearview mirror assembly in accordance with the present invention.

Optionally, and with reference to FIG. 58, a mirror assembly 1110 may have a reflective element 1114 that is cut-away or formed to provide a recess 1114a at a perimeter region thereof (such as at a lower generally central region of the reflective element) so that user inputs 1140a, 1140b may be disposed below the reflective element at the recess 1114a. The user inputs 1140a, 1140b may be softly illuminated or backlit when not activated and the intensity may increase when activated, and/or the user inputs may be associated with respective icons at the reflective element that may be activated or intensified when the user inputs are activated so that the icons are viewable at and through the reflective element, such as in a similar manner as discussed above. The mirror reflective element 1114 may include a perimeter band 1136 and/or may otherwise be similar to the mirror reflective elements described above, and may be an electro-optic reflective element or a prismatic reflective element, while remaining within the spirit and scope of the present invention. Thus, the mirror assembly 1110 may have mechanical switches or inputs (or touch or proximity sensors or inputs) at the lower region of the mirror assembly for actuating a telematics system and/or establishing an emergency contact and/or the like. The glass reflective element may be cut away or formed around the switches or user inputs so that a user can readily access and actuate the switches or inputs without touching the reflective element. The shape of the reflective element and/or the user inputs may vary depending on design preferences and the particular application of the mirror assembly.

Optionally, the mirror assembly may have the reflective element attached at a forward portion of the mirror casing (such as at an attachment plate or element at the forward portion of the mirror casing or the like), or the mirror assembly may include a separate attachment plate disposed between the mirror casing and the reflective element. For example, and with reference to FIGS. 59 and 60, an interior rearview mirror assembly 1210 includes a reflective element 1214 and a rear housing 1212, with an attachment element or plate 1262 disposed therebetween. The attachment plate 1262 comprises a generally planar front surface to which a generally planar rear surface 1214a of the reflective element 1214 is attached (such as via an adhesive or tape or the like). A rear edge or portion 1262a of the attachment plate 1262 is configured to attach to the front edge 1212a of the housing 1212, and may be partially received in the housing (or the housing may have a forward lip that is partially received in the rear portion of the attachment plate) or may be bonded to a flange or planar surface of the forward portion of the housing or may be attached to the housing via any other suitable means.

In the illustrated embodiment, the outer perimeter surface 1262b of the attachment plate 1262 is formed or shaped to be substantially flush with the outer perimeter surface of the housing 1212 when attached thereto. Also, the perimeter edge of the reflective element 1214 is formed or shaped or curved or beveled to provide a generally continuous non-sharp edge and a generally continuous curved transition between the front generally planar surface of the reflective element 1214 and the outer perimeter surface 1262b of the attachment plate 1262 when the reflective element 1214 is attached or adhered to the attachment plate 1262, such as in a similar manner as described above. The attachment plate is configured so that, when attached to the housing and to the reflective element, the outer surface of the attachment plate is visible to a person viewing the mirror assembly and forms a portion of the outer surface of the assembled mirror assembly construction.

Thus, when mirror assembly 1210 is assembled, the attachment plate provides an intermediate element between the housing and the reflective element. The addition of the separate attachment plate between the housing and the reflective element may better control the gap to cell relationship since there is no need to accommodate over travel that may be required to engage snaps or the like during assembly of the mirror assembly.

Figure 59:
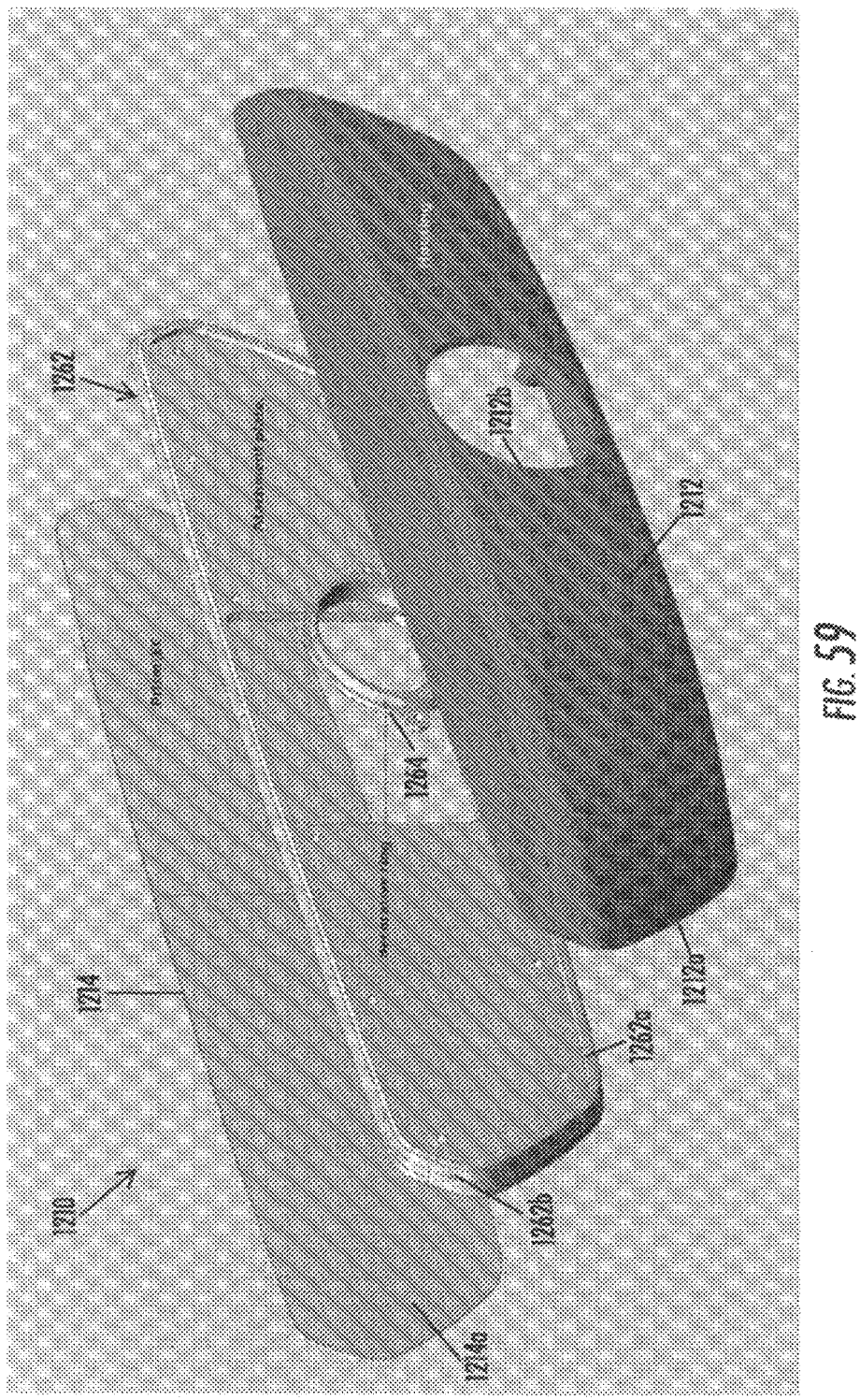
FIG. 59 is an exploded perspective view of another interior rearview mirror assembly in accordance with the present invention.

As shown in FIGS. 59 and 60, the attachment plate 1262 may be formed or colored in a different color than the housing to provide a visual enhancement (where the attachment plate and/or housing may be colored to a desired color or contrast color or brushed metal or chrome appearance or the like, so as to provide a desired appearance and optional customization to the mirror assembly). Optionally, the attachment plate may be customized (such that a user or manufacturer may select a desired color or exterior surface appearance of the attachment plate). Optionally, the attachment plate may comprise a molded transparent or translucent material and may be illuminated with LEDs or other light sources to create mood lighting or the like at the mirror assembly. Optionally, and as shown in FIGS. 59 and 60, the mirror assembly 1210 may include a decorative ring or element 1264 that is disposed at the aperture 1212b of the housing 1212 for the mounting arm or mounting assembly of the mirror assembly to pass therethrough for mounting the mirror assembly at an interior portion of a vehicle. The decorative ring 1264 may be colored or textured or effected to generally match (or contrast) the color or texture or effect of the attachment plate 1262 to provide an enhanced aesthetic appearance to the mirror assembly. For example, and as shown in FIGS. 59 and 60, the housing 1212 may comprise a dark or black plastic or polymeric structure and the attachment plate 1262 and ring 1264 may comprise a metallic appearance (such as chrome or brushed nickel or silver or the like) to provide a sharp contrast between the adjacent elements and thus to provide an enhanced aesthetic appearance to the assembled mirror assembly when the mirror assembly is mounted at the vehicle.

The mirror assembly 1210 may otherwise be similar in construction and operation to the mirror assemblies described above and may include user inputs or switches or touch or proximity sensors at or near the reflective element. For example, the mirror assembly may include user inputs at the reflective element by mounting the sensor at the attachment plate so that the sensor may be disposed at the rear of the reflective element. In such a mirror construction, the circuitry of the attachment plate may be electrically connected to electrical leads at the mirror housing or may include electrical leads that may be electrically connected to a wiring harness or lead of the vehicle when the mirror assembly is normally mounted at the vehicle.

Optionally, the attachment plate may include circuitry for the user inputs (such as switches or buttons at the lower perimeter region of the attachment plate or such as touch sensors or proximity sensors at and to the rear of the reflective element) and may include circuitry for providing the iconistic display at the reflective element (such as LEDs or the like for backlighting icons at the reflective element when the respective user input is activated). Thus, it is envisioned that the electrical content for a mirror assembly may be determined by selection of a desired or appropriate attachment plate or attachment plate module or unit (that includes the attachment plate construction and desired or selected user inputs and/or display elements and/or circuitry and electrical connections therefor), with the reflective element and housing comprising common or universal components. Thus, a mirror manufacturer may provide mirror assemblies with different electrical content and/or accessories and/or the like by selecting different attachment plate modules for attachment between the common or universal mirror housing and the common or universal mirror reflective element, depending on the application or selected options or content or the like.

The icons and associated touch or proximity sensors of the mirror assemblies of the present invention may be used as the actual switch and may utilize multiple technologies. Optionally, for example, the touch proximity sensor may utilize capacitive touch technology, IR touch technology, ALSENTIS™ touch systems technology, capacitive sensing technology, field effect technology, HSS technology and/or the like, depending on the particular application of the mirror assembly and user inputs or touch/proximity sensors. For example, the touch sensor may detect when a conductive object or material enters an electric field at or near the sensor. The sensor, responsive to a voltage applied thereto, may generate an electric field that may emanate through the glass substrate of the mirror reflective element, and when a conductive object or material enters the field, the sensor detects the change and generates an output signal indicative of the detected touch or proximity of the object or finger. Optionally, and desirably, the sensor may provide a digital output indicative of the sensing of the object or touch, Optionally, and desirably, the touch sensors may be operable over wide temperature ranges, such as between, for example, −40 and +120 degrees C., making it suitable for automotive applications.

Within the scope of the present invention, various touch or proximity technologies, including surface capacitance touch, projection (projected) capacitance touch, resistive touch, infrared (IR) touch (where an IR beam or the like is interrupted and/or sensed), surface acoustic wave (SAW) touch, and close field effect touch, as are commonly known in the touch sensor art. Such touch sensors may utilize aspects of the user input systems described in PCT/US10/51741, filed Oct. 7, 2010 and published Apr. 14, 2011 as International Publication No. WO 2011/044312, U.S. Pat. No. 7,360,932 and/or U.S. patent application Ser. No. 12/091,525, filed Apr. 25, 2008 and published Jan. 15, 2009 as U.S. Pat. Pub. No. US-2009-0015736; Ser. No. 11/239,980, filed Sep. 30, 2005 and published Jun. 15, 2006 as U.S. Pat. Pub. No. US-2006-0125919; Ser. No. 12/414,190, filed Mar. 30, 2009, now U.S. Pat. No. 8,154,418; and/or Ser. No. 12/576,550, filed Oct. 9, 2009 and published Apr. 15, 2010 as U.S. Pat. Pub. No. US-2010-0091394, which are hereby incorporated herein by reference in their entireties.

Other mirror and user input designs or configurations may be contemplated for a mirror assembly that incorporates touch sensors or proximity sensors in accordance with the present invention. For example, the mirror assembly may include a plastic molding that comprises a portion that (a) abuts a circumferential edge of the mirror glass substrate (such as the front glass substrate of an electrochromic mirror reflective element or a glass prism of a prismatic mirror reflective element) and (b) has an outer curved surface that extends from generally adjacent to a first surface of the glass substrate and that may lack a sharp edge, such as described in U.S. Pat. Nos. 7,255,541; 7,289,037; 7,360,932; and/or 8,049,640, and/or U.S. patent application Ser. No. 12/752,305, filed Apr. 1, 2010, now U.S. Pat. No. 8,529,108, which are hereby incorporated herein by reference in their entireties. Optionally, for example, the mirror assembly may include a reflective element with a beveled or rounded or curved front perimeter of the glass substrate that may be exposed to, contactable by and viewable by the driver of the vehicle when the interior rearview mirror assembly is normally mounted in the vehicle, such as described in U.S. Des. Pat. Nos. D633,423; D633,019; D638,761; and/or D647,017, and/or PCT Application No. PCT/US2010/032017, filed Apr. 22, 2010, and/or PCT Application No. PCT/US10/51741, filed Oct. 7, 2010, which are hereby incorporated herein by reference in their entireties. Optionally, the mirror assembly may include a conventional bezel, such as described in U.S. Pat. No. 7,224,324, which is hereby incorporated herein by reference in its entirety.

Optionally, for example, a touch sensitive element for a mirror assembly of the present invention can be a capacitive type or a resistive type or an inductive type, such as are known in the touch panel arts, including such as disclosed in U.S. Pat. Nos. 3,798,370; 4,198,539; 4,661,655; 4,731,508; 4,822,957; 5,045,644; 6,001,486; 6,087,012; 6,627,918; 6,787,240; and/or 7,224,324, and U.S. patent application Ser. No. 09/946,228, filed Sep. 5, 2001 and published Mar. 14, 2002 as U.S. Pat. Publication No. US2002/0031622; and/or Ser. No. 10/744,522, filed Dec. 23, 2003 and published Jul. 15, 2004 as U.S. Pat. Publication No. US2004/0137240, and/or U.S. provisional application Ser. No. 60/244,577, filed Oct. 31, 2000, which are hereby incorporated herein by reference in their entireties. Also, the touch inputs of the present invention do not necessarily require physical contact between the driver's finger and touch sensitive element. Close approach of the driver's finger (or a stylus or other touch/proximity means) to the touch sensitive surface may suffice to achieve a touch input. This can thus be by non-contacting input or by contacting input by a variety of means such as thermal or pyro detection, capacitive or inductive detection, resistive sensing, electromagnetic disturbance sensing or the like. Optionally, a reading of the fingerprint of the person touching the mirror reflector can be taken to verify identity of the person and so authorize particular actions in response (such as turning on the vehicle ignition, such as to start the engine, conducting a remote banking transaction, identifying a person for the purpose of setting vehicle accessories such as seat position, mirror position, climate control, audio system controls, ride system, and the like to the particular setting preferred by that individual person such as is common in vehicle memory systems). The touch sensitive elements or user actuatable selector elements may be responsive to a change in at least one of heat, electrical capacitance, electrical inductance or electrical resistance or the like due to at least close approachment of a human finger, and the mirror assembly may include a plurality of display elements at a plurality of display locations, with a display element of the plurality of display elements being associated with a respective one of the touch sensitive elements. The display element may be selectively activated or backlit by activation of the respective touch sensitive element, and optionally display information desired by a user may be generated in response to the touch sensitive elements being actuated by the user, with such display information being displayed at or near or above the display elements. The display location of the display element and the location of the respective touch sensitive element may be local one another or co-located such that a cognitive relationship between the display element and the respective touch sensitive element is established.

The user actuatable inputs of the present invention may be operable to control any of the accessories of or associated with the mirror assembly and/or accessory module or the like. Optionally, the mirror assembly and/or accessory module and/or console or the like may include other user inputs or actuating devices, without affecting the scope of the present invention. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, which are hereby incorporated herein by reference in their entireties, or such as proximity sensors of the types described in U.S. Pat. Nos. 7,224,324; 7,249,860; and/or 7,446,924, and/or PCT Application No. PCT/US03/40611, filed Dec. 19, 2003 and published on Jul. 15, 2004 as PCT Publication No. WO 2004/058540 A2, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258; and 6,369,804, which are hereby incorporated herein by reference in their entireties, and/or the like, while remaining within the spirit and scope of the present invention.

Thus, the mirror reflective element assembly may include icons or indicia and respective user inputs to indicate to the user the function or functions associated with the respective user inputs or touch pads or areas. The icons may be present and viewable and discernible all the time and/or may be backlit icons, and may be branded or colored by the telematics supplier. Optionally, the icons may be part of a video mirror with a video display screen disposed behind the reflective element (and with the icons displayed by the video display screen and viewable through the transflective mirror reflector of the video mirror reflective element assembly), or the icons may be dedicated icons created by transmissive holes or areas or windows, such as with backlighting at the icon and icon area. Optionally, for example, the icons may comprise one or more colored masks disposed at the rear surface of the reflective element, with one or more white LEDs backlighting the colored mask to backlight the icons. Optionally, the icons may, when backlit, be viewable through the third surface transflective mirror reflector of the mirror reflective element, or the icons may be formed or established behind a hole or window created or formed at and through the third surface mirror reflector in front of where the icon is disposed, with a colored pattern or icon or indicia disposed at or formed or established at the fourth or rear surface of the reflective element and corresponding and/or coinciding with the hole formed at least partially through the third surface reflector, so the user may view through the hole or window and see the icon (which may be backlit or otherwise illuminated if desired). Optionally, a strip of icons or indicia may be disposed at the rear of the reflective element or a liquid crystal display (LCD) may be disposed at the rear of the reflective element to display the icons at the respective areas and at or near the respective user inputs or touch pads established at the perimeter band. The icons thus may be reconfigurable icons as part of a video display screen of a video mirror or may be fixed icons, such as backlit fixed icons established at the rear of the reflective element. The icons are formed or established or displayed at or near the respective user inputs or touch pads and thus are local to and cognitively associated with the respective user inputs or touch pads.

Thus, the mirror reflective element assembly may comprise an electro-optic reflective element assembly, such as an electrochromic reflective element assembly, with a frameless construction. The reflective element assembly may provide a low profile reflective element assembly, with a 6 mm perimeter band (such as a chrome band or the like) disposed around its periphery, and with the band being wider at the user input or touch zone or area. The telematics icons or indicia or graphics (or other icons or indicia depending on the particular application of the mirror assembly) may be displayed or viewable to a person viewing the reflective element assembly when the reflective element assembly is normally mounted in the vehicle. Optionally, for example, the icons may be displayed or backlit so as to have a brightness or intensity of at least about 1500 cd/m$^2$ during daytime or higher ambient lighting conditions and/or at least about 80 cd/m$^2$ during nighttime or lower ambient lighting conditions (such as responsive to a photosensor or the like at the mirror assembly). The user input indicators or individual touch pads may be laser etched at or in or through or partially through the perimeter band or layer at the rear surface of the front substrate of the reflective element assembly, and may be backlit by one or more white LEDs or the like, with a target intensity or brightness of at least about 5 cd/m$^2$ fixed brightness (such as for night viewing, whereby the low intensity backlighting of the individual touch pads may be washed out or partially washed out during daytime lighting conditions).

The mirror assembly of the present invention may be mounted at or to the interior portion of the vehicle (such as to an in-cabin surface of the vehicle windshield) via any suitable mounting means, such as a single ball mounting configuration or double ball mounting configuration. The electrical connection of the mirror circuitry to circuitry or wiring of the vehicle may be via any suitable electrical connection. For example, a standard CCC 10 pin harness connection may be made at the circuitry of the mirror assembly when the mirror assembly is normally mounted in the vehicle. Optionally, a single printed circuit board may be disposed at the rear of the reflective element and may include the capacitive switches or sensors and the backlighting LEDs for the icons and/or other circuitry associated with the user inputs and features/functions. Optionally, the mirror assembly may include a fault indicator or alert indicator (such as a red LED or the like and such as disposed at or between the icons) to indicate to the user when an error or fault is detected in the telematics system or user input or touch system. Optionally, the telematics system and, mirror reflective element assembly may provide an indication that the system is functioning properly, such as via a green LED or the like at or near the icons. Optionally, when a user touches an individual touch pad to activate one of the user inputs or touch sensors, the green LED may flash to confirm actuation of that user input. Optionally, the system may provide a delay in activating or controlling the selected feature of the touched individual touch pad to ensure that a proper touch was made by the user. Optionally, the telematics input lines may be fed to a microcontroller or control circuit while the LEDs are powered via a separate high current power supply.

The compass sensor and circuitry for the compass system that detects and displays the vehicle directional heading to a driver of the vehicle may comprise any suitable compass sensor and/or circuitry. Optionally, the compass system and compass circuitry may utilize aspects of the compass systems described in U.S. Pat. Nos. 7,370,983; 7,329,013; 7,289,037; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and/or 6,513,252, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The sensor or sensors may be positioned at and within a base portion or mounting base of the mirror assembly so that the sensor/sensors is/are substantially fixedly positioned within the vehicle, or may be attached or positioned within the mirror casing. Note that the magneto-responsive sensor used with the mirror assembly may comprise a magneto-responsive sensor, such as a magneto-resistive sensor, such as the types disclosed in U.S. Pat. Nos. 5,255,442; 5,632,092; 5,802,727; 6,173,501; 6,427,349; and/or 6,513,252 (which are hereby incorporated herein by reference in their entireties), or a magneto-inductive sensor, such as described in U.S. Pat. No. 5,878,370 (which is hereby incorporated herein by reference in its entirety), or a magneto-impedance sensor, such as the types described in PCT Publication No. WO 2004/076971 A2, published Sep. 10, 2004 (which is hereby incorporated herein by reference in its entirety), or a Hall-effect sensor, such as the types described in U.S. Pat. Nos. 6,278,271; 5,942,895 and/or 6,184,679 (which are hereby incorporated herein by reference in their entireties). The sensor circuitry and/or the circuitry in the mirror housing and associated with the sensor may include processing circuitry. For example, a printed circuit board may include processing circuitry which may include compensation methods, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and/or 6,642,851, which are all hereby incorporated herein by reference in their entireties. The compass sensor may be incorporated in or associated with a compass system and/or display system for displaying a directional heading of the vehicle to the driver, such as a compass system of the types described in U.S. Pat. Nos. 7,289,037; 5,924,212; 4,862,594; 4,937,945; 5,131,154; 5,255,442; 5,632,092; and/or 7,004,593, which are all hereby incorporated herein by reference in their entireties.

Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two sensor elements (such as magneto-responsive sensor elements, or a Hall effect sensor or multiple Hall effect sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an application specific integrated chip ("ASIC"), such as utilizing principles described in U.S. Pat. Nos. 7,815,326; 7,004,593; 7,329,013 and/or 7,370,983, and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties, and/or such as by utilizing aspects of an EC driver-on-a-chip such as described in U.S. Pat. No. 7,480,149, which is hereby incorporated herein by reference in its entirety. The ASIC chip may be small (preferably less than approximately a two square centimeter area, more preferably less than approximately a 1.5 square centimeter area, and most preferably less than approximately a one square centimeter area or thereabouts) and readily packagable into the mirror assembly (or a feed from such a compass-on-a-chip may be provided to the mirror assembly from a compass-on-a-chip packaged elsewhere in the vehicle cabin remote from the mirror assembly such as in an instrument panel portion or in roof console portion). Such large scale integration onto the likes of the silicon substrate/chip can allow a compass functionality to be provided by a relatively small chip, and with appropriate pin out or electrical leads provided as is common in the electrical art.

Optionally, a compass chip or compass module may be disposed at an upper end of the mounting base of a mirror assembly, such as at an upper or connecting end of a wire management element connected to or extending from the mounting base of the mirror assembly, such as by utilizing aspects of the mirror systems described in U.S. patent application Ser. No. 12/578,732, filed Oct. 14, 2009 and published Apr. 22, 2010 as U.S. Pat. Pub. No. US-2010-0097469, which is hereby incorporated herein by reference in its entirety. The wire management system may include a wire management element or channel or cover element, such as by utilizing aspects of the wire management systems or elements described in U.S. Pat. No. 7,510,287 and/or U.S. patent application Ser. No. 11/226,628, filed Sep. 14, 2005 and published Mar. 23, 2006 as U.S. Pat. Pub. No. US-2006-0061008, which are hereby incorporated herein by reference in their entireties.

The compass chip may be in communication with a compass display, which may provide a display region at the reflective element, and which includes ports or portions, which may comprise icons, characters or letters or the like representative of only the cardinal directional points, such as, for example, the characters N, S, E, W, formed or etched in the reflective film coating of the reflective element (and forming a transparent window therein), such as via techniques such as disclosed in commonly assigned U.S. Pat. Nos. 4,882,565 and/or 7,004,593, which are hereby incorporated by reference herein in their entireties. Optionally, however, reflective element may comprise a transflective or display on demand (DOD) reflective element, and the compass display may be a display on demand (DOD) type of display, such as disclosed in commonly assigned U.S. Pat. Nos. 7,195,381; 6,690,268; 5,668,663 and 5,724,187, which are hereby incorporated by reference herein in their entireties, without affecting the scope of the present invention.

As discussed above, the mirror assembly comprises an electro-optic or electrochromic mirror assembly and includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCM/US2010/029173, filed Mar. 30, 2010, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, which are all hereby incorporated herein by reference in their entireties.

Optionally, it is envisioned that aspects of the present invention may be suitable for an interior rearview mirror assembly that comprises a prismatic mirror assembly or a non-electro-optic mirror assembly (such as a generally planar or optionally slightly curved mirror substrate) or an electro-optic or electrochromic mirror assembly. For example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371; and 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177; and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (which are hereby incorporated herein by reference in their entireties), that can benefit from the present invention.

Optionally, the reflective element may includes an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190; and/or 7,255,451, and/or PCI Application No. PCT/US2010/032017, filed Apr. 22, 2010, and/or PCT Application No. PCT/US10/51741; filed Oct. 7, 2010, and/or U.S. patent application Ser. No. 11/226,628, filed Sep. 14, 2005 and published Mar. 23, 2006 as U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. No. 7,184,190 and/or 7,255,451, which are hereby incorporated herein by reference in their entireties). Optionally, other opaque or substantially opaque coatings or bands may be implemented while remaining within the spirit and scope of the present invention.

Optionally, the mirror assembly may comprise a frameless or bezelless mirror assembly such as described in U.S. Pat. Nos. 7,184,190; 7,255,541 and/or 7,289,037, and/or U.S. Des. Pat. Nos. D633,423; D633,019; D638,761; and/or D647,017, and/or PCT Application No. PCT/US2010/032017, filed Apr. 22, 2010, and/or PCT Application No. PCT/US10/51741, filed Oct. 7, 2010, which are hereby incorporated herein by reference in their entireties.

Optionally, the mirror assembly may include user interface inputs, such as buttons or switches or touch or proximity sensors or the like, with which a user may adjust or control one or more accessories, such as via the principles described in U.S. Pat. No. 7,360,932 and/or U.S. patent application Ser. No. 12/091,525, filed Apr. 25, 2008 and published Jan. 15, 2009 as U.S. Pat. Pub. No. US-2009-0015736; Ser. No. 11/239,980, filed Sep. 30, 2005 and published Jun. 15, 2006 as U.S. Pat. Pub. No. US-2006-0125919; Ser. No. 12/414,190, filed Mar. 30, 2009, now U.S. Pat. No. 8,154,418; and/or Ser. No. 12/576,550, filed Oct. 9, 2009 and published Apr. 15, 2010 as U.S. Pat. Pub. No. US-2010-0091394, which are hereby incorporated herein by reference in their entireties.

The interior rearview mirror assembly may include a casing, such as described above, or the mirror assembly may comprise or utilize aspects of other types of casings or the like, such as described in U.S. Pat. Nos. 7,338,177; 7,289,037; 7,249,860; 6,439,755; 4,826,289; and 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501; and/or 7,184,190, and/or in U.S. patent application Ser. No. 11/226,628, filed Sep. 14, 2005 and published Mar. 23, 2006 as U.S. Pat. Pub. No. US-2006-0061008; and/or Ser. No. 10/538,724, filed Jun. 13, 2005 and published Mar. 9, 2006 as U.S. Pat. Pub. No. US-2006-0050018; which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. patent application Ser. No. 10/538,724, filed Jun. 13, 2005 and published Mar. 9, 2006 as U.S. Pat. Pub. No. US-2006-0050018; and/or Ser. No. 12/091,525, filed Apr. 25, 2008 and published Jan. 15, 2009 as U.S. Pat. Pub. No. US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451; 7,289,037, which are hereby incorporated herein by reference in their entireties.

The video display screen device or module of the mirror assembly or display system of the present invention may comprise any suitable type of video screen and is operable to display images in response to an input or signal from a control or imaging system. For example, the video display screen may comprise a multi-pixel liquid crystal module (LCM) or liquid crystal video display (LCD), preferably a thin film transistor (TFT) multi-pixel liquid crystal video display (such as discussed below), or the video screen may comprise a multi-pixel organic electroluminescent video display or a multi-pixel light emitting diode (LED) video display, such as an organic light emitting diode (OLED) or inorganic light emitting video diode display or the like, or an electroluminescent (EL) video display or the like. For example, the video display screen may comprise a video screen of the types disclosed in U.S. Pat. Nos. 7,855,755; 7,734,392; 7,370,983; 7,338,177; 7,274,501; 7,255,451; 7,195,381; 7,184,190; 6,902,284; 6,690,268; 6,428,172; 6,420,975; 5,668,663; 5,724,187; 5,416,313; 5,285,060; 5,193,029 and/or 4,793,690, and/or U.S. patent application Ser. No. 13/023,750, filed Feb. 9, 2011, now U.S. Pat. No. 8,890,955; Ser. No. 10/538,724, filed Jun. 13, 2005 and published Mar. 9, 2006 as U.S. Pat. Pub. No. US-2006-0050018; Ser. No. 11/226,628, filed Sep. 14, 2005 and published Mar. 23, 2006 as U.S. Pat. Pub. No. US-2006-0061008; Ser. No. 12/091,525, filed Apr. 25, 2008 and published Jan. 15, 2009 as U.S. Pat. Pub. No. US-2009-0015736; Ser. No. 12/091,525, filed Apr. 25, 2008 and published Jan. 15, 2009 as U.S. Pat. Pub. No. US-2009-0015736; Ser. No. 12/578,732, filed Oct. 14, 2009 and published Apr. 22, 2010 as U.S. Pat. Pub. No. US-2010-0097469; Ser. No. 09/585,379, filed Jun. 1, 2000, now abandoned; and/or Ser. No. 10/207,291, filed Jul. 29, 2002, now abandoned, and/or PCT Application No. PCT/US10/47256, filed Aug. 31, 2010, which are all hereby incorporated herein by reference in their entireties.

Video display screens used in interior video mirror assemblies typically have a display area typically greater than about 20 cm$^2$, and more preferably greater than about 30 cm$^2$, but typically are less than about 70 cm$^2$ or thereabouts. The video display screen, preferable and usable in a video mirror application, preferably provides a display screen or area that is greater than at least 2.4 inches diagonal, and more preferably greater that at least about 3.3 inches diagonal and more preferably greater than at least about 3.5 inches diagonal and less than or equal to about 4.7 inches diagonal. The video display screen may include QVA size (320×240 pixel) output pins or WQVA size (480×234 pixel) output pins, and may provide a resolution of at least about 75,000 pixels, more preferably at least about 85,000 pixels, and more preferably at least about 95,000 pixels or thereabouts (with the pixels comprising individually addressable liquid crystal pixels). The video display screen may provide a display screen or area of any suitable aspect ratio, such as an aspect ratio of about 4:3 or 15:9 or 16:9 or the like, without affecting the scope of the present invention. The industry standard that can be used includes 4:3 screen resolution provided by VGA (640×480), SVGA (800×600), XGA (1024×768) or SXGA (1280×1024), and includes 16:9 screen resolution provided by similar standards or WXGA (1366×768). Preferably, the video display screen is a high resolution video display comprising a high resolution reconfigurable thin film transistor (TFT) multipixel liquid crystal display screen having an addressable pixel density of at least about 2,000 pixels/cm$^2$ of addressable backlit video screen area, more preferably an addressable pixel density of at least about 2,500 pixels/cm$^2$ of addressable backlit video screen area, and more preferably an addressable pixel density of at least about 2,800 pixels/cm$^2$ of addressable backlit video screen area, and more preferably at least about 3,600 pixels/cm$^2$ of addressable backlit video screen area, and more preferably at least about 10,000 pixels/cm$^2$ of addressable backlit video screen area (such as, for example, about 1-4 Megapixels/cm$^2$ or about 20-35 Megapixels/cm$^2$ of addressable backlit video screen area). Preferably, the video display screen provides a contrast ratio preferably of at least about 250:1, more preferably at least about 350:1, more preferably at least about 650:1, and more preferably at least about 900:1 or 1,000:1 or thereabouts. The higher contrast ratio allows for enhanced viewability of the displayed cropped images while providing sufficient darkness at the non-video-displaying portion of the display screen so that the non-video-displaying portion of the screen is not readily viewable or discernible through the transflective mirror reflector to a person viewing the mirror reflective element when the mirror assembly is normally mounted in a vehicle and so that driver rear, vision using the mirror reflector is enhanced or maximized.

Although the display screen may provide a large display area (such as a display area having a 3.3 inch or 3.5 inch diagonal dimension or thereabouts) in the likes of an about 16:9 aspect ratio), typically it is desired to restrict the size of the real-time video display during forward driving so as to not utilize the entire available display area (which may reduce the reflective area of the mirror reflective element when the display is activated to display video images). Thus, the video display screen may utilize only a portion (such as a left portion ore right portion) of the video display screen for displaying the video images in particular, and also any associated iconistic or computer-generated images. Typically, when the video display screen is activated, its backlighting (such as an array of LEDs or the like such as described in U.S. Pat. Nos. 7,195,381; 7,370,983; and/or 7,855,755, which are hereby incorporated herein by reference in their entireties) is activated. Thus, the video processor may darken (i.e., render black or non-light emitting or substantially non-light emitting) the non-video-displaying portion by making dark or black the LCD pixels that are not displaying video images. Thus, a higher contrast ratio is desired to enhance the viewability of the displaying portion of the video display screen and to enhance the non-discernibility of the non-video displaying portion of the video display screen by a driver viewing the reflective element when the mirror assembly is normally mounted in a vehicle.

In a preferred embodiment, and such as for use in an interior rearview video mirror assembly (such as a video mirror utilizing aspects of the systems described in U.S. Pat. Nos. 6,690,268; 6,902,284; 7,184,190; 7,195,381; 7,255,451; 7,274,501; 7,338,177; 7,370,983; 7,490,007; 7,540,620; and/or 7,855,755, and/or U.S. patent application Ser. No. 10/538,724, filed Jun. 13, 2005 and published Mar. 9, 2006 as U.S. Publication No. 2006/0050018; Ser. No. 11/226,628, filed Sep. 14, 2005 by Karner et al. and published Mar. 23, 2006 as U.S. Publication No. 2006/0061008; Ser. No. 12/578,732, filed Oct. 14, 2009 and published Apr. 22, 2010 as U.S. Publication No. US-2010-0097469; Ser. No. 09/585,379, filed Jun. 1, 2000; and/or Ser. No. 10/207, 291, filed Jul. 29, 2002, and/or PCT Application No. PCT/US2010/25545, filed Feb. 26, 2010, and/or PCT Application No. PCT/US10/47256, filed Aug. 31, 2010, which are all hereby incorporated herein by reference in their entireties), the video display screen may provide a resolution of about 480×RGB×272 dots, with a striped pixel arrangement. The active area of the display screen may be about 77.76 mm (W)×43.52 mm (H), with a pixel pitch of about 0.162 (W)×0.16 (H). The active area diagonal dimension may be about 3.51 inches or thereabouts, with a viewing direction at 12 o'clock. The interface to the video display screen may comprise a 24 bit parallel interface, and the video display screen may provide a 16.7 million color resolution. The display may comprise a thin film transistor (TFT) liquid crystal display (LCD), which is a normally white, transmissive type of display. The display screen may have a minimum of at least about 45 degrees viewing angle in all directions, more preferably at least about 50 degrees viewing angle in all directions, and more preferably at least about 55 degrees viewing angle in all directions, and preferably has a contrast ratio of at least about 1,000:1. The video display screen, when operated to display video images, preferably may have an intensity as viewed through the transflective mirror reflector (preferably a third surface transflective mirror reflector comprising at least one metallic transflective thin film such as described in U.S. Pat. Nos. 7,274,501; 7,255,451; 7,195,381; 7,184,190; 5,668,663; 5,724,187 and/or 6,690,268, which are all hereby incorporated herein by reference in their entireties) of the video mirror of at least about 1,500 candelas per square meter (cd/m$^2$) nominal. Optionally, the video display screen and mirror assembly may utilize aspects of the display systems described in U.S. patent application Ser. No. 13/102,263, filed May 6, 2011 and published Nov. 10, 2011 as U.S. Publication No. US-2011-0273659, which is hereby incorporated herein by reference in its entirety.

Optionally, and desirably, when the video display is part of a video mirror assembly, a contrast ratio (such as measured in accordance with ANSI IT7.215-1992: Data Projection Equipment and Large Screen Data Displays—Test Methods and Performance Characteristics available from the American National Standards Association of Washington D.C., USA, which is hereby incorporated herein by reference in its entirety) of at least about 500:1 is preferred, at least about 750:1 more preferred and at least about 1,250:1 most preferred. Dynamic contrast control (such as known in the display art and such as is disclosed by H. Chen et al. in "Locally pixel-compensated backlight dimming on LED-backlit LCD TV", JSID 15/12 (2007), pp. 981-988, which is hereby incorporated herein by reference in its entirety) may be used in displays and/or systems in accordance with the present invention. For example, contrast within the individual video image frames (or sequence of video frames) being displayed (simultaneous contrast) can be increased when the video screen backlighting is locally dimmed (such as by locally and selectively dimming backlighting provided by individual banks of backlighting light emitting diodes (LEDs) or local grouping of backlighting LEDs).

Optionally, the mirror assembly and/or prismatic or electrochromic reflective element may include one or more displays, such as for the accessories or circuitry described herein. The displays may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,338,177; 7,274,501; 7,195,381; 6,690,298; 5,668,663 and/or 5,724,187, and/or in U.S. patent application Ser. No. 11/226,628, filed Sep. 14, 2005 and published Mar. 23, 2006 as U.S. Pat. Pub. No. US-2006-0061008; and/or Ser. No. 12/091,525, filed Jul. 15, 2008 and published Jan. 15, 2009 as U.S. Pat. Pub. No. US-2009-0015736, which are all hereby incorporated herein by reference in their entireties. Optionally, the prismatic reflective element may comprise a display on demand or transflective prismatic element (such as described in U.S. Pat. Nos. 7,274,501 and/or 7,338,177, which are hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

The video display screen may be controlled or operable in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097,023; 5,877,897; and 5,796,094, and/or U.S. patent application Ser. No. 10/534,632, filed May 11, 2005 and published Aug. 3, 2006 as U.S. Pat. Pub. No. US-2006-0171704, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, a rear camera, such as a rear backup video camera/imager or the like (such as a camera and system of the types described in U.S. Pat. Nos. 5,550,677; 5,670,935; 6,498,620; 6,222,447; and/or 5,949,331, which are hereby incorporated herein by reference in their entireties), may be disposed at the vehicle and may have a rearward field of view rearward of the vehicle for capturing images rearward of the vehicle such as for driver assistance during a reversing maneuver of the vehicle or the like. Because such a rear camera has a rearward field of view, the rearward facing camera may be operable to capture images of rearwardly approaching or following vehicles that are behind the vehicle equipped with the rearward facing camera when the vehicle so equipped is driving forwardly along the road or highway. It is envisioned that an image processor or controller (such as an EyeQ™ image processing chip available from Mobileye Vision Technologies Ltd. of Jerusalem, Israel, and such as an image processor of the types described in PCT Application No. PCT/US10/25545, filed Feb. 25, 2010 and published Sep. 2, 2010 as International Pub. No. WO/2010/099416, which is hereby incorporated herein by reference in its entirety) may process image data captured by the rearward facing camera to assess glare lighting, conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing. Using principles of the systems described in U.S. Pat. No. 5,550,677, which is hereby incorporated herein by reference in its entirety, the system may operate to independently control any one or more of the interior rearview mirror assembly and the exterior rearview mirror assemblies of the equipped vehicle, such as based on the intensity and location of glare light detected by the camera and image processor. Such a rear reversing or backup camera and controller can also operate to detect the ambient light level present at the vehicle and may adjust the dimming of the mirror system accordingly, and/or may adjust other displays, lighting and/or accessories of the vehicle in accordance with and responsive to the ambient light detection by the rear backup camera (or by other cameras on the vehicle that view exterior to the vehicle). Such glare detection and ambient light detection and image processing of image data captured by a rear backup assist camera of the vehicle may obviate the need for a separate glare sensor elsewhere at the vehicle, such as at or in the interior rearview mirror assembly of the vehicle or the like. Such image processing and such a mirror control system may utilize aspects of the imaging systems described in U.S. Pat. Nos. 5,550,677; 5,670,935; 5,760,962; 6,201, 642; 6,396,397; 6,498,620; 6,097,023; 5,877,897; and 5,796,094, which are hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and/or 6,124,886, and/or U.S. patent application Ser. No. 10/538,724, filed Jun. 13, 2005 and published Mar. 9, 2006 as U.S. Pat. Pub. No. US-2006-0050018, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322; and/or 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255, 442; 5,632,092; 5,798,688; 5,971,552; 5,924,212; 6,243, 003; 6,278,377; and 6,420,975; 6,477,464; 6,946,978; 7,308,341; 7,167,796; 7,004,593; 7,657,052; and/or 6,678, 614, and/or U.S. patent application Ser. No. 10/538,724, filed Jun. 13, 2005 and published Mar. 9, 2006 as U.S. Pat. Pub. No. US-2006-0050018, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249, 860, microphones, such as disclosed in U.S. Pat. Nos. 7,657,052; 6,243,003; 6,278,377; and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720, 580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. patent application Ser. No. 11/239,980, filed Sep. 30, 2005 and published Jun. 15, 2006 as U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TOMS) receiver (such as described in U.S. Pat. Nos. 6,124,647; 6,294,989; 6,445,287; 6,472,979; 6,731,205; and/or 7,423,522, and/or an ONSTAR® system, a compass, such as disclosed in U.S.

Pat. Nos. 5,924,212; 4,862,594; 4,937,945; 5,131,154; 5,255,442; and/or 5,632,092, and/or any other accessory or circuitry or the like (with all of the above-referenced patents and PCT and U.S. patent applications being commonly assigned, to Donnelly Corporation and being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577; 7,004,606; and/or 7,720,580, and/or U.S. patent application Ser. No. 10/534,632, filed May 11, 2005 and published Aug. 3, 2006 as U.S. Patent Publication No. US-2006-0171704; Ser. No. 12/091,359, filed Jun. 10, 2008 and published Oct. 1, 2009 as U.S. Pat. Pub. No. US-2009-0244361; and/or Ser. No. 12/377,054, filed Feb. 10, 2009 and published Aug. 26, 2010 as U.S. Pat. Pub. No. US-2010-0214791, and/or PCT Application No. PCT/US08/78700, filed Oct. 3, 2008 and published Apr. 9, 2009 as International Publication No. WO 2009/046268, and/or PCT Application No. PCT/US08/76022, filed Sep. 11, 2008 and published Mar. 19, 2009 as International Publication No. WO 2009/036176, which are all hereby incorporated herein by reference in their entireties. The sensor may include a lens element or optic between the imaging plane of the imaging sensor and the forward scene to substantially focus the scene at an image plane of the imaging sensor. The imaging sensor may comprise an image sensing module or the like, and may utilize aspects described in U.S. patent application Ser. No. 10/534,632, filed May 11, 2005 and published Aug. 3, 2006 as U.S. Pat. Pub. No. US-2006-0171704; and/or Ser. No. 12/091,359, filed Oct. 27, 2006 and published Oct. 1, 2009 as U.S. Pat. Pub. No. US-2009-0244361, which are hereby incorporated herein by reference in their entireties.

Optionally, the accessory or accessories, such as those described above and/or below, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, 31850, CAN J2284, Fire Wire 1394, MOST; LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
   a mirror reflective element;
   a video display device disposed behind said mirror reflective element and operable to display video information that is viewable by a driver of the vehicle through said mirror reflective element and at a display region of said mirror reflective element;
   wherein said video display device is operable to display a directional heading at a compass display portion of said display region;
   wherein means are provided to adjust the displayed directional heading to limit image sticking of the displayed directional heading;
   wherein adjustment of the displayed directional heading to limit image sticking comprises at least one of (i) adjustment of a location of the displayed directional heading and (ii) adjustment of an intensity of the displayed directional heading;
   wherein adjustment of at least one of (i) a location of the displayed directional heading and (ii) an intensity of the displayed directional heading to limit image sticking is made at least in part responsive to a detected change in the vehicle heading that results in a change from an initial displayed directional heading character or icon to a different displayed directional heading character or icon; and
   wherein, responsive to the detected change in the vehicle heading, (a) the initial displayed directional heading character or icon changes to the different displayed directional heading character or icon and (b) the different displayed directional heading character or icon at least one of (i) is displayed at a location that is different and shifted from the location of the initial displayed directional heading character or icon and (ii) is displayed at an intensity that is different from the intensity of the initial displayed directional heading character or icon.

2. The interior rearview mirror assembly of claim 1, wherein said means adjust a location of the directional heading display, and wherein at least one of (i) said means episodically adjust the location of the directional heading display, (ii) said means episodically adjust the location of the directional heading display following a predetermined period of time, (iii) said means adjust the location of the directional heading display within said compass display portion of said display region, (iv) said means adjust an intensity of the directional heading display.

3. The interior rearview mirror assembly of claim 1, wherein said compass display portion has a display area of about two square centimeters.

4. The interior rearview mirror assembly of claim 1, wherein said video display device comprises a video display module having a display screen with a circuit element disposed to the rear of said display screen, said circuit element comprising circuitry established thereat, and wherein said circuitry comprises a compass sensor and control circuitry for controlling at least one of (i) display functions, (ii) compass operation and (iii) variable reflectance of said reflective element.

5. The interior rearview mirror assembly of claim 1, wherein one of (i) said mirror reflective element comprises a prismatic mirror reflective element, (ii) said mirror reflective element comprises an electro-optic reflective element having a front substrate and a rear substrate with an electro-optic medium disposed therebetween and (iii) said mirror reflective element comprises an electro-optic reflective element having a front substrate and a rear substrate with an electro-optic medium disposed therebetween and wherein said mirror assembly is operable to adjust a dimming level of said electro-optic reflective element responsive to a user input disposed at or in said mirror assembly so that a user of said mirror assembly can selectively adjust the dimming level to a desired setting.

6. The interior rearview mirror assembly of claim 1, wherein said mirror reflective element comprises a front surface and a rear surface and a perimeter edge about a periphery of said mirror reflective element and extending between said front and rear surfaces, said front surface generally facing a driver of a vehicle when said mirror assembly is normally mounted in a vehicle equipped with said mirror assembly, and wherein said perimeter edge of said mirror reflective element is exposed and viewable by the driver of the vehicle when said mirror assembly is normally mounted in the equipped vehicle.

7. The interior rearview mirror assembly of claim 1, wherein said mirror reflective element comprises a transflective mirror reflector established at a surface thereof, and wherein said video display device is operable to display video information that is viewable by the driver of the vehicle through said transflective mirror reflector of said mirror reflective element and at said display region of said mirror reflective element.

8. The interior rearview mirror assembly of claim 1, wherein, during the reversing maneuver of the vehicle, said video display device is operable to display images captured by a rearward facing camera said video display device does not display the directional heading.

9. The interior rearview mirror assembly of claim 1 comprising a touch zone that comprises at least one touch pad established at a perimeter border band of the reflective element.

10. The interior rearview mirror assembly of claim 9, comprising at least one other touch sensor to detect a touch of a user away from said touch zone so as to determine when a detected touch at said touch zone is an unintentional touch.

11. The interior rearview mirror assembly of claim 9, comprising a keypad disposed behind said touch zone, said keypad comprising at least one electrical connector extending through a filler material to establish electrical connection between a circuit element and said touch pad.

12. The interior rearview mirror assembly of claim 11, wherein said filler material comprises a light diffusing material and wherein said circuit element includes a backlighting element that is operable to emit light through said light diffusing material to backlight said at least one touch pad.

13. An interior rearview mirror assembly for a vehicle, said interior rearview mirror assembly comprising:
a mirror reflective element;
a video display device disposed behind said mirror reflective element and operable to display video information that is viewable by a driver of the vehicle through said mirror reflective element and at a display region of said mirror reflective element;
wherein said video display device is operable to display a directional heading at a compass display portion of said display region;
wherein said video display device is operable to adjust a location of the displayed directional heading to limit image sticking of the displayed directional heading;
wherein adjustment of the displayed directional heading to limit image sticking comprises adjustment of a location of the displayed directional heading;
wherein adjustment of the location of the displayed directional heading to limit image sticking is made at least in part responsive to a detected change in the vehicle heading that results in a change from an initial displayed directional heading character or icon to a different displayed directional heading character or icon;
wherein, responsive to the detected change in the vehicle heading, (a) the initial displayed directional heading character or icon changes to the different displayed directional heading character or icon and (b) the different displayed directional heading character or icon is displayed at a location that is different and shifted from the location of the initial displayed directional heading character or icon; and
wherein at least one of (i) said video display device is operable to episodically adjust the location of the displayed directional heading, (ii) said video display device is operable to episodically adjust the location of the displayed directional heading following a predetermined period of time and (iii) said video display device is operable to adjust the location of the displayed directional heading within said compass display portion of said display region.

14. The interior rearview mirror assembly of claim 13, wherein said video display device is operable to adjust an intensity of the displayed directional heading.

15. The interior rearview mirror assembly of claim 13, wherein said video display device comprises a video display module having a display screen with a circuit element disposed to the rear of said display screen, said circuit element comprising circuitry established thereat, and wherein said circuitry comprises a compass sensor and control circuitry for controlling at least one of (i) display functions, (ii) compass operation and (iii) variable reflectance of said reflective element.

16. The interior rearview mirror assembly of claim 13, wherein one of (i) said mirror reflective element comprises a prismatic mirror reflective element, (ii) said mirror reflective element comprises an electro-optic reflective element having a front substrate and a rear substrate with an electro-optic medium disposed therebetween and (iii) said mirror reflective element comprises an electro-optic reflective element having a front substrate and a rear substrate with an electro-optic medium disposed therebetween and wherein said mirror assembly is operable to adjust a dimming level of said electro-optic reflective element responsive to a user input disposed at or in said mirror assembly so that a user of said mirror assembly can selectively adjust the dimming level to a desired setting.

17. The interior rearview mirror assembly of claim 13, wherein said mirror reflective element comprises a front surface and a rear surface and a perimeter edge about a periphery of said mirror reflective element and extending between said front and rear surfaces, said front surface generally facing a driver of a vehicle when said mirror assembly is normally mounted in a vehicle equipped with said mirror assembly, and wherein said perimeter edge of said mirror reflective element is exposed and viewable by the driver of the vehicle when said mirror assembly is normally mounted in the equipped vehicle.

18. The interior rearview mirror assembly of claim 13, wherein said mirror reflective element comprises a transflective mirror reflector established at a surface thereof, and wherein said video display device is operable to display video information that is viewable by the driver of the vehicle through said transflective mirror reflector of said mirror reflective element and at said display region of said mirror reflective element.

19. An interior rearview mirror assembly for a vehicle, said interior rearview mirror assembly comprising:
  a mirror reflective element;
  a video display device disposed behind said mirror reflective element and operable to display video information that is viewable by a driver of the vehicle through said mirror reflective element and at a display region of said mirror reflective element;
  wherein said mirror reflective element comprises a transflective mirror reflector established at a surface thereof, and wherein said video display device is operable to display video information that is viewable by the driver of the vehicle through said transflective mirror reflector of said mirror reflective element and at said display region of said mirror reflective element;
  wherein said video display device is operable to display a directional heading at a compass display portion of said display region;
  wherein said video display device is operable to adjust the displayed directional heading to limit image sticking of the displayed directional heading;
  wherein adjustment of the displayed directional heading to limit image sticking comprises at least one of (i) adjustment of a location of the displayed directional heading and (ii) adjustment of an intensity of the displayed directional heading;
  wherein adjustment of at least one of (i) a location of the displayed directional heading and (ii) an intensity of the displayed directional heading to limit image sticking is made at least in part responsive to a detected change in the vehicle heading that results in a change from an initial displayed directional heading character or icon to a different displayed directional heading character or icon;
  wherein, responsive to the detected change in the vehicle heading, (a) the initial displayed directional heading character or icon changes to the different displayed directional heading character or icon and (b) the different displayed directional heading character or icon at least one of (i) is displayed at a location that is different and shifted from the location of the initial displayed directional heading character or icon and (ii) is displayed at an intensity that is different from the intensity of the initial displayed directional heading character or icon; and
  wherein said mirror reflective element comprises a front surface and a rear surface and a perimeter edge about a periphery of said mirror reflective element and extending between said front and rear surfaces, said front surface generally facing a driver of a vehicle when said mirror assembly is normally mounted in a vehicle equipped with said mirror assembly, and wherein said perimeter edge of said mirror reflective element is exposed and viewable by the driver of the vehicle when said mirror assembly is normally mounted in the equipped vehicle.

20. The interior rearview mirror assembly of claim 19, wherein said video display device is operable to at least one of (i) episodically adjust a location or an intensity of the displayed directional heading, (ii) episodically adjust a location or an intensity of the displayed directional heading following a predetermined period of time and (iii) adjust a location or an intensity of the displayed directional heading within said compass display portion of said display region.

* * * * *

UNITED STATES PATENT AND TRADEMARK OFFICE
CERTIFICATE OF CORRECTION

PATENT NO. : 9,598,016 B2
APPLICATION NO. : 13/879481
DATED : March 21, 2017
INVENTOR(S) : Blank et al.

It is certified that error appears in the above-identified patent and that said Letters Patent is hereby corrected as shown below:

In the Specification

Column 11
Line 56, "beading" should read --heading--;

Column 12
Line 1, "beading" should read --heading--;

Column 18
Line 18, "min" should read --mm--;
Line 21, "trim" should read --mm--;
Line 32, insert --up-- after "by";

Column 19
Line 14, "on" should read --one--;

Column 24
Line 55, "3246" should read --324b--;

Column 25
Line 1, "344" should read --344'--;
Line 42, "Jog" should read --jog--;

Column 29
Line 9, insert --to-- after "user";

Column 32
Line 16, "M" should read --As--;

Signed and Sealed this
Sixth Day of February, 2018

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,598,016 B2

Column 41
Line 42, "at" should read --to--;

Column 52
Line 48, "PCM" should read --PCT--;

Column 53
Line 57, "PCI" should read --PCT--;

Column 56
Line 42, "ore" should read --or a--;

Column 60
Line 64, "TOMS" should read --TPMS--;

Column 61
Line 64, "31850" should read --J1850--.